US009754163B2

(12) United States Patent
Segalovitz et al.

(10) Patent No.: US 9,754,163 B2
(45) Date of Patent: Sep. 5, 2017

(54) SYSTEM AND METHOD FOR DETECTING OBJECTS IN AN IMAGE

(71) Applicant: PHOTOMYNE LTD., Bene Beraq (IL)

(72) Inventors: Yair Segalovitz, Ramat Hasharon (IL); Omer Shoor, Ra'Anana (IL); Yaron Lipman, Rehovot (IL); Nir Tzemah, Binyamina (IL); Natalie Verter, Givatayim (IL)

(73) Assignee: PHOTOMYNE LTD., Bene Beraq (IL)

( * ) Notice: Subject to any disclaimer, the term of this patent is extended or adjusted under 35 U.S.C. 154(b) by 0 days.

(21) Appl. No.: 15/344,605

(22) Filed: Nov. 7, 2016

(65) Prior Publication Data

US 2017/0083762 A1   Mar. 23, 2017

Related U.S. Application Data

(63) Continuation of application No. PCT/IL2015/051161, filed on Nov. 29, 2015.
(Continued)

(51) Int. Cl.
*G06K 9/00* (2006.01)
*G06K 9/32* (2006.01)
(Continued)

(52) U.S. Cl.
CPC ..... *G06K 9/00463* (2013.01); *G06K 9/00442* (2013.01); *G06K 9/00456* (2013.01);
(Continued)

(58) Field of Classification Search
CPC ........... G06K 9/00463; G06K 9/00456; G06K 9/228; G06K 9/00228; G06K 9/46;
(Continued)

(56) References Cited

U.S. PATENT DOCUMENTS 4,047,187 A   9/1977   Mashimo et al.
4,242,734 A   12/1980   Deal
(Continued)

FOREIGN PATENT DOCUMENTS

EP   2034439 A1   3/2009
EP   2731074 A1   5/2014
(Continued)

OTHER PUBLICATIONS

Al-amri, et al. (Linear and Non-linear Contrast Enhancement Image), ijcsns International Journal of Computer Science and Network Security, pp. 139-143, Feb. 2010.*
(Continued)

*Primary Examiner* — Daniel Mariam
(74) *Attorney, Agent, or Firm* — May Patents Ltd.

(57) ABSTRACT

A method for cropping photos images captured by a user from an image of a page of a photo album is described. Corners in the page image are detected using corner detection algorithm or by detecting intersections of line-segments (and their extensions) in the image using edge, corner, or line detection techniques. Pairs of the detected corners are used to define all potential quads, which are then are qualified according to various criteria. A correlation matrix is generated for each potential pair of the qualified quads, and candidate quads are selected based on the Eigenvector of the correlation matrix. The content of the selected quads is checked using a salience map that may be based on a trained neuron network, and the resulting photos images are extracted as individual files for further handling or manipulation by the user.

30 Claims, 38 Drawing Sheets

Related U.S. Application Data

(60) Provisional application No. 62/182,652, filed on Jun. 22, 2015, provisional application No. 62/202,870, filed on Aug. 9, 2015.

(51) Int. Cl.
   | | |
   |---|---|
   | *G06K 9/22* | (2006.01) |
   | *G06K 9/46* | (2006.01) |
   | *G06K 9/66* | (2006.01) |
   | *G06N 3/04* | (2006.01) |
   | *G06N 3/08* | (2006.01) |
   | *G06T 3/40* | (2006.01) |
   | *G06T 5/00* | (2006.01) |
   | *G06K 9/36* | (2006.01) |

(52) U.S. Cl.
   CPC ............ *G06K 9/228* (2013.01); *G06K 9/3233* (2013.01); *G06K 9/4628* (2013.01); *G06K 9/4676* (2013.01); *G06K 9/66* (2013.01); *G06N 3/04* (2013.01); *G06N 3/08* (2013.01); *G06T 3/4007* (2013.01); *G06T 5/009* (2013.01); *G06K 2009/363* (2013.01); *G06T 2207/10004* (2013.01); *G06T 2207/10024* (2013.01); *G06T 2207/20132* (2013.01); *G06T 2207/20164* (2013.01); *G06T 2207/30176* (2013.01)

(58) Field of Classification Search
   CPC ...... G06K 9/4628; G06K 9/4676; G06K 9/66; G06T 3/4007; G06T 5/009
   USPC ................................................. 382/156–159
   See application file for complete search history.

(56) References Cited

U.S. PATENT DOCUMENTS

| | | | |
|---|---|---|---|
| 4,317,991 A | 3/1982 | Stauffer | |
| 4,367,027 A | 1/1983 | Stauffer | |
| RE31,370 E | 9/1983 | Mashimo et al. | |
| 4,638,364 A | 1/1987 | Hiramatsu | |
| RE33,682 E | 9/1991 | Hiramatsu | |
| 5,138,459 A | 8/1992 | Roberts et al. | |
| 5,291,234 A | 3/1994 | Shindo et al. | |
| 5,311,305 A | 5/1994 | Mahadevan et al. | |
| 5,386,103 A | 1/1995 | DeBan et al. | |
| 5,402,170 A | 3/1995 | Parulski et al. | |
| 5,488,429 A | 1/1996 | Kojima et al. | |
| 5,638,136 A | 6/1997 | Kojima et al. | |
| 5,642,431 A | 6/1997 | Poggio et al. | |
| 5,710,833 A | 1/1998 | Moghaddam et al. | |
| 5,724,456 A | 3/1998 | Boyack et al. | |
| 5,781,650 A | 7/1998 | Lobo et al. | |
| 5,812,193 A | 9/1998 | Tomitaka et al. | |
| 5,818,975 A | 10/1998 | Goodwin et al. | |
| 5,835,616 A | 11/1998 | Lobo et al. | |
| 5,870,138 A | 2/1999 | Smith et al. | |
| 5,978,519 A | 11/1999 | Bollman et al. | |
| 5,987,154 A | 11/1999 | Gibbon et al. | |
| 5,991,456 A | 11/1999 | Rahman et al. | |
| 6,018,728 A | 1/2000 | Spence et al. | |
| 6,038,337 A | 3/2000 | Lawrence et al. | |
| 6,097,470 A | 8/2000 | Buhr et al. | |
| 6,101,271 A | 8/2000 | Yamashita et al. | |
| 6,124,896 A | 9/2000 | Kurashige | |
| 6,128,397 A | 10/2000 | Baluja et al. | |
| 6,148,092 A | 11/2000 | Qian | |
| 6,151,073 A | 11/2000 | Steinberg et al. | |
| 6,188,777 B1 | 2/2001 | Darrell et al. | |
| 6,192,149 B1 | 2/2001 | Eschbach et al. | |
| 6,205,245 B1 | 3/2001 | Yuan et al. | |
| 6,249,315 B1 | 6/2001 | Holm | |
| 6,263,113 B1 | 7/2001 | Abdel-Mottaleb et al. | |
| 6,268,939 B1 | 7/2001 | Klassen et al. | |
| 6,282,317 B1 | 8/2001 | Luo et al. | |
| 6,301,370 B1 | 10/2001 | Steffens et al. | |
| 6,332,033 B1 | 12/2001 | Qian | |
| 6,393,148 B1 | 5/2002 | Bhaskar | |
| 6,404,900 B1 | 6/2002 | Qian et al. | |
| 6,407,777 B1 | 6/2002 | DeLuca | |
| 6,421,468 B1 | 7/2002 | Ratnakar et al. | |
| 6,438,264 B1 | 8/2002 | Gallagher et al. | |
| 6,456,732 B1 | 9/2002 | Kimbell et al. | |
| 6,459,436 B1 | 10/2002 | Kumada et al. | |
| 6,463,173 B1 | 10/2002 | Tretter | |
| 6,473,199 B1 | 10/2002 | Gilman et al. | |
| 6,501,857 B1 | 12/2002 | Gotsman et al. | |
| 6,504,942 B1 | 1/2003 | Hong et al. | |
| 6,504,951 B1 | 1/2003 | Luo et al. | |
| 6,516,154 B1 | 2/2003 | Parulski et al. | |
| 6,526,161 B1 | 2/2003 | Yan | |
| 6,535,636 B1 | 3/2003 | Savakis et al. | |
| 6,654,506 B1 | 11/2003 | Luo et al. | |
| 6,658,139 B1 | 12/2003 | Coolcingham et al. | |
| 6,940,545 B1 | 9/2005 | Ray et al. | |
| 7,110,575 B2 | 9/2006 | Chen et al. | |
| 7,260,587 B2 | 8/2007 | Testa et al. | |
| 7,315,630 B2 | 1/2008 | Steinberg et al. | |
| 7,317,815 B2 | 1/2008 | Steinberg et al. | |
| 7,382,915 B2 | 6/2008 | Bala et al. | |
| 7,432,939 B1 | 10/2008 | Platzer et al. | |
| 7,432,952 B2 | 10/2008 | Fukuoka | |
| 7,466,844 B2 | 12/2008 | Ramaswamy et al. | |
| 7,466,866 B2 | 12/2008 | Steinberg | |
| 7,508,961 B2 | 3/2009 | Chen et al. | |
| 7,529,390 B2 | 5/2009 | Zhang et al. | |
| 7,557,969 B2 | 7/2009 | Sone | |
| 7,620,270 B2 | 11/2009 | Matraszek et al. | |
| 7,664,319 B2 | 2/2010 | Toyoda et al. | |
| 7,702,148 B2 | 4/2010 | Hayaishi | |
| 7,702,185 B2 | 4/2010 | Keating et al. | |
| 7,706,606 B1 | 4/2010 | Ruzon et al. | |
| 7,742,083 B2 | 6/2010 | Fredlund et al. | |
| 7,945,116 B2 | 5/2011 | Curtis | |
| 7,961,908 B2 * | 6/2011 | Tzur .................... | G06K 9/3208 382/103 |
| 8,121,431 B2 | 2/2012 | Hwang et al. | |
| 8,131,118 B1 | 3/2012 | Jing et al. | |
| 8,224,051 B2 | 7/2012 | Chen et al. | |
| 8,228,560 B2 | 7/2012 | Hooper | |
| 8,244,053 B2 | 8/2012 | Steinberg et al. | |
| 8,265,348 B2 | 9/2012 | Steinberg et al. | |
| 8,265,393 B2 | 9/2012 | Tribelhorn et al. | |
| 8,285,067 B2 | 10/2012 | Steinberg et al. | |
| 8,345,106 B2 * | 1/2013 | Nijemcevic .......... | G06K 9/3216 348/207.1 |
| 8,345,984 B2 | 1/2013 | Ji et al. | |
| 8,355,566 B2 | 1/2013 | Ng | |
| 8,406,515 B2 | 3/2013 | Cheatle | |
| 8,437,543 B2 | 5/2013 | Chamaret et al. | |
| 8,467,606 B2 * | 6/2013 | Barton .................... | G06T 7/181 382/173 |
| 8,494,264 B2 | 7/2013 | Boncyk et al. | |
| 8,558,921 B2 | 10/2013 | Walker et al. | |
| 8,560,604 B2 | 10/2013 | Shribman et al. | |
| 8,570,433 B1 * | 10/2013 | Goldberg ............. | H04N 5/2354 348/222.1 |
| 8,587,726 B2 * | 11/2013 | Huang .................. | G06T 3/4007 348/576 |
| 8,594,419 B2 | 11/2013 | Majewicz et al. | |
| 8,649,606 B2 | 2/2014 | Zhao et al. | |
| 8,660,351 B2 | 2/2014 | Tang | |
| 8,675,966 B2 | 3/2014 | Tang | |
| 8,700,626 B2 | 4/2014 | Bedingfield | |
| 8,705,849 B2 | 4/2014 | Prokhorov | |
| 8,774,528 B2 | 7/2014 | Hibino et al. | |
| 8,873,865 B2 | 10/2014 | Sung | |
| 8,971,617 B2 | 3/2015 | Ubillos et al. | |
| 9,418,319 B2 * | 8/2016 | Shen ...................... | G06K 9/66 |
| 2005/0276323 A1 | 12/2005 | Martemyanov et al. | |
| 2007/0154067 A1 | 7/2007 | Laumeyer et al. | |
| 2007/0172128 A1 | 7/2007 | Hirao | |

(56) References Cited

U.S. PATENT DOCUMENTS

| | | | |
|---|---|---|---|
| 2008/0129835 A1* | 6/2008 | Chambers | G06F 17/30244 348/231.2 |
| 2008/0260291 A1 | 10/2008 | Alakarhu et al. | |
| 2009/0016644 A1 | 1/2009 | Kalevo et al. | |
| 2009/0252373 A1 | 10/2009 | Paglieroni et al. | |
| 2010/0268772 A1 | 10/2010 | Romanek et al. | |
| 2010/0290705 A1 | 11/2010 | Nakamura | |
| 2011/0002506 A1 | 1/2011 | Ciuc et al. | |
| 2011/0188708 A1 | 8/2011 | Ahn et al. | |
| 2012/0086847 A1 | 4/2012 | Foster | |
| 2012/0087579 A1 | 4/2012 | Guerzhoy et al. | |
| 2012/0166582 A1 | 6/2012 | Binder | |
| 2012/0182447 A1 | 7/2012 | Gabay | |
| 2012/0213445 A1 | 8/2012 | Luu et al. | |
| 2012/0249768 A1 | 10/2012 | Binder | |
| 2012/0278705 A1 | 11/2012 | Yang et al. | |
| 2013/0044951 A1 | 2/2013 | Cherng et al. | |
| 2013/0050507 A1 | 2/2013 | Syed et al. | |
| 2013/0063538 A1 | 3/2013 | Hubner et al. | |
| 2013/0121595 A1 | 5/2013 | Kawatani et al. | |
| 2013/0135689 A1 | 5/2013 | Shacham et al. | |
| 2013/0156320 A1 | 6/2013 | Fredembach | |
| 2013/0216131 A1 | 8/2013 | Free et al. | |
| 2013/0335575 A1 | 12/2013 | Tsin et al. | |
| 2014/0050367 A1 | 2/2014 | Chen et al. | |
| 2014/0176612 A1 | 6/2014 | Tamura et al. | |
| 2014/0185958 A1 | 7/2014 | Hobbs et al. | |
| 2014/0300758 A1 | 10/2014 | Tran | |
| 2014/0307980 A1 | 10/2014 | Hilt | |
| 2015/0169989 A1 | 6/2015 | Bertelli et al. | |

FOREIGN PATENT DOCUMENTS

| | | |
|---|---|---|
| JP | 2006050494 A | 2/2006 |
| JP | 2007208922 A | 8/2007 |
| JP | 2008033200 A | 2/2008 |
| WO | 2008/043204 | 4/2008 |
| WO | 2013044983 A1 | 4/2013 |
| WO | 2013/089693 A1 | 6/2013 |
| WO | 2014/092741 A1 | 6/2014 |
| WO | 2015/017855 A1 | 2/2015 |

OTHER PUBLICATIONS

Cisco Systems, Inc. Publication No. 1-587005-001-3 (Jun. 1999), "Internetworking Technologies Handbook", Chapter 7: "Ethernet Technologies", pp. 7-1 to 7-38 (38 pages).

Standard Microsystems Corporation (SMSC) data-sheet "LAN91C111 10/100 Non-PCI Ethernet Single Chip MAC+PHY" Data-Sheet, Rev. 15 (Feb. 20, 2004) (127 pages).

Robert D. Doverspike, K.K. Ramakrishnan, and Chris Chase, "Guide to Reliable Internet Services and Applications", Chapter 2: "Structural Overview of ISP Networks", published 2010 (ISBN: 978-1-84882-827-8) (76 pages).

Al Bovik, "Handbook of Image & Video Processing", by Academic Press, ISBN: 0-12-119790-5, 2000 (800 pages).

Tinku Acharya and Ajoy K. Ray, "Image Processing—Principles and Applications", published by Wiley-Interscience, ISBN13 978-0-471-71998-4 (2005) (451 pages).

International Search Report of PCT/US2015/051161 dated Mar. 18, 2016.

Alex Krizhevsky, Ilya Sutskever, and Geoffrey E. Hinton (all of University of Toronto), "ImageNet Classification with Deep Convolutional Neural Networks", May 18, 2015 (35 pages).

ImageNet presentation by Fei-Fei Li (of Computer Science Dept., Stanford University), "Crowdsourcing, benchmarking, & other cool things", 2010 Stanford Vision Lab (64 pages).

National Information Standards Organization (NISO) Booklet, "Understanding Metadata" (ISBN: 1-880124-62-9) (20 pages).

IETF RFC 5013, "The Dublin Core Metadata Element Set", Aug. 2007 (9 pages).

IETF RFC 2731, "Encoding Dublin Core Metadata in HTML", Dec. 1999 (22 pages).

Marko Tkalcic and Jurij F. Tasic of the University of Ljubljana, Slovenia, "Colour spaces—perceptual, historical and applicational background" (5 pages).

Andrew Oran and Vince Roth, "Color Space Basics" published May 2012, Issue 4 of the journal 'The Tech Review' by the Association of Moving Image Archivists (22 pages).

Adrian Ford and Alan Roberts, "Colour Space Conversions", Aug. 11, 1998 (31 pages).

Philippe Colantoni and Al, "Color Space Transformations", dated 2004 (28 pages).

Danny Pascale, "A Review of RGB Color Spaces . . . from xyY to R'G'B'", published by The BabelColor Company, (Revised Oct. 6, 2003) (35 pages).

Gnanatheja Rakesh and Sreenivasulu Reddy of the University College of Engineering, Tirupati, "YCoCg color Image Edge detection", International Journal of Engineering Research and Applications (IJERA) ISSN: 2248-9622 vol. 2, Issue 2, Mar.-Apr. 2012, pp. 152-156 (5 pages).

Douglas A. Kerr, "The HSV and HSL Color Models and the Infamous Hexcones", Issue 3, May 12, 2008 (30 pages).

Joseph Ciaglia et al., "Absolute Beginner's Guide to Digital Photography", Que Publishing (ISBN—0-7897-3120-7), published on Apr. 2004 (381 pages).

UPDIG Photographic Guidelines, "Universal Photographic Digital Imaging Guidelines v 4.0", downloaded Jun. 2015 (40 pages).

Daniel Kormann, Peter Dunker, and Ronny Paduscheck, all of the Fraunhofer Institute for Digital Media in Ilmenau, Germany, "Automatic Rating and Selection of Digital Photographs", Springer-Verlag Berlin Heidelberg 2009 (4 pages).

Dilip K. Prasad, "Survey of the Problem of Object Detection in Real Images" published International Journal of Image Processing (IJIP), vol. 6, Issue 6—2012 (26 pages).

A. Ashbrook and N. A. Thacker, "Tutorial: Algorithms for 2-dimensional Object Recognition", published by the Imaging Science and Biomedical Engineering Division of the University of Manchester, Tina Memo No. 1996-003, Jan. 12, 1998 (15 pages).

Computer Vision: Mar. 2000 Chapter 4 entitled: "Pattern Recognition Concepts" (38 pages).

Isabelle Guyon, et al., "Hands-on Pattern Recognition—Challenges in Machine Learning, vol. 1", published by Microtome Publishing, 2011 (ISBN-13:978-0-9719777-1-6) (482 pages).

Paul Viola and Michael Jones, "Robust Real-Time Face Detection", International Journal of Computer Vision 2004 pp. 137-154 (18 pages).

Paul Viola and Michael Jones, "Rapid Object Detection using a Boosted Cascade of Simple Features", Accepted conference on Computer Vision and Pattern Recognition 2001 (9 pages).

Djemel Ziou (of Universite de Sherbrooke, Quebec, Canada) and Salvatore Tabbone (of Crin-Cnrs/Inria Lorraine, Nancy, France), "Edge Detection Techniques—An Overview", (downloaded Jul. 2015) (41 pages).

G. T. Shrivakshan (of Bharathiar University, Tamilnadu, India) and Dr. C. Chandrasekar (of Periyar University Salem, Tamilnadu, India), "A Comparison of various Edge Detection Techniques used in Image Processing", international Journal of Computer Science Issues (IJCSI), vol. 9 Issue 5, No. 1, Sep. 2012 pp. 265-276 (8 pages).

Technical report CES-506 by the University of Essex, "A Survey on Edge Detection Methods", (dated Feb. 29, 2010) (36 pages).

Ehsan Nadernejad, Sara Sharifzadeh, and Hamid Hassanpour, "Edge Detection Techniques: Evaluations and Comparisons", Applied Methematical Sciences, vol. 2, 2008, No. 31, 1507-1520 (14 pages).

Tzu-Heng Henry Lee (of National Taiwan University, Taipei, Taiwan, ROC), "Edge Detection Analysis", downloaded Jul. 2015 (25 pages).

Apple Inc. Developer guide, "Quartz 2D Programming Guide", dated Sep. 17, 2014 (221 pages).

John Canny, "A Computational Approach to Edge Detection", IEEE Transaction on Pattern Analysis and Machine Intelligence, vol. PAMI-8, No. 6, Nov. 1986 (20 pages).

(56) References Cited

OTHER PUBLICATIONS

A tutorial 09gr820, "Canny Edge Detection", (dated Mar. 23, 2009) (7 pages).
R. Kimmel and A. M. Bruckstein (of the Technion, Haifa, Israel), "Regularized Laplacian Zero Crossings as Optimal Edge Integrators", International Journal of Computer Vision 53(3), 225-243, 2003 (19 pages).
Irwin Sobel, "History and Definition of the so-called "Sobel Operator" more appropriately named the Sobel—Feldman Operator", (Updated Jun. 14, 2015) (6 pages).
Guennadi (Henry) Levkine (of Vancouver, Canada), "Prewitt, Sobel, and Scharr gradient 5×5 convolution Matrices", Second Draft, Jun. 2012 (14 pages).
O.R. Voncent and O. Folorunso (both of University of Agriculture, Abeokuta, Nigeria), "A Descriptive Algorithm for Sobel Image Edge Detection", Proceedings of Informing Science & IT Education Conference (InSITE) 2009 (11 pages).
Rachid Deriche (of Inria, Le Chesnay, France), "Using Canny's criteria to Derive a Recursively Implemented Optimal Edge Detector", published in International Journal of Computer Vision, 167-187 (1987) (21 pages).
Presentation by Diane Lingrand (of University of Nice, Sophia Antipolis, France), "Segmentation", dated Aug. 2006 (74 pages).
Technical Note 213 by Martin A. Fischler and Robert C. Bolles, "Random Sample Consensus: A Paradigm for Model Fitting with Applications to Image Analysis and Automated Cartography", SRI International (Menlo Park, California, U.S.A.) (Mar. 1980) (42 pages).
Rafael Grompone von Gioi et al., "On Straight Line Segment Detection", J Math Imaging Vis (DOI 10.1007/s10851-008-0102-5) published by Springer Science+Business Media, LLC 2008 (35 pages).
Kari Haugsdal, "Edge and line detection of complicated and blurred objects", Norwegian University of Science and Technology (NTNU) Master work submitted Jun. 2010 (43 pages).
Rafael Grompone von Gioi et al., "LSD: a Line Segment Detector", published in Image Processing on Line (IPOL) Mar. 24, 2012 (21 pages).
Tan Xi, Zhao Lingjun, and Su Yi (of Nudt, Changsha, China), "Linear Feature Extraction from SAR Images based on the modified LSD Algorithm", International Conference on Remote Sensing, Environment and Transportation Engineering (RSETE 2013) pp. 398-402 (5 pages).
Rafael Grompone von Gioi et al., "LSD: a Line Segment Detector", paper dated Sep. 2011 (15 pages).
J. Illingworth and J. Kittler, "A Survey of the Hough Transform", image Processing 44, 87-116 (1988) (30 pages).
Richard O. Duda and Peter E. Hart (of Stanford Research Institute, Menlo Park, California, U.S.A.), "Use of the Hough Transformation to Detect Lines and Curves in Pictures", Graphics and Image Processing (Association for Computing Machinery, 1972) pp. 11-15 (5 pages).
Chapter 2 of a book "Real-Time detection of Lines and grids" by Herout, A., Dubska, M, and Havel, J., (ISBN: 978-1-4471-4413-7), "Chapter 2—Review of Hough Transform for Line Detection", 2013 (15 pages).
Andres Solis Montero, Milos Stojmenovic, and Amiya Nayak (of the University of Ottawa, Ottawa, Canada), "Robust Detection of Corners and Corner-line links in images", 10th International Conference on Computer and Information Technology (CIT 2010) [978-0-7695-4108-2/10, DOI 10.1109/CIT.2010.109] (8 pages).
Chris Harris and Mike Stephens of the Plessey Company plc., "A Combined Corner and Edge Detector", 1988 [AVC 1988 doi:10.5244/C.2.23] (6 pages).
Les Kitchen and Azriel Rosenfeld (of University of Maryland, College Park, Maryland, U.S.A.) [DARPA TR-887, DAAG-53-76C-0138], "Gray-Level Corner Detection", Apr. 1980 (24 pages).
David Kriesel, "A Brief Introduction to Neural Networks" (ZETA2-EN) [downloaded May 2015 from www.dkriesel.com], (244 pages).

Juan A. Ramirez-Quintana, Mario I. Cacon-Murguia, and F. Chacon-Hinojos, "Artificial Neural Image Processing Applications: A Survey", an article in Engineering Letters, 20:1, EL_20_1_09 (Advance online publication: Feb. 27, 2012) (13 pages).
M. Egmont-Petersen, D. de Ridder, and H. Handels, "Image processing with neural networks—a review", by Pattern Recognition Society in Pattern Recognition 35 (2002) 2279-2301 (23 pages).
Christian Szegedy, Alexander Toshev, and Dumitru Erhan, "Deep Neural Networks for Object Detection", of Google, Inc. (downloaded Jul. 2015) (9 pages).
Dumitru Erhan, Christian Szegedy, Alexander Toshev, and Dragomir Anguelov (of Google, Inc., Mountain-View, California, U.S.A.), "Scalable Object Detection using Deep Neural Networks", a CVPR2014 paper provided by the Computer Vision Foundation (downloaded Jul. 2015) (8 pages).
Shawn McCann and Jim Reesman (both of Stanford University), "Object Detection using Convolutional Neural Networks" (downloaded Jul. 2015) (5 pages).
Mehdi Ebady Manaa, Nawfal Turki Obies, and Dr. Tawfiq A. Al-Assadi (of Department of Computer Science, Babylon University), "Object Classification using neural networks with Gray-level Co-occurrence Matrices (GLCM)", (downloaded Jul. 2015) (9 pages).
Dan C. Ciresan et al., "High-Performance Neural Networks for Visual Object Classification", a technical report No. IDSIA-01-11 Jan. 2011 published by IDSIA/USI-SUPSI (12 pages).
Yuhua Zheng et al. "Object Recognition using Neural Networks with Bottom-Up and top-Down Pathways" (downloaded Jan. 2015) (13 pages).
Karen Simonyan, Andrea Vedaldi, and Andrew Zisserman (all of Visual Geometry Group, University of Oxford), "Deep Inside Convolutional Networks: Visualising Image Classification Models and Saliency Maps" Apr. 19, 2014, (8 pages).
Tiike Judd, Frado Durand, and Antonio Torralba, "Supplemental Material for a Benchmark of Computational Models of Saliency to Predict Human Fixations", (2012) (7 pages).
R. Achanta, F. Estrada, P. Wils, and S. Susstrunk (of I&C EPFL), "Salient Region Detection and Segmentation", a ICVS article (pp. 66-75. Springer, 2008. 410, 412, 414) (10 pages).
R. Achanta, S. Hemami, F. Estrada, and S. Susstrunk, "Frequency-tuned Salient Region Detection", in a CVPR article (pp. 1597-1604, 2009. 409, 410, 412, 413, 414, 415) (8 pages).
L. Itti, C. Koch, and E. Niebur, "A Model of Saliency based Visual Attention for Rapid Scene Analysis", IEEE article (TPAMI, 20(11):1254-1259, 1998. 409, 410, 412, 414) (5 pages).
S. Goferman, L. Zelnik-Manor, and A. Tal (all of the Technion, Haifa, Israel), "Context-Aware Saliency Detection", a CVPR article (2010. 410, 412, 413, 414, 415) (8 pages).
MM Cheng, GX Zhang, N. J. Mitra, X. Huang, S.M. Hu, "Global Contrast based Salient Region Detection", a CVPR article (2011) (8 pages).
Fei-Fei Li and Olga Russakovsky (ICCV 2013), "Analysis of large Scale Visual Recognition", (60 pages).
image-net.org/download-API, 2014 Stanford Vision Lab (3 pages).
Tinku Acharya and Ping-Sing Tsai, "Computational Foundations of Image Interpolation Algorithms", ACM Ubiquity vol. 8, 2007 (17 pages).
Sudhir Sharma and Robin Walia (of Maharishi Markandeshwar University, Mullana, India), "Zooming Digital Images using Modal Interpolation", International Journal of Application or Innovation in Engineering & Management (IJAIEM) vol. 2, Issue 5, May 2013, pp. 305-310 (6 pages).
Jonathan Sachs, "Image Resampling", Digital Light & Color (2001) (14 pages).
Ken Turkowski and Steve Gabriel, "Filters for Common Resampling Tasks", Graphics Gems I [Academic Press, pp. 147-165 (Apr. 1990) (14 pages).
Gawain Weaver (of Image Permanence Institute, Rochester Institute of Technology), "A Guide to Fiber-Base Gelatin Silver Print Condition and Deterioration" published 2008 (41 pages).
Jonathan Sachs, "Color Balancing Techniques", Digital Light & Color (1999) (13 pages).

(56) References Cited

OTHER PUBLICATIONS

Francesca Gasparini and Raimondo Schettini (of Universita degli Studi di Milano-Bicocca, Milano, Italy), "Color Balancing of Digital Photos Using Simple Image Statistics" (downloaded Jul. 2015) (39 pages).

Alexis Van Hurkman, "Color Correction Handbook: Professional Techniques for Video and Cinema, Second Edition", published 2014 by Peachpit Press [ISBN—13: 978-0-321-92966-2] (15 pages).

Yao Wang (of Polytechnic University, Brooklyn, NY) "EL5123—Image Processing—Contrast Enhancement", downloaded Jul. 2015 (46 pages).

S. Gayathri, N. Mohanapriya, and Dr. B. Kalaavathi (all of Tiruchengode, Namakkal, India), "Survey on Contrast Enhancement Techniques", published on International Journal of Advanced Research in Computer and Communication Engineering, vol. 2, Issue 11, Nov. 2013 (5 pages).

Manpreet Kaur, Jasdeep Kaur, and Jappreet Kaur (of Guru Nanak Engineering College, Ludhiana, India), "Survey of Contrast Enhancement Techniques based on Histogram Equalization", published on International Journal of Advanced Computer Science and Applications (IJACSA) vol. 2, No. 7, 2011, pp. 137-141 (5 pages).

Sandeep Singh and Sandeep Sharma (of Gndu, Amristar), "A Survey of Image Enhancement Techniques", published on International Journal of Computer Science (IIJCS) vol. 2, Issue 5, May 2014, pp. 1-5 (5 pages).

Mr. Salem Saleh Al-amri et al., "Linear or Non-Linear Contrast Enhancement Image", published on International Journal of Computer Science and Network Security (IJCSNS) vol. 10 No. 2, Feb. 2010 pp. 139-143 (5 pages).

www.scancafe.com/services/photo-scanning (preceded by http://) downloaded Jul. 2015 (3 pages).

www.everpresentonline.com/services/photo-scanning-to-digital (preceded by http://) downloaded Jul. 2015 (18 pages).

www.forever.com/features (preceded by https://) downloaded Jul. 2015 (13 pages).

www.imemories.com/features (preceded by http://) downloaded Jul. 2015 (6 pages).

Chapter 6, "Eigenvalues and Eigenvectors" (pp. 283-297) of a 4th Edition book published 2009 by Wellesley-Cambridge Press and SIAM, and authored by Gilbert Strang, "Introduction to Linear Algebra" (15 pages).

* cited by examiner

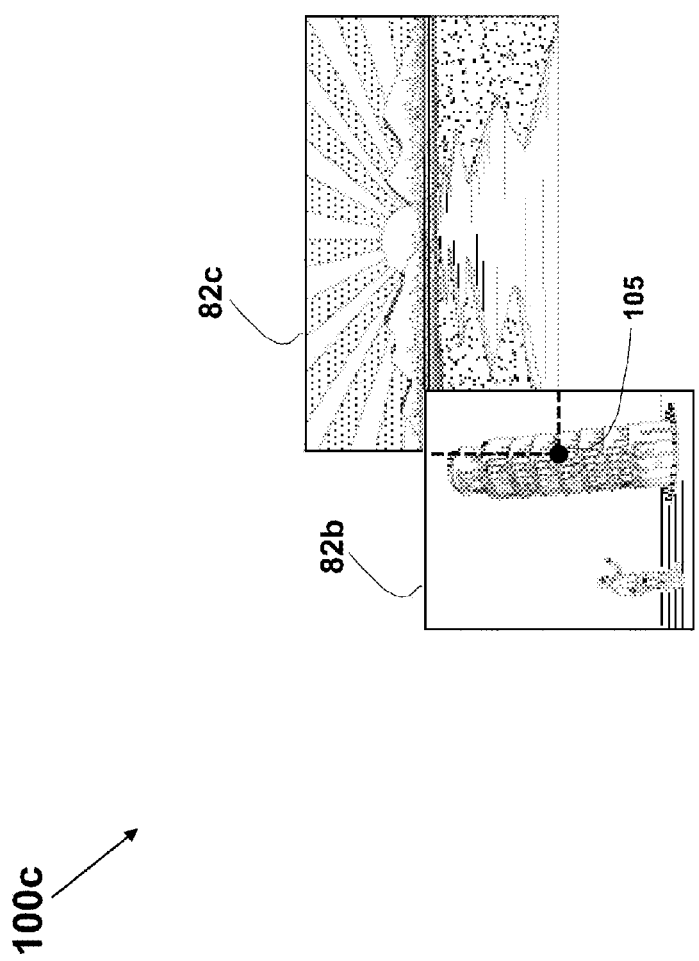

FIG. 14

Matrix 140, $A =$

|  | 142a | 142b | 142c | 142d | 142e | 142f | 142g | 142h | 142i | 142j |
|---|---|---|---|---|---|---|---|---|---|---|
| 141a → | 9.3 | 0 | 1 | 1 | 1 | 1 | 0 | 1 | 1 | 1 |
| 141b → | 0 | 9.3 | 1 | 1 | 1 | 0 | 1 | 1 | 1 | 1 |
| 141c → | 1 | 1 | 9.3 | 0 | 1 | 1 | 0 | 1 | 0 | 0 |
| 141d → | 1 | 1 | 0 | 9.3 | 1 | 1 | 0 | 1 | 0 | 0 |
| 141e → | 1 | 1 | 1 | 1 | 7.2 | 0 | 0 | 0 | 1 | 1 |
| 141f → | 1 | 1 | 1 | 1 | 0 | 7.2 | 0 | 0 | 1 | 1 |
| 141g → | 0 | 0 | 0 | 0 | 0 | 0 | 4.4 | 0 | 0 | 0 |
| 141h → | 1 | 1 | 1 | 1 | 0 | 0 | 0 | 3.6 | 1 | 1 |
| 141i → | 1 | 1 | 0 | 0 | 1 | 1 | 0 | 1 | 3.6 | 0 |
| 141j → | 1 | 1 | 0 | 0 | 1 | 1 | 0 | 1 | 0 | 3.6 |

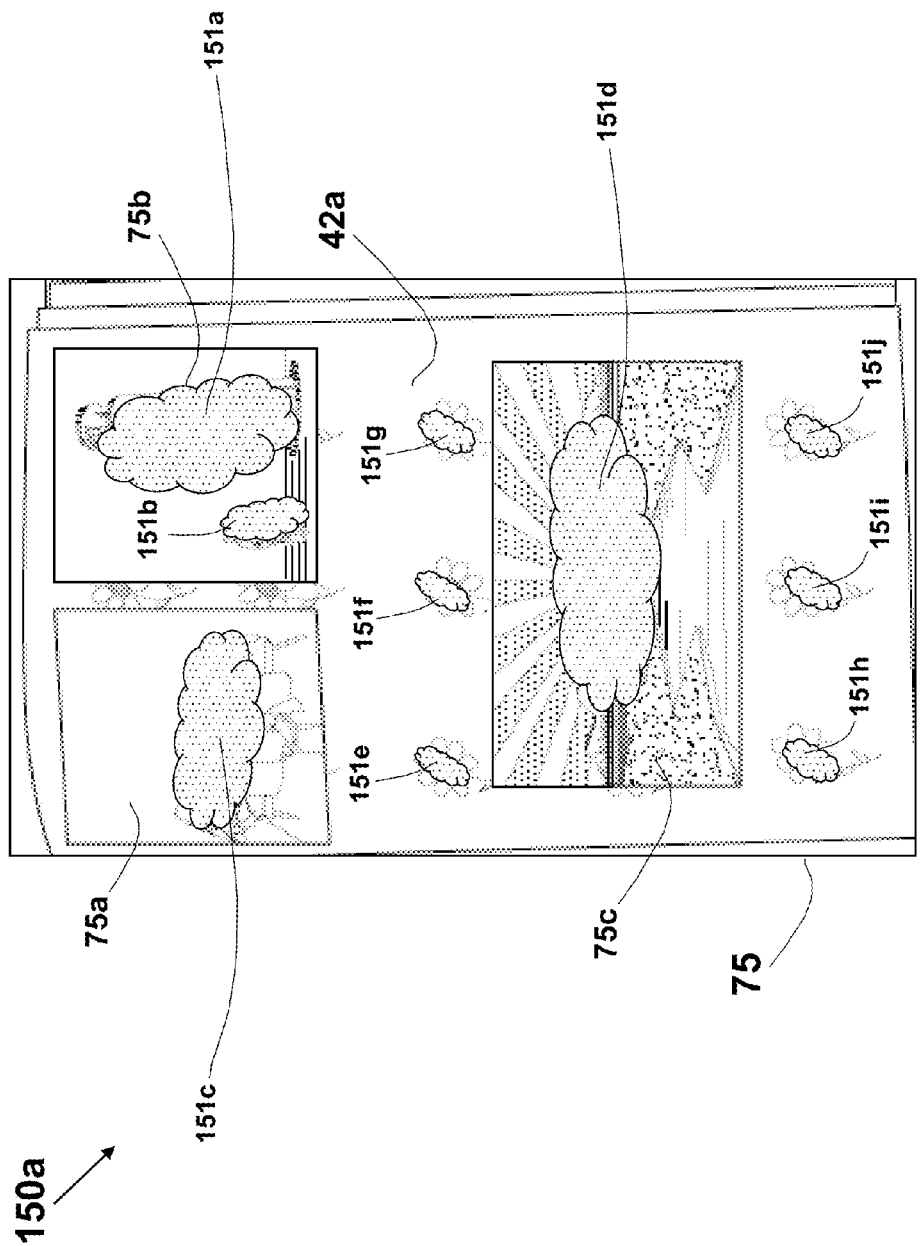

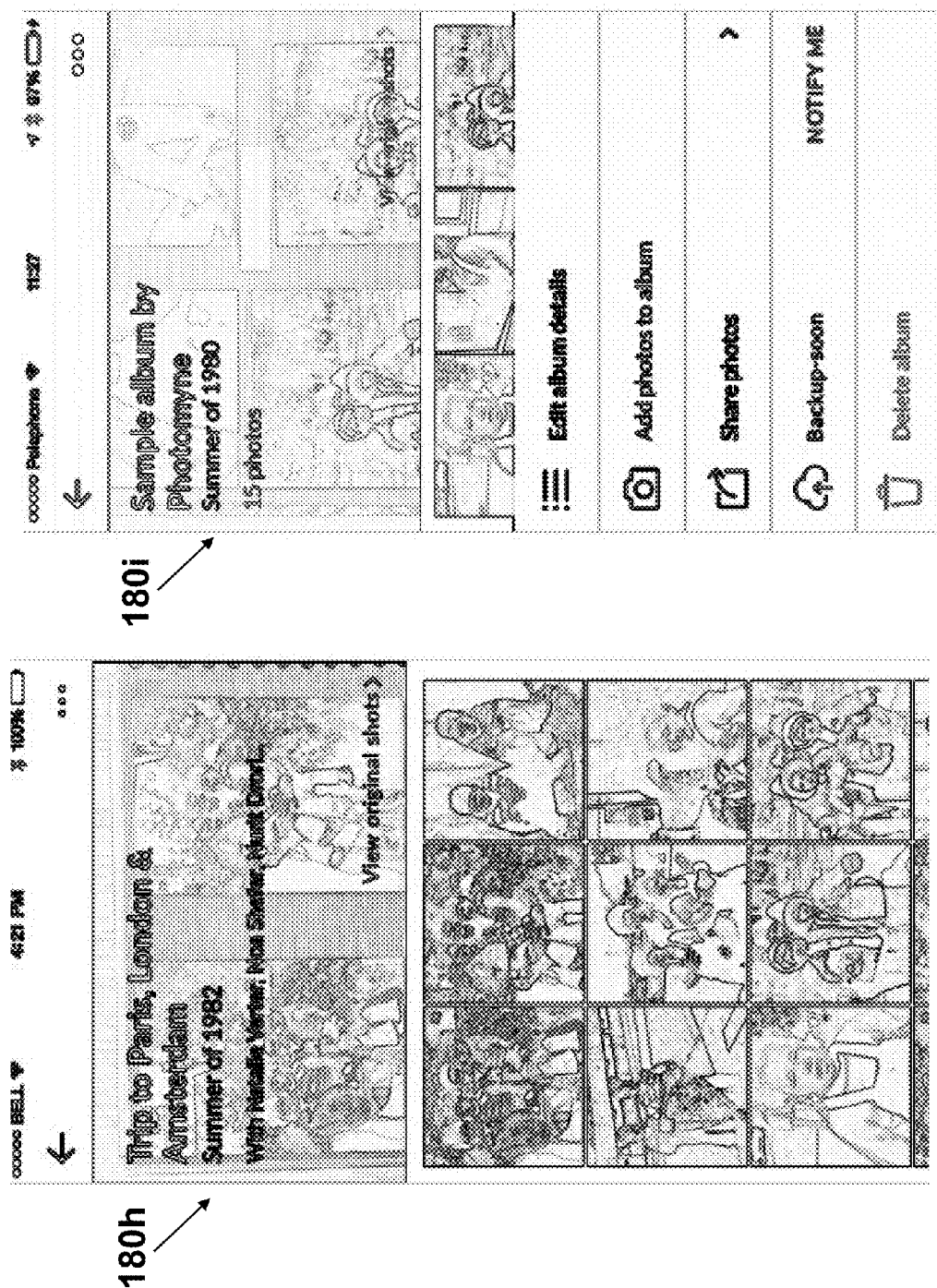

SYSTEM AND METHOD FOR DETECTING OBJECTS IN AN IMAGE

CROSS-REFERENCES TO RELATED APPLICATIONS

The present application is a continuation of International Application PCT/IL2015/051161, with an international filing date of Nov. 29, 2015, which claims priority from U.S. Provisional Patent Application No. 62/182,652 filed on Jun. 22, 2015 and from U.S. Provisional Patent Application No. 62/202,870 filed Aug. 9, 2015, all of which are incorporated herein by reference in their entirety for all purposes.

TECHNICAL FIELD

This disclosure generally relates to an apparatus and a method for detecting and handling objects in an image, and in particular for capturing, digitizing, organizing, storing, detecting, or arranging images of photos such as in a photo album.

BACKGROUND

Unless otherwise indicated herein, the materials described in this section are not prior art to the claims in this application and are not admitted to be prior art by inclusion in this section.

FIG. 1 shows a block diagram that illustrates a system 10 including a computer system 11 and an associated Internet 22 connection. Such a configuration is typically used for computers (hosts) connected to the Internet 22 and executing a server or a client (or a combination) software. The computer system 11 may be part of or may be used as a portable electronic device such as a notebook/laptop computer, a media player (e.g., MP3 based or a video player), a desktop computer, a laptop computer, a cellular phone, a Personal Digital Assistant (PDA), an image processing device (e.g., a digital camera or a video recorder), any other handheld or fixed location computing devices, or a combination of any of these devices. Note that while FIG. 1 illustrates various components of the computer system 11, it is not intended to represent any particular architecture or manner of interconnecting the components. Further, apart from the devices mentioned above, other electronic devices such as network computers, handheld computers, cell phones and other data processing systems that have fewer components or perhaps more components may also be used. For example, the computer of FIG. 1 may be an Apple Macintosh computer or a Power Book, or an IBM compatible PC. The computer system 11 may include a bus 13, an interconnect, or other communication mechanism for communicating information, and a processor 12, commonly in the form of an integrated circuit, coupled to the bus 13 for processing information and for executing the computer executable instructions. The computer system 11 may also include a main memory 15a, such as a Random Access Memory (RAM) or any other dynamic storage device, coupled to the bus 13 for storing information and instructions to be executed by the processor 12. The main memory 15a may also be used for storing temporary variables or other intermediate information during execution of the instructions to be executed by the processor 12. The computer system 11 further includes a Read Only Memory (ROM) 15b (or any other non-volatile memory) or other static storage device coupled to the bus 13 for storing static information and instructions for the processor 12. A storage device 15c that may be a magnetic disk or an optical disk, such as a hard disk drive (HDD) for reading from and writing to a hard disk, a magnetic disk drive for reading from and writing to a magnetic disk, and/or an optical disk drive (such as DVD) for reading from and writing to a removable optical disk, is coupled to the bus 13 for storing information and instructions. The hard disk drive, magnetic disk drive, or optical disk drive may be connected to the system bus 13 by a hard disk drive interface, a magnetic disk drive interface, or an optical disk drive interface, respectively. The drives and their associated computer-readable media provide non-volatile storage of computer readable instructions, data structures, program modules and other data for the general-purpose computing devices. Typically, the computer system 11 includes an Operating System (OS) stored in a non-volatile storage 15b for managing the computer resources. The operating system provides the applications and programs with an access to the computer resources and interfaces. The operating system commonly processes system data and user inputs, and responds by allocating and managing tasks and internal system resources, such as controlling and allocating memory, prioritizing system requests, controlling input and output devices, facilitating networking, and managing files. Non-limiting examples of operating systems are Microsoft Windows, Mac OS X, and Linux.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display 17 may be connected via a video adapter, and allows a user to view, enter, and/or edit information that is relevant to the operation of the system 10. An input device 18, including alphanumeric and other keys, is coupled to the bus 13 for communicating information and command selections to the processor 12. Another type of input device is a cursor control 18a, such as a mouse, a trackball, or cursor direction keys for communicating direction information and command selections to the processor 12 and for controlling cursor movement on the display 17. This cursor control 18a typically has two degrees of freedom in two axes, a first axis (e.g., x) and a second axis (e.g., y), that allows the device to specify positions in a plane.

The computer system 11 may be used for implementing the methods and techniques described herein. According to one embodiment, these methods and techniques are performed by the computer system 11 in response to the processor 12 executing one or more sequences of one or more instructions contained in the main memory 15a. Such instructions may be read into the main memory 15a from another computer-readable medium, such as the storage device 15c. Execution of the sequences of instructions contained in the main memory 15a causes the processor 12 to perform the process steps described herein. In alternative embodiments, hard-wired circuitry may be used in place of or in combination with software instructions to implement the arrangement. Thus, embodiments of the present invention are not limited to any specific combination of hardware circuitry and software.

The term "processor" is used herein to include, but not limited to, any integrated circuit or any other electronic device (or collection of electronic devices) capable of performing an operation on at least one instruction, including, without limitation, a microprocessor (μP), a microcontroller (μC), a Digital Signal Processor (DSP), or any combination thereof. A processor, such as the processor 12, may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor 12 may either be integrated onto a single substrate (e.g., silicon "die"), or distributed among two or more substrates. Furthermore, various functional aspects of the processor 12 may be implemented solely as a software (or firmware) associated with the processor 12.

A memory can store computer programs or any other sequence of computer readable instructions, or data, such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in a form of an Integrated Circuit (IC, a.k.a. chip or microchip). Alternatively or in addition, a memory may be in the form of a packaged functional assembly of electronic components (module). Such module may be based on a Printed Circuit Board (PCB) such as PC Card according to Personal Computer Memory Card International Association (PCMCIA) PCMCIA 2.0 standard, or a Single In-line Memory Module (SIMM) or a Dual In-line Memory Module (DIMM), standardized under the JEDEC JESD-21C standard. Further, a memory may be in the form of a separately rigidly enclosed box such as an external Hard-Disk Drive (HDD). A capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote Giga=$2^{30}$=$1024^3$=1,073,741,824, and the prefix 'T' is used to denote tera=$2^{40}$=$1024^4$=1,099,511,627,776.

Various forms of computer-readable media may be involved in carrying one or more sequences of one or more instructions to the processor 12 for execution. For example, the instructions may initially be carried on a magnetic disk of a remote computer. The remote computer may load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal, and appropriate circuitry can place the data on the bus 13. The bus 13 carries the data to the main memory 15a, from where the processor 12 retrieves and executes the instructions. The instructions received by the main memory 15a may optionally be stored on the storage device 15c either before or after execution by the processor 12.

The computer system 11 commonly includes a communication interface 9 coupled to the bus 13. The communication interface 9 provides a two-way data communication coupling to a network link 8 that is connected to a Local Area Network (LAN) 14. For example, the communication interface 9 may be an Integrated Services Digital Network (ISDN) card or a modem to provide a data communication connection to a corresponding type of telephone line. As another non-limiting example, the communication interface 9 may be a Local Area Network (LAN) card to provide a data communication connection to a compatible LAN. For example, Ethernet-based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002 as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 99), "*Internetworking Technologies Handbook*", Chapter 7: "*Ethernet Technologies*", pages 7-1 to 7-38, which is incorporated in its entirety for all purposes as if fully set forth herein. In such a case, the communication interface 9 typically includes a LAN transceiver or a modem, such as a Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+PHY*" Data-Sheet, Rev. 15 (Feb. 20, 2004), which is incorporated in its entirety for all purposes as if fully set forth herein.

An Internet Service Provider (ISP) 16 is an organization that provides services for accessing, using, or otherwise utilizing the Internet 22. The Internet Service Provider 16 may be organized in various forms, such as commercial, community-owned, non-profit, or otherwise privately owned. Internet services, typically provided by ISPs, include Internet access, Internet transit, domain name registration, web hosting, and co-location. Various ISP Structures are described in Chapter 2: "*Structural Overview of ISP Networks*" of the book entitled: "*Guide to Reliable Internet Services and Applications*", by Robert D. Doverspike, K. K. Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It provides email servers to send, receive, accept, and store email for end users or other organizations. Internet hosting services provide email, web-hosting or online storage services. Other services include virtual server, cloud services, or physical server operation. A virtual ISP (VISP) is an operation that purchases services from another ISP, sometimes called a wholesale ISP in this context, which allow the VISP's customers to access the Internet using services and infrastructure owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHz, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (IXs), allowing routing of data between each network, without charging one another for the data transmitted—data that would otherwise have passed through a third upstream ISP, incurring charges from the upstream ISP. ISPs that require no upstream and have only customers (end customers and/or peer ISPs) are referred to as Tier 1 ISPs.

An arrangement 10a of a computer system connected to the Internet 22 is shown in FIG. 2. A computer system or a workstation 7 is shown, including a main unit box 6, which encloses a motherboard on which the processor 12 and the memories 15a, 15b, and 15c are typically mounted. The workstation 7 may further include a keyboard 2 (corresponding to the input device 18), a printer 4, a computer mouse 3 (corresponding to the cursor control 18a), and a display 5 (corresponding to the display 17). FIG. 2 further illustrates various devices connected via the Internet 22, such as a client device #1 24, a client device #2 24a, a data server #1

23a, a data server #2 23b, and the workstation 7, connected to the Internet 22 over a LAN 14 and via a router or a gateway 19 and the ISP 16.

The client device #1 24 and the client device #2 24a may communicate over the Internet 22 for exchanging or obtaining data from the data server #1 23a and the data server #2 23b. In one example, the servers are HTTP servers, sometimes known as web servers. A method describing a more efficient communication over the Internet is described in U.S. Pat. No. 8,560,604 to Shribman et al., entitled: "System and Method for Providing Faster and More Efficient Data Communication" (hereinafter the '604 Patent'), which is incorporated in its entirety for all purposes as if fully set forth herein. A splitting of a message or a content into slices, and transferring each of the slices over a distinct data path is described in U.S. Patent Application No. 2012/0166582 to Binder entitled: "System and Method for Routing-Based Internet Security", which is incorporated in its entirety for all purposes as if fully set forth herein.

The term "computer-readable medium" (or "machine-readable medium") is used herein to include, but not limited to, any medium or any memory, that participates in providing instructions to a processor, (such as the processor 12) for execution, or any mechanism for storing or transmitting information in a form readable by a machine (e.g., a computer). Such a medium may store computer-executable instructions to be executed by a processing element and/or control logic, and data, which is manipulated by a processing element and/or control logic, and may take many forms, including but not limited to, non-volatile medium, volatile medium, and transmission medium. Transmission media includes coaxial cables, copper wire and fiber optics, including the wires that comprise the bus 13. Transmission media may also take the form of acoustic or light waves, such as those generated during radio-wave or infrared data communications, or other form of propagating signals (e.g., carrier waves, infrared signals, digital signals, etc.). Common forms of computer-readable media include a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 12 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 15a, from which the processor 12 retrieves and executes the instructions. The instructions received by the main memory 15a may optionally be stored on the storage device 15c either before or after execution by the processor 12.

Operating system. An Operating System (OS) is a software that manages computer hardware resources and provides common services to various computer programs. The operating system is an essential component of any system software in a computer system, and most application programs usually require an operating system to function. For hardware functions such as input/output and memory allocation, the operating system acts as an intermediary between programs and the computer hardware, although the application code is usually executed directly by the hardware and frequently makes a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

A camera 30 shown in FIG. 3 may be a digital still camera that converts captured image into an electric signal upon a specific control, or may be a video camera, wherein the conversion between captured images to the electronic signal is continuous (e.g., 24 frames per second). The camera 30 is preferably a digital camera, where the video or still images are converted using an electronic image sensor 32. The digital camera 30 includes a lens 31 (or few lenses) for focusing the received light onto a small semiconductor image sensor 32. The image sensor 32 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor may be used, available from Image Sensor Solutions, Eastman Kodak Company, Rochester, N.Y.

An image processor block 33 receives the analog signal from the image sensor 32. An Analog Front End (AFE) in the block 33 filters, amplifies, and digitizes the signal, using an analog-to-digital (A/D) converter. The AFE further provides Correlated Double Sampling (CDS) and a gain control to accommodate varying illumination conditions. In the case of a CCD-based sensor 32, a CCD AFE (Analog Front End) component may be used between the digital image processor 33 and the sensor 32. Such an AFE may be based on VSP2560 'CCD Analog Front End for Digital Cameras' from Texas Instruments Incorporated of Dallas, Tex., U.S.A. The block 33 further contains a digital image processor, which receives the digital data from the AFE, and processes this digital representation of the image to handle various industry standards, and to execute various computations and algorithms. Preferably, additional image enhancements may be performed by the block 33 such as generating greater pixel density or adjusting color balance, contrast, and luminance. Further, the block 33 may perform other data management functions and processing on the raw digital image data. Commonly, the timing relationship of the vertical/horizontal reference signals and the pixel clock are also handled in this block. Digital Media System-on-Chip device TMS320DM357 from Texas Instruments Incorporated of Dallas, Tex., U.S.A. is an example of a device implementing on a single chip (and associated circuitry) part or all of the image processor 33, part or all of a video compressor 34 and part or all of a transceiver 35. In addition to a lens or lens system, color filters may be placed between the imaging optics and the photosensor sensor (or array) 32 to achieve desired color manipulation.

The processing block 33 converts the raw data received from the photosensor array 32 (which can be any internal camera format, including before or after Bayer translation) into a color-corrected image in a standard image file format. The camera 30 further comprises a connector 39a, and a transmitter or a transceiver 35 disposed between the connector 39a and the image processor 33. The transceiver 35 includes isolation magnetic components (e.g. transformer-based), balancing, surge protection, and other suitable components required for providing a proper and standard interface via the connector 39a. In the case of connecting to a wired medium, the connector 39a further includes protection circuitry for accommodating transients, over-voltage, and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further a wiring driver and wiring receivers may be used to transmit and receive the appropriate level of signals to and from the wired medium. An equalizer may also be used to compensate for any frequency dependent characteristics of the wired medium.

Other image processing functions performed by the image processor 33 may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

The image processing may further include an algorithm for motion detection by comparing the current image with a reference image and counting the number of different pixels, where the image sensor 32 or the digital camera 30 are assumed to be in a fixed location and thus assumed to capture the same image. Since images naturally differ due to factors such as varying lighting, camera flicker, and CCD dark currents, pre-processing is useful to reduce the number of false positive alarms. Algorithms that are more complex are necessary to detect motion when the camera itself is moving, or when the motion of a specific object must be detected in a field containing another movement that can be ignored.

The image processing may further include video enhancement such as video denoising, image stabilization, unsharp masking, and super-resolution. Further, the image processing may include a Video Content Analysis (VCA), where the video content is analyzed to detect and determine temporal events based on multiple images, and is commonly used for entertainment, healthcare, retail, automotive, transport, home automation, safety and security. The VCA functionalities include Video Motion Detection (VIVID), video tracking, and egomotion estimation, as well as identification, behavior analysis, and other forms of situation awareness. A dynamic masking functionality involves blocking a part of the video signal based on the video signal itself, for example because of privacy concerns. The egomotion estimation functionality involves the determining of the location of a camera or estimating the camera motion relative to a rigid scene, by analyzing its output signal. Motion detection is used to determine the presence of a relevant motion in the observed scene, while an object detection is used to determine the presence of a type of object or entity, for example, a person or car, as well as fire and smoke detection. Similarly, face recognition and Automatic Number Plate Recognition may be used to recognize, and therefore possibly identify persons or cars. Tamper detection is used to determine whether the camera or the output signal is tampered with, and video tracking is used to determine the location of persons or objects in the video signal, possibly with regard to an external reference grid. A pattern is defined as any form in an image having discernible characteristics that provide a distinctive identity when contrasted with other forms. Pattern recognition may also be used, for ascertaining differences, as well as similarities, between patterns under observation and partitioning the patterns into appropriate categories based on these perceived differences and similarities; and may include any procedure for correctly identifying a discrete pattern, such as an alphanumeric character, as a member of a predefined pattern category. Further, the video or image processing may use, or be based on, the algorithms and techniques disclosed in the book entitled: "*Handbook of Image & Video Processing*", edited by Al Bovik, published by Academic Press, ISBN: 0-12-119790-5, and in the book published by Wiley-Interscience, ISBN13 978-0-471-71998-4 (2005) by Tinku Acharya and Ajoy K. Ray entitled: "*Image Processing—Principles and Applications*", which are both incorporated in their entirety for all purposes as if fully set forth herein.

A controller 37, located within the camera device or module 30, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 37 commonly includes a memory that may include a static RAM (Random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as firmware stored in the memory. The controller 37 controls and monitors the device operation, such as initialization, configuration, interface, and commands. The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The digital camera device or module 30 requires power for its described functions such as for capturing, storing, manipulating, and transmitting the image. A dedicated power source such as a battery may be used or a dedicated connection to an external power source via connector 39b. The camera device 30 may further includes a power supply 38 that contains a DC/DC converter. In another embodiment, the power supply 38 is power fed from the AC power supply via AC plug as the connector 39b and a cord, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, the power supply 38 is integrated into a single device or circuit for sharing common circuits. Further, the power supply 38 may include a boost converter, such as a buck-boost converter, charge pump, inverter and regulators as known in the art, as required for conversion of one form of electrical power to another desired form and voltage. While the power supply 38 (either separated or integrated) can be an integral part and housed within the camera 30 enclosure, it may be enclosed in a separate housing connected via cable to the camera 30 assembly. For example, a small outlet plug-in step-down transformer shape can be used (also known as wall-wart, "power brick", "plug pack", "plug-in adapter", "adapter block", "domestic mains adapter", "power adapter", or AC adapter). Further, the power supply 38 may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 34 (or video encoder) is shown in FIG. 3 disposed between the image processor 33 and the transceiver 35, allowing for compression of the digital video signal before its transmission over a cable or over-the-air. In some cases, compression may not be required, hence obviating the need for such compressor 34. Such compression can be lossy or lossless types. Common compression algorithms are JPEG (Joint Photographic Experts Group) and MPEG (Moving Picture Experts Group). The above and other image or video compression techniques may use of intraframe compression commonly based on registering the differences between a part of a single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

The single lens or a lens array 31 is positioned to collect optical energy representative of a subject or scenery, and to focus the optical energy onto the photosensor array 32. Commonly, the photosensor array 32 is a matrix of photosensitive pixels, which generates an electric signal that is a representative of the optical energy directed at the pixel by the imaging optics.

A prior art example of a portable electronic camera connectable to a computer is disclosed in U.S. Pat. No. 5,402,170 to Parulski et al. entitled: "Hand-Manipulated Electronic Camera Tethered to a Personal Computer". A digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are all incorporated in their entirety for all purposes as if fully set forth herein.

Bitmap. A bitmap (a.k.a. bit array or bitmap index) is a mapping from some domain (for example, a range of integers) to bits (values that are zero or one). In computer graphics, when the domain is a rectangle (indexed by two coordinates) a bitmap gives a way to store a binary image, that is, an image in which each pixel is either black or white (or any two colors). More generally, the term 'bitmap' is used herein to include, but not limited to, a pixmap, which refers to a map of pixels, where each one may store more than two colors, thus using more than one bit per pixel. A bitmap is a type of memory organization or image file format used to store digital images.

In typically uncompressed bitmaps, image pixels are stored using a color depth of 1, 4, 8, 16, 24, 32, 48, or 64 bits per pixel. Pixels of 8 bits and fewer can represent either grayscale or indexed color. An alpha channel (for transparency) may be stored in a separate bitmap, where it is similar to a grayscale bitmap, or in a fourth channel that, for example, converts 24-bit images to 32 bits per pixel. The bits representing the bitmap pixels may be packed or unpacked (spaced out to byte or word boundaries), depending on the format or device requirements. Depending on the color depth, a pixel in the picture occupies at least n/8 bytes, where n is the bit depth. For an uncompressed, packed within rows, bitmap, such as is stored in Microsoft DIB or BMP file format, or in uncompressed TIFF format, a lower bound on storage size for a n-bit-per-pixel (2n colors) bitmap, in bytes, can be calculated as: size=width·height·n/8, where height and width are given in pixels. In the formula above, header size and color palette size, if any, are not included.

The BMP file format, also known as bitmap image file or Device Independent Bitmap (DIB) file format or simply a bitmap, is a raster graphics image file format used to store bitmap digital images, independently of the display device (such as a graphics adapter), especially on Microsoft Windows and OS/2 operating systems. The BMP file format is capable of storing 2D digital images of arbitrary width, height, and resolution, both monochrome and color, in various color depths, and optionally with data compression, alpha channels, and color profiles. The Windows Metafile (WMF) specification covers the BMP file format.

Face detection. A camera with a human face detection means is disclosed in U.S. Pat. No. 6,940,545 to Ray et al., entitled: "Face Detecting Camera and Method", and in U.S. Patent Application Publication No. 2012/0249768 to Binder entitled: "System and Method for Control Based on Face or Hand Gesture Detection", which are both incorporated in their entirety for all purposes as if fully set forth herein.

Face detection (also known as face localization) includes algorithms for identifying a group of pixels within a digitally acquired image that relates to the existence, locations and sizes of human faces. Common face-detection algorithms focused on the detection of frontal human faces, and other algorithms attempt to solve the more general and difficult problem of multi-view face detection. That is, the detection of faces that are either rotated along the axis from the face to the observer (in-plane rotation), or rotated along the vertical or left-right axis (out-of-plane rotation), or both. Various face detection techniques and devices (e.g. cameras) having face detection features are disclosed in U.S. Pat. Nos. RE33,682, RE31,370, 4,047,187, 4,317,991, 4,367,027, 4,638,364, 5,291,234, 5,386,103, 5,488,429, 5,638,136, 5,642,431, 5,710,833, 5,724,456, 5,781,650, 5,812,193, 5,818,975, 5,835,616, 5,870,138, 5,978,519, 5,987,154, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,940,545, 7,110,575, 7,315,630, 7,317,815, 7,466,844, 7,466,866 and 7,508,961, which are all incorporated in its entirety for all purposes as if fully set forth herein.

Image. A digital image is a numeric representation (normally binary) of a two-dimensional image. Depending on whether the image resolution is fixed, it may be of a vector or raster type. Raster images have a finite set of digital values, called picture elements or pixels. The digital image contains a fixed number of rows and columns of pixels, which are the smallest individual element in an image, holding quantized values that represent the brightness of a given color at any specific point. Typically, the pixels are stored in computer memory as a raster image or raster map, a two-dimensional array of small integers, where these values are usually transmitted or stored in a compressed form. The raster images can be created by a variety of input devices and techniques, such as digital cameras, scanners, coordinate-measuring machines, seismographic profiling, airborne radar, and more. Common image formats include GIF, JPEG, and PNG.

The Graphics Interchange Format (better known by its acronym GIF) is a bitmap image format that supports up to 8 bits per pixel for each image, allowing a single image to reference its palette of up to 256 different colors chosen from the 24-bit RGB color space. It also supports animations and allows a separate palette of up to 256 colors for each frame. GIF images are compressed using the Lempel-Ziv-Welch (LZW) lossless data compression technique to reduce the file size without degrading the visual quality. The GIF (GRAPHICS INTERCHANGE FORMAT) Standard Version 89a is available from www.w3.org/Graphics/GIF/spec-gif89a.txt.

JPEG (seen most often with the .jpg or .jpeg filename extension) is a commonly used method of lossy compression for digital images, particularly for those images produced by digital photography. The degree of compression can be adjusted, allowing a selectable tradeoff between storage size and image quality and typically achieves 10:1 compression with little perceptible loss in image quality. JPEG/Exif is the most common image format used by digital cameras and other photographic image capture devices, along with JPEG/JFIF. The term "JPEG" is an acronym for the Joint Photographic Experts Group, which created the standard. JPEG/JFIF supports a maximum image size of 65535×65535 pixels—one to four gigapixels (1000 megapixels), depending on the aspect ratio (from panoramic 3:1 to square). JPEG is standardized under as ISO/IEC 10918-1:1994 entitled: "*Information technology—Digital compression and coding of continuous-tone still images: Requirements and guidelines*".

Portable Network Graphics (PNG) is a raster graphics file format that supports lossless data compression that was created as an improved replacement for Graphics Interchange Format (GIF), and is the commonly used lossless image compression format on the Internet. PNG supports palette-based images (with palettes of 24-bit RGB or 32-bit RGBA colors), grayscale images (with or without alpha channel), and full-color non-palette-based RGBimages (with or without alpha channel). PNG standard was designed for transferring images on the Internet (and not for professional-quality print graphics) and, therefore, does not support non-RGB color spaces such as CMYK, and was published as an ISO/IEC15948:2004 standard entitled: "*Information technology—Computer graphics and image processing—Portable Network Graphics (PNG): Functional specification*".

Metadata. The term "metadata", as used herein, refers to data that describes characteristics, attributes, or parameters of other data, in particular, files (such as program files) and objects. Such data typically includes structured information that describes, explains, locates, and otherwise makes it easier to retrieve and use an information resource. Metadata typically includes structural metadata, relating to the design and specification of data structures or "data about the containers of data"; and descriptive metadata about individual instances of application data or the data content. Metadata may include the means of creation of the data, the purpose of the data, time and date of creation, the creator or author of the data, the location on a computer network where the data were created, and the standards used.

For example, metadata associated with a computer word processing file may include the title of the document, the name of the author, the company to whom the document belongs, the dates that the document was created and last modified, keywords which describe the document, and other descriptive data. While some of this information may also be included in the document itself (e.g., title, author, and data), metadata may be a separate collection of data that may be stored separately from, but associated with, the actual document. One common format for documenting metadata is eXtensible Markup Language (XML). XML provides a formal syntax, which supports the creation of arbitrary descriptions, sometimes called "tags." An example of a metadata entry might be <title> War and Peace</title>, where the bracketed words delineate the beginning and end of the group of characters that constitute the title of the document that is described by the metadata. In the example of the word processing file, the metadata (sometimes referred to as "document properties") is entered manually by the author, the editor, or the document manager. The metadata concept is further described in a National Information Standards Organization (NISO) Booklet entitled: "*Understanding Metadata*" (ISBN: 1-880124-62-9), in the IETF RFC 5013 entitled: "*The Dublin Core Metadata Element Set*", and in the IETF RFC 2731 entitled: "*Encoding Dublin Core Metadata in HTML*", which are all incorporated in their entirety for all purposes as if fully set forth herein. An extraction of metadata from files or objects is described in a U.S. Pat. No. 8,700,626 to Bedingfield, entitled: "Systems, Methods and Computer Products for Content-Derived Metadata", and in a U.S. Patent Application Publication 2012/0278705 to Yang et al., entitled: "System and Method for Automatically Extracting Metadata from Unstructured Electronic Documents", which are both incorporated in their entirety for all purposes as if fully set forth herein.

Metadata can be stored either internally in the same file, object, or structure as the data (this is also called internal or embedded metadata), or externally in a separate file or field separated from the described data. A data repository typically stores the metadata detached from the data, but can be designed to support embedded metadata approaches. Metadata can be stored in either human-readable or binary form. Storing metadata in a human-readable format such as XML can be useful because users can understand and edit it without specialized tools, however, these formats are rarely optimized for storage capacity, communication time, and processing speed. A binary metadata format enables efficiency in all these respects but requires special libraries to convert the binary information into a human-readable content.

Tag. A tag is a type of metadata relating to a non-hierarchical keyword or term assigned to a digital image, describing the image and allows it to be found again by browsing or searching. Tags may be chosen informally and personally by the item's creator or by its viewer, depending on the system.

Color space. A color space is a specific organization of colors, allowing for reproducible representations of color, in both analog and digital representations. A color model is an abstract mathematical model describing the way colors can be represented as tuples of numbers (e.g., three tuples/channels in RGB or four in CMYK). When defining a color space, the usual reference standard is the CIELAB or CIEXYZ color spaces, which were specifically designed to encompass all colors the average human can see. Colors are commonly created in printing with color spaces based on the CMYK color model, using the subtractive primary colors of pigment (Cyan (C), Magenta (M), Yellow (Y), and Black (K)). To create a three-dimensional representation of a given color space, we can assign the amount of magenta color to the representation's X axis, the amount of cyan to its Y axis, and the amount of yellow to its Z axis. The resulting 3-D space provides a unique position for every possible color that can be created by combining those three pigments. Colors are typically created on computer monitors with color spaces based on the RGB color model, using the additive primary colors (red, green, and blue). A three-dimensional representation would assign each of the three colors to the X, Y, and Z-axes. Popular color models include RGB, CMYK, HSL, YUV, YCbCr, and YPbPr color formats.

Color spaces and the various color space models are described in an article by Marko Tkalcic and Jurij F. Tasic (of the University of Ljubljana, Slovenia) entitled: "*Colour spaces—perceptual, historical and applicational background*", and in the article entitled: "*Color Space Basics*" by Andrew Oran and Vince Roth, published May 2012, Issue 4 of the journal 'The Tech Review' by the Association of Moving Image Archivists, which are both incorporated in their entirety for all purposes as if fully set forth herein. Conversions between color spaces or models are described in an article entitled: "*Colour Space Conversions*" by Adrian Ford and Alan Roberts (Aug. 11, 1998), and in an article by Philippe Colantoni and Al dated 2004, entitled: "*Color Space Transformations*", which are both incorporated in their entirety for all purposes as if fully set forth herein.

A color space maps a range of physically produced colors (from mixed light, pigments, etc.) to an objective description of color sensations registered in the eye, typically in terms of tristimulus values, but not usually in the LMS space defined by the cone spectral sensitivities. The tristimulus values associated with a color space can be conceptualized as amounts of three primary colors in a tri-chromatic additive color model. In some color spaces, including LMS and XYZ spaces, the primary colors used are not real colors, in the sense that they cannot be generated with any light spectrum.

CIE color space. The CIE 1931 standards were created by the International Commission on Illumination (CIE) in 1931 and include the CIE 1931 RGB, CIE 1931 XYZ, CIELUV, and CIEUVW color models. When judging the relative luminance (brightness) of different colors in well-lit situations, humans tend to perceive light within the green parts of the spectrum as brighter than red or blue light of equal power. A luminosity function that describes the perceived brightness of the different wavelengths is thus roughly analogous to a spectral sensitivity of M cones. The CIE model capitalizes on this fact by defining Y as luminance. Z is quasi-equal to blue stimulation, or the S cone response and X is a mix (a linear combination) of cone response curves chosen to be nonnegative. The XYZ tristimulus values are thus analogous to, but different to, the LMS cone responses of the human eye. Defining Y as luminance helps in deriving that for any given Y value, the XZ plane contains all possible chromaticities at that luminance. CIE color space is described in a paper by Gernot Hoffmann entitled: "*CIE Color Space*", which is incorporated in its entirety for all purposes as if fully set forth herein.

RGB color space. RGB is an abbreviation for Red-Green-Blue. An RGB color space is any additive color space based on the RGB color model. A particular RGB color space is defined by the three chromaticities of the red, green, and blue additive primaries that can produce any chromaticity by a triangle defined by those primary colors. The complete specification of an RGB color space also requires a white point chromaticity and a gamma correction curve. The RGB (Red, Green, and Blue) is a color model that describes what kind of light needs to be emitted to produce a given color by storing individual values for red, green and blue. Further, there are many different RGB color spaces derived from the RGB color model, such as RGBA that is RGB with an additional channel, alpha, to indicate transparency. RGB color spaces are described in an article published by The BabelColor Company by Danny Pascale (Revised 2003 Oct. 6) entitled: "*A Review of RGB Color Spaces . . . from xyY to R'G'B'*", and in an article by Sabine Susstrunk, Robert Buckley, and Steve Swen from the Laboratory of audiovisual Communication (EPFL) entitled: "*Standard RGB Color Spaces*", which are both incorporated in their entirety for all purposes as if fully set forth herein. The RGB color space includes the RGB, sRGB, Adobe RGB, Adobe Wide Gamut RGB, ProPhoto RGB color space, Apple RGB, ISO RGB, ROMM RGB, International Telecommunication Union (ITU) Radiocommunication Sector (ITU-R) Recommendation ITU-R BT.709, and ITU-R BT.202.

Luma plus chroma/chrominance (YUV). Some color spaces are based on separating the component (Y) that represents the luma information, from the components (U+V, or I+Q) that represent the chrominance information. YUV is a color space typically used as part of a color image pipeline, where it encodes a color image or video taking human perception into account, allowing reduced bandwidth for chrominance components, thereby typically enabling transmission errors or compression artifacts to be more efficiently masked by the human perception than using a "direct" RGB-representation. Other color spaces may have similar properties, and the main reason to implement or investigate properties of Y'UV would be for interfacing with analog or digital television or photographic equipment that conforms to certain Y'UV standards.

The Y'UV model defines a color space in terms of one luma (Y') and two chrominance (UV) components. The Y'UV color model is used in the PAL and SECAM composite color video standards. Previously known black-and-white systems used only luma (Y') information. Color information (U and V) was added separately via a sub-carrier so that a black-and-white receiver would still be able to receive and display a color picture transmission in the receiver's native black-and-white format. Y' stands for the luma component (the brightness) and U and V are the chrominance (color) components; luminance is denoted by Y and luma by Y'—the prime symbols (') denotes gamma compression, with "luminance" meaning perceptual (color science) brightness, while "luma" is electronic (voltage of display) brightness. A YPbPr color model used in analog component video and its digital version YCbCr used in digital video are more or less derived from it, and are sometimes called Y'UV. (CB/PB and CR/PR are deviations from gray on blue-yellow and red-cyan axes, whereas U and V are blue-luminance and red-luminance differences.) The Y'IQ color space used in the analog NTSC television broadcasting system is related to it, although in a more complex way. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on a gamma corrected RGB primaries. Color models based on the YUV color space include YUV (used in PAL), YDbDr (used in SECAM), YIQ (used in NTSC), YCbCr (described in ITU-R BT.601, BT.709, and BT.2020), YPbPr, xvYCC, and YCgCo. The YUV family is further described in an article published in the International Journal of Engineering Research and Applications (HERA) ISSN: 2248-9622 Vol. 2, Issue 2, March-April 2012, pp. 152-156 by Gnanatheja Rakesh and Sreenivasulu Reddy of the University College of Engineering, Tirupati, entitled: "*YCoCg color Image Edge detection*", which is incorporated in its entirety for all purposes as if fully set forth herein.

Hue and Saturation. HSL (Hue-Saturation-Lightness) and HSV (Hue-Saturation-Value) are the two most common cylindrical-coordinate representations of points in an RGB color model, and are commonly used today in color pickers, in image editing software, and in image analysis and computer vision. These two representations rearrange the geometry of RGB in an attempt to be more intuitive and perceptually relevant than the Cartesian (cube) representation, by mapping the values into a cylinder loosely inspired by a traditional color wheel. The angle around the vertical central axis corresponds to "hue" and the distance from the axis corresponds to "saturation". These first two values give the two schemes the 'H' and 'S' in their names. The height corresponds to a third value, the system's representation of the perceived luminance in relation to the saturation.

Perceived luminance is a notoriously difficult aspect of color to represent in a digital format, and this has given rise to two systems attempting to solve this issue: HSL (L for lightness) and HSV or HSB (V for value or B for brightness). A third model, HSI (I for intensity), common in computer vision applications, attempts to balance the advantages and disadvantages of the other two systems. While typically consistent, these definitions are not standardized. HSV and HSL color models are described in an article by Darrin Cardanu entitled: "*Adventures in HSV Space*", and in an article by Douglas A. Kerr (Issue 3, May 12, 2008) entitled: "*The HSV and HSL Color Models and the Infamous Hexcones*", which are both incorporated in their entirety for all purposes as if fully set forth herein.

Grayscale. A grayscale (or greyscale) digital image is an image in which the value of each pixel is a single sample and carries only intensity information. Images of this sort, also known as black-and-white, are composed exclusively of shades of gray, varying from black at the weakest intensity to white at the strongest. Grayscale images are range from one-bit bi-tonal black-and-white images, which in the context of computer imaging are images with only the two colors, black, and white (also called bilevel or binary images), to many shades of gray in between. Grayscale images are often the result of measuring the intensity of light at each pixel in a single band of the electromagnetic spectrum (e.g., infrared, visible light, or ultraviolet), and in such cases they are monochromatic proper when only a given frequency is captured. The intensity of a pixel is expressed within a given range between a minimum and a maximum, inclusive. This range is represented in an abstract way as a range from '0' (total absence, black) and '1' (total presence, white), with any fractional values in between. Although the grayscale can be computed through rational numbers, image pixels are stored in binary, quantized form. Some early grayscale monitors can only show up to sixteen (4-bit) different shades, but today grayscale images (as photographs) intended for visual display (both on screen and printed) are commonly stored with 8 bits per sampled pixel, which allows 256 different intensities (i.e., shades of gray) to be recorded, typically on a non-linear scale. The precision provided by this format is barely sufficient to avoid visible banding artifacts but very convenient for programming since a single pixel occupies a single byte.

Some technical uses often require more levels, to make full use of the sensor accuracy (typically 10 or 12 bits per sample) and to guard against roundoff errors in computations. Sixteen bits per sample (65,536 levels) is a convenient choice for such uses, as computers manage 16-bit words efficiently. The TIFF and the PNG (among other) image file formats support 16-bit grayscale natively, although browsers and many imaging programs tend to ignore the low order 8 bits of each pixel. No matter what pixel depth is used, the binary representations assume that '0' is black and the maximum value (255 at 8 bpp, 65,535 at 16 bpp, etc.) is white, if not otherwise noted. In an 8-bit color palette, each pixel value is represented by 8 bits resulting in a 256-value palette ($2^8=256$). This is usually the maximum number of grays in ordinary monochrome systems; each image pixel occupies a single memory byte.

Digital photography is described in an article by Robert Berdan (downloaded from www.canadianphotographer.com) entitled: "*Digital Photography Basics for Beginners*", in a guide published on April 2004 by Que Publishing (ISBN—0-7897-3120-7) entitled: "*Absolute Beginner's Guide to Digital Photography*" authored by Joseph Ciaglia et al., and in a UPDIG Photographic Guidelines (downloaded June 2015) entitled: "*Universal Photographic Digital Imaging Guidelines v 4.0*", which are all incorporated in their entirety for all purposes as if fully set forth herein.

A method and an apparatus for rating a captured image based on accessing a database of reference images, each having an associated rating value, and selecting reference images to form a metadata-based subset of reference images, are described in a U.S. Patent Application Publication No. 2012/0213445 to LUU et al., entitled: "Method, Apparatus, and System for Rating Images", which is incorporated in its entirety for all purposes as if fully set forth herein. A method and an apparatus for disqualifying an unsatisfactory scene as an image acquisition control for a camera by analyzing mouth regions in an acquired image, are described in a U.S. Pat. No. 8,265,348 to Steinberg et al., entitled: "Digital Image Acquisition Control and Correction Method and Apparatus", which is incorporated in its entirety for all purposes as if fully set forth herein. An apparatus and a method for facilitating analysis of a digital image by using image recognition processing by a server, allowing for suggesting for meta-tagging the image by a user, are described in U.S. Pat. No. 8,558,921 to Walker et al., entitled: "Systems and Methods for Suggesting Meta-Information to a Camera User", which is incorporated in its entirety for all purposes as if fully set forth herein.

Systems and methods for determining the location where an image was captured using a central system that compares the submitted images to images in an image library to identify matches are described in a U.S. Pat. No. 8,131,118 to Jing et al., entitled: "Inferring Locations from an Image", which is incorporated in its entirety for all purposes as if fully set forth herein. Further, methods for automatically rating and selecting digital photographs by estimating the importance of each photograph by analyzing its content as well as its metadata, are described in an article by Daniel Kormann, Peter Dunker, and Ronny Paduscheck, all of the Fraunhofer Institute for Digital Media in Ilmenau, Germany, entitled: "Automatic Rating and Selection of Digital Photographs", which is incorporated in its entirety for all purposes as if fully set forth herein.

Various systems and methods are known for analyzing and for providing feedback to the user regarding the quality of a digital image captured by a digital camera. A processor within a digital camera, which generates and utilizes a recipe data file and communicates with a network-based storage location for uploading and downloading, is described in U.S. Patent Application Publication No. 2013/0050507 to Syed et al., entitled: "Recipe Based Real-Time Assistance for Digital Image Capture and Other Consumer Electronics Devices", a method and system for determining effective policy profiles that includes client devices configured to initiate a request for at least one effective policy profile, a server mechanism communicatively coupled to the client devices and configured to receive the request, and a policy data storage component configured to store a plurality of policy profiles, are described in U.S. Patent Application Publication No. 2010/0268772 to Romanek et al., entitled: "System and Method for Determining Effective Policy Profiles in a Client-Server Architecture", methods and apparatuses for analyzing, characterizing and/or rating composition of images and providing instructive feedback or automatic corrective actions are described in U.S. Patent Application Publication No. 2012/0182447 to Gabay entitled: "Methods, Circuits, Devices, Apparatuses and Systems for Providing Image Composition Rules, Analysis and Improvement", an approach for providing device angle image correction where an image (e.g., still or moving) of a subject is captured via a camera of a mobile device is described in U.S. Patent Application Publication No. 2013/0063538 to Hubner et al., entitled: "Method and Apparatus for Providing Device Angle Image Correction", an apparatus and an associated method that facilitate capturing an image in an electronic camera with the image being completely focused are described in U.S. Patent Application Publication No. 2012/0086847 to Foster entitled: "Convergence Feedback Indicator, Provided When Taking a Picture in a Camera Application", a method for providing real-time feedback of an estimated quality of a captured final image including calculating a quality score of a preliminary obtained image is described in U.S. Patent Application Publication No. 2014/0050367 to CHEN et al., entitled: "Smart Document Capture Based on Estimated Scanned-Image Quality", and methods and systems for determining augmentability information associated with an image frame captured by a digital imaging part of a user device are described in PCT International Application Publication No. WO2013/044983 to Hofmann et al., entitled: "Feedback to User for Indicating Augmentability of an Image", which are all incorporated in their entirety for all purposes as if fully set forth herein.

Further, a digital image acquisition system that includes a portable apparatus for capturing digital images and a digital processing component for detecting, analyzing, invoking subsequent image captures, and informing the photographer regarding motion blur, and reducing the camera motion blur in an image captured by the apparatus, is described in U.S. Pat. No. 8,244,053 entitled: "Method and Apparatus for Initiating Subsequent Exposures Based on Determination of Motion Blurring Artifacts", and in U.S. Pat. No. 8,285,067 entitled: "Method Notifying Users Regarding Motion Artifacts Based on Image Analysis", both to Steinberg et al. which are both incorporated in their entirety for all purposes as if fully set forth herein.

Furthermore, a camera that has the release button, a timer, a memory and a control part, and the timer measures elapsed time after the depressing of the release button is released, used to prevent a shutter release moment to take a good picture from being missed by shortening the time required for focusing when a release button is depressed again, is described in Japanese Patent Application Publication No. JP2008033200 to Hyo Hana entitled: "Camera", a through image that is read by a face detection processing circuit, and the face of an object is detected, and is detected again by the face detection processing circuit while half pressing a shutter button, used to provide an imaging apparatus capable of photographing a quickly moving child without fail, is described in a Japanese Patent Application Publication No. JP2007208922 to Uchida Akihiro entitled: "Imaging Apparatus", and a digital camera that executes image evaluation processing for automatically evaluating a photographic image (exposure condition evaluation, contrast evaluation, blur or focus blur evaluation), and used to enable an image photographing apparatus such as a digital camera to automatically correct a photographic image, is described in Japanese Patent Application Publication No. JP2006050494 to Kita Kazunori entitled: "Image Photographing Apparatus", which are all incorporated in their entirety for all purposes as if fully set forth herein.

Object detection. Object detection (a.k.a. 'object recognition') is a process of detecting and finding semantic instances of real-world objects, typically of a certain class (such as humans, buildings, or cars), in digital images and videos. Object detection techniques are described in an article published International Journal of Image Processing (IJIP), Volume 6, Issue 6-2012, entitled: "*Survey of The Problem of Object Detection In Real Images*" by Dilip K. Prasad, and in a tutorial by A. Ashbrook and N. A. Thacker entitled: "*Tutorial: Algorithms For* 2-*dimensional Object Recognition*" published by the Imaging Science and Biomedical Engineering Division of the University of Manchester, which are both incorporated in their entirety for all purposes as if fully set forth herein. Various object detection techniques are based on pattern recognition, described in the Computer Vision: March 2000 Chapter 4 entitled: "*Pattern Recognition Concepts*", and in a book entitled: "*Hands-On Pattern Recognition—Challenges in Machine Learning, Volume* 1", published by Microtome Publishing, 2011 (ISBN-13:978-0-9719777-1-6), which are both incorporated in their entirety for all purposes as if fully set forth herein.

Various object detection (or recognition) schemes in general, and face detection techniques in particular, are based on using Haar-like features (Haar wavelets) instead of the usual image intensities. A Haar-like feature considers adjacent rectangular regions at a specific location in a detection window, sums up the pixel intensities in each region, and calculates the difference between these sums. This difference is then used to categorize subsections of an image. Viola-Jones object detection framework, when applied to a face detection using Haar features, is based on the assumption that all human faces share some similar properties, such as the eyes region is darker than the upper cheeks, and the nose bridge region is brighter than the eyes. The Haar-features are used by the Viola-Jones object detection framework, described in articles by Paul Viola and Michael Jones, such as the International Journal of Computer Vision 2004 article entitled: "*Robust Real-Time Face Detection*" and in the Accepted Conference on Computer Vision and Pattern Recognition 2001 article entitled: "*Rapid Object Detection using a Boosted Cascade of Simple Features*", which are both incorporated in their entirety for all purposes as if fully set forth herein.

Edge detection. Edge detection is a name for a set of mathematical methods that aim at identifying points in a digital image at which the image brightness changes sharply, or more formally, has discontinuities. The points at which image brightness changes sharply are typically organized into a set of curved line segments, which are termed 'edges'. The purpose of detecting sharp changes in image brightness is to capture important events and changes in properties, and it can be shown that under rather general assumptions for an image formation model, discontinuities in image brightness are likely to correspond to discontinuities in depth, discontinuities in surface orientation, changes in material properties, and variations in scene illumination.

Ideally, the result of applying an edge detector to an image may lead to a set of connected curves that indicate the boundaries of objects, the boundaries of surface markings as well as curves that correspond to discontinuities in surface orientation. Thus, applying an edge detection algorithm to an image may significantly reduce the amount of data to be processed and may therefore filter out information that may be regarded as less relevant, while preserving the important structural properties of the image. If the edge detection step is successful, the subsequent task of interpreting the information contents in the original image may, therefore, be substantially simplified.

A typical edge might be the border between a block of red color and a block of yellow color. In contrast, a line (as can be extracted by a ridge detector) may be a small number of pixels of a different color on an otherwise unchanging background. For a line, there may therefore usually be one edge on each side of the line. There are many methods for edge detection, but most of them can be grouped into two major categories, a search-based and a zero-crossing based. The search-based methods detect edges by first computing a measure of edge strength, usually a first-order derivative expression such as the gradient magnitude, and then searching for local directional maxima of the gradient magnitude using a computed estimate of the local orientation of the edge, usually the gradient direction. The zero-crossing based methods search for zero crossings in a second-order derivative expression computed from the image to find edges, usually the zero-crossings of a Laplacian or the zero-crossings of a non-linear differential expression. As a pre-processing step to edge detection, a smoothing stage, typically Gaussian smoothing, is almost always applied (see also noise reduction). The general criteria for edge detection includes detection of edge with low error rate, which means that the detection should accurately catch as many edges shown in the image as possible, the edge point detected by the operator should accurately localize on the center of the edge, and a given edge in the image should only be marked once, and where possible, image noise should not create false edges.

Various edge detection techniques are described in a paper by Djemel Ziou (of Universite de Sherbrooke, Quebec, Canada) and Salvatore Tabbone (of Crin-Cnrs/Inria Lorraine, Nancy, France) (downloaded June 2015) entitled: "*Edge Detection Techniques—An Overview*", in an International Journal of Computer Science Issues (IJCSI), Vol. 9 Issue 5, No. 1, September 2012 [ISSN (online): 1694-0814] by G. T. Shrivakshan (of Bharathiar University, Tamilnadu, India) and Dr. C. Chandrasekar (of Periyar University Salem, Tamilnadu, India) entitled: "*A Comparison of various Edge Detection Techniques used in Image Processing*", in a technical report CES-506 by the University of Essex (dated 29 Feb. 2010) ISSN 1744-8050 entitled: "*A Survey on Edge Detection Methods*", in a paper by Applied Mathematical Sciences, Vol. 2, 2008, no. 31, 1507-1520 by Ehsan Nadernejad, Sara Sharifzadeh, and Hamid Hassanpour entitled: "*Edge Detection Techniques: Evaluations and Comparisons*", and in a paper by Tzu-Heng Henry Lee (of National Taiwan University, Taipei, Taiwan, ROC), downloaded June 2015 entitled: "*Edge Detection Analysis*", which are all incorporated in their entirety for all purposes as if fully set forth herein.

Various existing tools may be used for edge detection such as the Apple Inc. Quartz™ 2D drawing engine (available from Apple Inc.) and described in Apple Inc. Developer guide (dated 2014 Sep. 17) entitled: "*Quartz 2D Programming Guide*", which is incorporated in its entirety for all purposes as if fully set forth herein.

Canny edge detection. Canny edge detector is an edge detection operator that uses a multi-stage algorithm to detect a wide range of edges in images, and may be used to filter spurious edges. A process of Canny edge detection algorithm can be broken down into 5 different steps, (1) Apply Gaussian filter to smooth the image in order to remove the noise, (2) Find the intensity gradients of the image, (3) Apply non-maximum suppression to get rid of spurious response to edge detection, (4) Apply double threshold to determine potential edges, and (5) Track edge by hysteresis, followed by finalizing the detection of edges by suppressing all the other edges that are weak and not connected to strong edges. Canny edge detection (and any variants thereof) is described in an IEEE Transaction on Pattern Analysis and Machine Intelligence, Vol. PAMI-8, No. 6, November 1986 paper (0162-8828/86/1100-0679$01.00) by John Canny entitled: "*A Computational Approach to Edge Detection*", in a tutorial 09gr820 (dated Mar. 23, 2009) entitled: "*Canny Edge Detection*", and in an International Journal of Computer Vision 53(3), 225-243, 2003 paper authored by R. Kimmel and A. M. Bruckstein (of the Technion, Haifa, Israel) entitled: "*Regularized Laplacian Zero Crossings as Optimal Edge Integrators*", which are all incorporated in their entirety for all purposes as if fully set forth herein.

Differential edge detection. A differential edge detection is a second-order edge detection approach that automatically detects edges with sub-pixel accuracy by using the differential approach of detecting zero-crossings of the second-order directional derivative in the gradient direction.

Prewitt operator. The Prewitt operator is a discrete differentiation operator, for computing an approximation of the gradient of an image intensity function. At each point in the image, the result of the Prewitt operator is either the corresponding gradient vector or the norm of this vector. The Prewitt operator is based on convolving the image with a small, separable, and integer valued filter in horizontal and vertical directions and is therefore relatively inexpensive in terms of computations. On the other hand, the gradient approximation produced is relatively crude, in particular for high-frequency variations in the image. In simple terms, the operator calculates the gradient of the image intensity at each point, giving the direction of the largest possible increase from light to dark and the rate of change in that direction. The result therefore shows how "abruptly" or "smoothly" the image changes at that point, and therefore how likely it is that a part of the image represents an edge, as well as how that edge is likely to be oriented. In practice, the magnitude (effectively the likelihood of an edge) calculation is more reliable and easier to interpret than the direction calculation.

Mathematically, the gradient of a two-variable function (here the image intensity function) is at each image point a 2D vector with the components given by the derivatives in the horizontal and vertical directions, and the operator uses two 3×3 kernels that are convolved with the original image to calculate approximations of the derivatives—one for horizontal changes, and one for vertical. At each image point, the gradient vector points in the direction of the largest possible intensity increase, and the length of the gradient vector corresponds to the rate of change in that direction. This implies that the result of the Prewitt operator at an image point which is in a region of constant image intensity is a zero vector and at a point on an edge is a vector which points across the edge, from darker to brighter values. The Prewitt operator is described in a paper by Judith M. S. Prewitt (of University of Pennsylvania, Philadelphia, Pa., U.S.A.), entitled: "*Object Enhancement and Extraction*", which is incorporated in its entirety for all purposes as if fully set forth herein.

Sobel operator. Sobel operator (also referred to as Sobel-Feldman operator), sometimes called Sobel Filter, is used in image processing and computer vision, particularly within edge detection algorithms, to create an image that emphasizes edges and transitions. Technically, it is a discrete differentiation operator, computing an approximation of the gradient of the image intensity function. At each point in the image, the result of the Sobel operator is either the corresponding gradient vector or the norm of this vector. The Sobel operator is based on convolving the image with a small, separable, and integer valued filter in horizontal and vertical direction and is therefore relatively inexpensive in terms of computations. On the other hand, the gradient approximation that it produces is relatively crude, in particular for high-frequency variations in the image. Since the intensity function of a digital image is only known at discrete points, derivatives of this function cannot be defined unless we assume that there is an underlying continuous intensity function that has been sampled at the image points. With some additional assumptions, the derivative of the continuous intensity function may be computed as a function of the sampled intensity function, i.e. the digital image. It turns out that the derivatives of the continuous intensity function at any particular point are functions of the intensity values at virtually all image points. However, approximations of these derivative functions may be defined at lesser or larger degrees of accuracy.

The Sobel operator represents a rather inaccurate approximation of the image gradient but is still of sufficient quality to be of practical use in many applications. More precisely, it uses intensity values only in a 3×3 region around each image point to approximate the corresponding image gradient, and it uses only integer values for the coefficients that weight the image intensities to produce the gradient approximation. The Sobel operator (and variants thereof) is described in a paper by Irwin Sobel (Updated Jun. 14, 2015), entitled: "*History and Definition of the so-called "Sobel Operator" more appropriately named the Sobel—Feldman Operator*", in an article by Guennadi (Henry) Levkine (of Vancouver, Canada) Second Draft, June 2012 entitled: "*Prewitt, Sobel, and Scharr gradient 5×5 convolution Matrices*", and in an article in Proceedings of Informing Science & IT Education Conference (InSITE) 2009 by O. R. Voncent and O. Folorunso (both of University of Agriculture, Abeokuta, Nigeria), entitled: "*A Descriptive Algorithm for Sobel Image Edge Detection*", which are all incorporated in their entirety for all purposes as if fully set forth herein.

Deriche edge detector. Deriche edge detector (often referred to as Canny-Deriche detector) is an edge detection operator that includes a multistep algorithm to obtain an optimal result of edge detection in a discrete two-dimensional image, targeting the following criteria for optimal edge detection: Detection quality—all existing edges should be marked and no false detection should occur, Accuracy—the marked edges should be as close to the edges in the real image as possible, and Unambiguity—a given edge in the image should only be marked once, where no multiple responses to a single edge in the real image should occur. This differential edge detector can be seen as a reformulation of Canny's method from the viewpoint of differential invariants computed from a scale space representation leading to a number of advantages in terms of both theoretical analysis and sub-pixel implementation. The Deriche edge detector is described in an article by Rachid Deriche (of INRIA, Le Chesnay, France) published in International Journal of Computer Vision, 167-187 (1987), entitled: "*Using Canny's criteria to Derive a Recursively Implemented Optimal Edge Detector*", and in a presentation by Diane Lingrand (of University of Nice, Sophia Antipolis, France) dated August 2006, entitled: "*Segmentation*", which are both incorporated in their entirety for all purposes as if fully set forth herein.

RANSAC. RANdom SAmple Consensus (RANSAC) is an iterative method to estimate parameters of a mathematical model from a set of observed data which contains outliers. It is a non-deterministic algorithm in the sense that it produces a reasonable result only with a certain probability, with this probability increasing as more iterations are allowed. A basic assumption is that the data consists of "inliers"—data whose distribution can be explained by some set of model parameters, though may be subject to noise, and "outliers"—data that do not fit the model. The outliers may come from extreme values of the noise, from erroneous measurements, or from incorrect hypotheses about the interpretation of data. RANSAC also assumes that, given a (usually small) set of inliers, there exists a procedure that can estimate the parameters of a model that optimally explains or fits this data.

The RANSAC algorithm is a learning technique to estimate parameters of a model by random sampling of observed data. Given a dataset whose data elements contain both inliers and outliers, RANSAC uses a voting scheme to find the optimal fitting result. Data elements in the dataset are used to vote for one or multiple models. The implementation of this voting scheme is based on two assumptions: that the noisy features is not voted consistently for any single model (few outliers) and that there are enough features to agreeing on a good model (few missing data). The RANSAC algorithm is essentially composed of two steps that are iteratively repeated: In the first step, a sample subset containing minimal data items is randomly selected from the input dataset. A fitting model and the corresponding model parameters are computed using only the elements of this sample subset. The cardinality of the sample subset is the smallest sufficient to determine the model parameters. In the second step, the algorithm checks which elements of the entire dataset are consistent with the model instantiated by the estimated model parameters obtained from the first step. A data element will be considered as an outlier if it does not fit the fitting model instantiated by the set of estimated model parameters within some error threshold that defines the maximum deviation attributable to the effect of noise. The set of inliers obtained for the fitting model is called consensus set. The RANSAC algorithm iteratively repeats the above two steps until the obtained consensus set in certain iteration has enough inliers.

RANSAC is described in SRI International (Menlo Park, Calif., U.S.A.) Technical Note 213 (March 1980) by Martin A. Fischler and Robert C. Bolles entitled: Random Sample Consensus: "*A Paradigm for Model Fitting with Applications to Image Analysis and Automated Cartography*", and in an article by Anders Hast, Johan Nysjo (both of Uppsala University, Uppsala, Sweden) and Andrea Marchetti (of IIT, CNR, Pisa, Italy) entitled: "*Optimal RANSAC—Towards a Repeatable Algorithm for Finding the Optimal Set*", which are both incorporated in their entirety for all purposes as if fully set forth herein. Using RANSAC for edge detection is described in U.S. Patent Application Publication No. 2011/0188708 to AHN et al. entitled: "Three-Dimensional Edge Extraction Method, Apparatus and Computer-Readable Medium Using Time of Flight Camera", in U.S. Pat. No. 8,121,431 to Hwang et al. entitled: "Method and Apparatus for Detecting Edge of Image and Computer Readable Medium Processing Method", in U.S. Pat. No. 8,224,051 to Chen et al. entitled: "Method for Detection of Linear Structures and Microcalcifications in Mammographic Images", and in U.S. Pat. No. 8,265,393 to Tribelhorn et al. entitled: "Photo-Document Segmentation Method and System", which are all incorporated in their entirety for all purposes as if fully set forth herein.

Line segment detection. Straight-line detection techniques are described in an article in J Math Imaging Vis (DOI 10.1007/s10851-008-0102-5) by Rafael Grompone von Gioi et al. (published by Springer Science+Business Media, LLC 2008) entitled: "*On Straight Line Segment Detection*", and in a Norwegian University of Science and Technology (NTNU) Master work submitted June 2010 by Kari Haugsdal entitled: "*Edge and line detection of complicated and blurred objects*", which are both incorporated in their entirety for all purposes as if fully set forth herein.

LSD is a common linear-time Line Segment Detector providing subpixel accurate results, designed to work on any digital image without parameter tuning. It controls its own number of false detections, and on average, one false alarm is allowed per image. The process starts by computing a level-line angle at each pixel to produce a level-line field, i.e., a unit vector field such that all vectors are tangent to the level line going through their base point. Then, this field is segmented into connected regions of pixels that share the same level-line angle up to a certain tolerance. Various Line Segment Detectors (LSD) are described in an article published in Image Processing On Line (IPOL) 2012-03-24 (ISSN 2105-1232) by Rafael Grompone von Gioi et al. entitled: "*LSD: a Line Segment Detector*", in an article in International Conference on Remote Sensing, Environment and Transportation Engineering (RSETE 2013) by TAN Xi, ZHAO Lingjun, and SU Yi (of NUDT, Changsha, China), entitled: "*Linear Feature Extraction from SAR Images based on the modified LSD Algorithm*", in a paper dated September 2011 by Rafael Grompone von Gioi et al. entitled: "*LSD: a Line Segment Detector*", and in an article by Xiaohu Lu, Jian Yao, Kai Li, and Li Li (of Wuhan University, P.R. China), entitled: "*Cannylines: A Parameter-Free Line Segment Detector*", which are all incorporated in their entirety for all purposes as if fully set forth herein.

Hough transform. The Hough transform is a feature extraction technique used in image analysis, computer vision, and digital image processing. The purpose of this technique is to find imperfect instances of objects within a certain class of shapes by a voting procedure that is carried out in a parameter space, from which object candidates are obtained as local maxima in a so-called accumulator space that is explicitly constructed by an algorithm for computing the Hough transform. The classical Hough transform is concerned with the identification of lines in the image, but may be used for identifying positions of arbitrary shapes, most commonly circles or ellipses. Hough transform is described in an article in Computer Vision, Graphics, and Image Processing 44, 87-116 (1988) [0734-189X/88] by J. Illingworth and J. Kittler entitled: "*A Survey of the Hough Transform*", and in an article by Allam Shehata Hassanein et al. (of Electronic Research Institute, El-Dokki, Giza, Egypt) entitled: "*A Survey on Hough Transform, Theory, Techniques and Applications*", which are both incorporated in their entirety for all purposes as if fully set forth herein.

Detecting lines by using the Hough Transformation is described in Graphics and Image Processing (Association for Computing Machinery, 1972) by Richard O. Duda and Peter E. Hart (of Stanford Research Institute, Menlo Park, Calif., U.S.A.), entitled: "*Use of the Hough Transformation To Detect Lines and Curves in Pictures*", in Chapter 2 of a book "*Real-Time detection of Lines and grids*" by Herout, A., Dubska, M, and Havel, J., (ISBN: 978-1-4471-4413-7), entitled: "*Chapter 2—Review of Hough Transform for Line Detection*", which are both incorporated in their entirety for all purposes as if fully set forth herein.

Corner detection. A corner is defined herein as the intersection of two edges, or as a point for which there are two dominant and different edge directions in a local neighborhood of the point. Techniques for corner detection are described in a paper in 2010 $10^{th}$ International Conference on Computer and Information Technology (CIT 2010) by Andres Solis Montero, Milos Stojmenovic, and Amiya Nayak (of the University of Ottawa, Ottawa, Canada) [978-0-7695-4108-2/10, DOI 10.1109/CIT.2010.109] entitled: "*Robust Detection of Corners and Corner-line links in images*", in a paper by Chris Harris and Mike Stephens of The Plessey Company plc. 1988 [AVC 1988 doi:10.5244/C.2.23] entitled: "*A Combined Corner and Edge Detector*", and in April 1980 paper by Les Kitchen and Azriel Rosenfeld (of University of Maryland, College Park, Md., U.S.A.) [DARPA TR-887, DAAG-53-76C-0138] entitled: "*Gray-Level Corner Detection*", which are all incorporated in their entirety for all purposes as if fully set forth herein.

Other corner detection techniques are described in U.S. Pat. No. 4,242,734 to Deal entitled: "Image Corner Detector Using Haar Coefficients", in U.S. Pat. No. 5,311,305 to Mahadevan et al. entitled: "Technique for Edge/Corner Detection/Tracking in Image Frames", in U.S. Pat. No. 6,124,896 to Kurashige entitled: "Corner Detection Device and Corner Detection Method", in U.S. Pat. No. 8,873,865 to Sung entitled: "Algorithm for Fast Corner Detection", and in U.S. Patent Application Publication No. 2013/0135689 to Shacham et al. entitled: "Automatic detection of Corners of a Scanned Document", which are all incorporated in their entirety for all purposes as if fully set forth herein.

Neural networks. Neural Networks (or Artificial Neural Networks (ANNs)) are a family of statistical learning models inspired by biological neural networks (the central nervous systems of animals, in particular the brain) and are used to estimate or approximate functions that may depend on a large number of inputs and are generally unknown. Artificial neural networks are generally presented as systems of interconnected "neurons" which send messages to each other. The connections have numeric weights that can be tuned based on experience, making neural nets adaptive to inputs and capable of learning. For example, a neural network for handwriting recognition is defined by a set of input neurons that may be activated by the pixels of an input image. After being weighted and transformed by a function (determined by the network designer), the activations of these neurons are then passed on to other neurons, and this process is repeated until finally, an output neuron is activated, and determines which character was read. Like other machine learning methods—systems that learn from data—neural networks have been used to solve a wide variety of tasks that are hard to solve using ordinary rule-based programming, including computer vision and speech recognition. A class of statistical models is typically referred to as "Neural" if it contains sets of adaptive weights, i.e. numerical parameters that are tuned by a learning algorithm, and capability of approximating non-linear functions from their inputs. The adaptive weights can be thought of as connection strengths between neurons, which are activated during training and prediction. Neural Networks are described in a book by David Kriesel entitled: "*A Brief Introduction to Neural Networks*" (ZETA2-EN) [downloaded May 2015 from www.dkriesel.com], which is incorporated in its entirety for all purposes as if fully set forth herein.

Neural networks based techniques may be used for image processing, as described in an article in Engineering Letters, 20:1, EL_20_1_09 (Advance online publication: 27 Feb. 2012) by Juan A. Ramirez-Quintana, Mario I. Cacon-Murguia, and F. Chacon-Hinojos entitled: "*Artificial Neural Image Processing Applications: A Survey*", in an article published 2002 by Pattern Recognition Society in Pattern Recognition 35 (2002) 2279-2301 [PII: S0031-3203(01) 00178-9] authored by M. Egmont-Petersen, D. de Ridder, and H. Handels entitled: "*Image processing with neural networks a review*", and in an article by Dick de Ridder et al. (of the Utrecht University, Utrecht, The Netherlands) entitled: "*Nonlinear image processing using artificial neural networks*", which are all incorporated in their entirety for all purposes as if fully set forth herein.

Neural networks may be used for object detection as described in an article by Christian Szegedy, Alexander Toshev, and Dumitru Erhan (of Google, Inc.) (downloaded June 2015) entitled: "*Deep Neural Networks for Object Detection*", in a CVPR2014 paper provided by the Computer Vision Foundation by Dumitru Erhan, Christian Szegedy, Alexander Toshev, and Dragomir Anguelov (of Google, Inc., Mountain-View, Calif., U.S.A.) (downloaded June 2015) entitled: "*Scalable Object Detection using Deep Neural Networks*", and in an article by Shawn McCann and Jim Reesman (both of Stanford University) (downloaded June 2015) entitled: "*Object Detection using Convolutional Neural Networks*", which are all incorporated in their entirety for all purposes as if fully set forth herein.

Using neural networks for object recognition or classification is described in an article (downloaded June 2015) by Mehdi Ebady Manaa, Nawfal Turki Obies, and Dr. Tawfiq A. Al-Assadi (of Department of Computer Science, Babylon University), entitled: "*Object Classification using neural networks with Gray-level Co-occurrence Matrices (GLCM)*", in a technical report No. IDSIA-01-11 January 2001 published by IDSIA/USI-SUPSI and authored by Dan C. Ciresan et al. entitled: "*High-Performance Neural Networks for Visual Object Classification*", in an article by Yuhua Zheng et al. (downloaded June 2015) entitled: "*Object Recognition using Neural Networks with Bottom-Up and top-Down Pathways*", and in an article (downloaded June 2015) by Karen Simonyan, Andrea Vedaldi, and Andrew Zisserman (all of Visual Geometry Group, University of Oxford), entitled: "*Deep Inside Convolutional Networks: Visualising Image Classification Models and Saliency Maps*", which are all incorporated in their entirety for all purposes as if fully set forth herein.

Using neural networks for object recognition or classification is further described in U.S. Pat. No. 6,018,728 to Spence et al. entitled: "Method and Apparatus for Training a Neural Network to Learn Hierarchical Representations of Objects and to Detect and Classify Objects with Uncertain Training Data", in U.S. Pat. No. 6,038,337 to Lawrence et al. entitled: "Method and Apparatus for Object Recognition", in U.S. Pat. No. 8,345,984 to Ji et al. entitled: "3D Convolutional Neural Networks for Automatic Human Action Recognition", and in U.S. Pat. No. 8,705,849 to Prokhorov entitled: "Method and System for Object Recognition Based on a Trainable Dynamic System", which are all incorporated in their entirety for all purposes as if fully set forth herein.

Saliency. Salience (also called saliency) of an item—be it an object, a person, a pixel, etc.—is a state or a quality by which it stands out relative to its neighbors. Saliency detection is considered to be a key attentional mechanism that facilitates learning and survival by enabling organisms to focus their limited perceptual and cognitive resources on the most pertinent subset of the available sensory data. Saliency typically arises from contrasts between items and their neighborhood, such as a red dot surrounded by white dots, a flickering message indicator of an answering machine, or a loud noise in an otherwise quiet environment. Saliency detection is often studied in the context of the visual system, but similar mechanisms operate in other sensory systems. What is salient can be influenced by training: for example, for human subjects particular letters can become salient by training.

When attention deployment is driven by salient stimuli, it is considered to be bottom-up, memory-free, and reactive. Attention can also be guided by top-down, memory-dependent, or anticipatory mechanisms, such as when looking ahead of moving objects or sideways before crossing streets. Humans and other animals have difficulty paying attention to more than one item simultaneously, so they are faced with the challenge of continuously integrating and prioritizing different bottom-up and top-down influences.

Saliency map. 'Saliency Map' is a topographically arranged map that represents visual saliency of a corresponding visual scene. Saliency maps, as well as techniques for creating and using saliency and saliency maps, are described in an article by Tiike Judd, Frado Durand, and Antonio Torralba (2012) entitled: "*Supplemental Material for A Benchmark of Computational Models of Saliency to Predict Human Fixations*", in an ICVS article (pages 66-75. Springer, 2008. 410, 412, 414) by R. Achanta, F. Estrada, P. Wils, and S. Susstrunk (of I&C EPFL) entitled: "*Salient Region Detection and Segmentation*", in an CVPR article (pages 1597-1604, 2009. 409, 410, 412, 413, 414, 415) by R. Achanta, S. Hemami, F. Estrada, and S. Susstrunk entitled: "*Frequency-tuned Salient Region Detection*", in an IEEE article (TPAMI, 20(11):1254-1259, 1998. 409, 410, 412, 414) by L. Itti, C. Koch, and E. Niebur entitled: "*A Model of Saliency based Visual Attention for Rapid Scene Analysis*", in an CVPR article (2010. 410, 412, 413, 414, 415) by S. Goferman, L. Zelnik-Manor, and A. Tal (all of the Technion, Haifa, Israel) entitled: "*Context-Aware Saliency Detection*", and in an CVPR (2011) article by M M Cheng, G X Zhang, N. J. Mitra, X. Huang, S. M. Hu entitled: "*Global Contrast based Salient Region Detection*", which are all incorporated in their entirety for all purposes as if fully set forth herein.

Techniques for generating saliency maps, and for using such maps for image analysis or manipulation are described in U.S. Patent Application Publication No. 2013/0156320 to Fredembach entitled: "Method, Apparatus and System for Determining a Saliency Map for an Input Image", in U.S. Pat. No. 8,437,543 to Chamaret et al. entitled: "Method and Device of Determining a Saliency Map for an Image", in U.S. Pat. No. 8,649,606 to Zhao et al. entitled: "Method and Systems for Generating Saliency Models Through Linear and/or Nonlinear Integration", in U.S. Pat. No. 8,660,351 to Tang entitled: "Auto-Cropping Using Salience Maps", in U.S. Pat. No. 8,675,966 to Tang entitled: "System and Method for Saliency Map Generation", in PCT International Publication No. WO 2008/043204 to G U et al. entitled: "Device and Method for Generating a Saliency Map of a Picture", in European Patent Application No. EP 2034439 to Zhu et al. entitled: "Method for Establishing the Saliency Map of an Image", and in European Patent Application No. EP 2731074 to Chevet entitled: "Method for Reframing an Image Based on a Saliency Map", which are all incorporated in their entirety for all purposes as if fully set forth herein.

Scaling. An image scaling is a process of resizing a digital image. Scaling is a non-trivial process that involves a trade-off between efficiency, smoothness, and sharpness. In bitmap graphics, as the size of an image is reduced or enlarged, the pixels that form the image become increasingly visible, making the image appear "soft" if pixels are averaged, or jagged if not. With vector graphics, the trade-off may be in processing power for re-rendering the image, which may be noticeable as slow re-rendering with still graphics, or slower frame rate and frame skipping in computer animation. Apart from fitting a smaller display area, image size is most commonly decreased (or subsampled or downsampled) to produce thumbnails. Enlarging an image (upsampling or interpolating) is generally used for making smaller imagery fit a bigger screen in full-screen mode, for example. However, there are several methods of increasing the number of pixels that an image contains, which evens out the appearance of the original pixels. Typically scaling of an image, such as enlarging or reducing the image, involves manipulation of one or more pixels of the original image into one or more pixels in the target image. In many applications, image scaling is required to be executed in real-time, requiring high processing power. Scaling or resizing of an image is typically measured as the ratio (in percentage, for example) of the number of pixels of the resulting image relative to the number of pixels in the original image. In general, sizing and resizing of an image makes it particularly suitable for viewing, transmission, downloading, sharing, editing, and further processing.

Image interpolation techniques (a.k.a. image resizing, image resampling, digital zooming, image magnification or enhancement) use an image interpolation algorithm to convert an image from one resolution (dimension) to another resolution without loosing the visual content in the picture. An image may be interpolated from a higher resolution to a lower resolution (referred to traditionally as image down-scaling or down-sampling), or may be interpolated from a lower resolution to a higher resolution (referred to as image up-scaling or up-sampling). Most of the image interpolation techniques in the literature have been developed by interpolating the pixels based on the characteristics of local features such as edge information or nearest neighbor criteria. Image interpolation techniques can be broadly categorized into two categories—adaptive and non-adaptive techniques. The principles of adaptive interpolation algorithms rely on the intrinsic image features or contents of the image and accordingly the computational logic is mostly dependent upon the intrinsic image features and contents of the input image. The non-adaptive algorithms do not rely on the image features or its contents, and the same computational logic is repeated for every pixel or group of local pixels irrespective of the image contents. A scaling may use, or be based on, the algorithms and techniques disclosed in the book entitled: "*Handbook of Image & Video Processing*", edited by Al Bovik, published by Academic Press, ISBN: 0-12-119790-5, and in the book published by Wiley-Interscience, ISBN13 978-0-471-71998-4 (2005) by Tinku Acharya and Ajoy K. Ray entitled: "*Image Processing—Principles and Applications*", which are both incorporated in their entirety for all purposes as if fully set forth herein. Further, various scaling techniques are described in an ACM Ubiquity Vol. 8, 2007 article by Tinku Acharya and Ping-Sing Tsai entitled: "*Computational Foundations of Image Interpolation Algorithms*", in an International Journal of Application or Innovation in Engineering & Management (UAIEM) Vol. 2, Issue 5, May 2013 article by Sudhir Sharma and Robin Walia (of Maharishi Markandeshwar University, Mullana, India), entitled: "*Zooming Digital Images using Modal Interpolation*", and in Digital Light & Color (2001) publication by Jonathan Sachs entitled: "*Image Resampling*", which are all incorporated in their entirety for all purposes as if fully set forth herein.

Non-Adaptive Algorithms. In non-adaptive image interpolation algorithms, certain computations are performed indiscriminately to the whole image for interpolation regardless of its contents. Common non-adaptive image interpolation algorithms include nearest-neighbor replacement, bilinear interpolation, bicubic interpolation, and some widely used digital filtering based approaches.

Nearest Neighbor Replacement. The simplest interpolation method is just to replace the interpolated point with the nearest neighboring pixel, providing the advantage of simplicity and low computation. However, the resultant pixelization or blocky effect makes the image quality unacceptable for highest quality imaging applications.

Bilinear Interpolation. Bilinear interpolation can be considered as a weighted average of four neighboring pixel values, and is an extension of linear interpolation for interpolating functions of two variables (e.g., x and y) on a rectilinear 2D grid. It is based on performing linear interpolation first in one direction, and then again in the other direction. Although each step is linear in both the sampled values and the position, the interpolation as a whole is not linear but rather quadratic in the sample location. When an image needs to be scaled up, each pixel of the original image needs to be moved in a certain direction based on a scale constant. However, when scaling up an image by a non-integral scale factor, there are pixels (i.e., holes) that are not assigned appropriate pixel values. In this case, those holes should be assigned with appropriate RGB or grayscale values so that the output image does not have non-valued pixels.

Bilinear interpolation can be used where perfect image transformation with pixel matching is impossible so that one can calculate and assign appropriate intensity values to pixels. Unlike other interpolation techniques such as nearest neighbor interpolation and bicubic interpolation, bilinear interpolation uses only the 4 nearest pixel values which are located in diagonal directions from a given pixel in order to find the appropriate color intensity values of that pixel. Bilinear interpolation considers the closest 2×2 neighborhood of known pixel values surrounding the unknown pixel's computed location. It then takes a weighted average of these 4 pixels to arrive at its final, interpolated value. The weight on each of the 4-pixel values is based on the computed pixel distance (in 2D space) from each of the known points.

Bicubic Interpolation. Bicubic interpolation is an extension of cubic interpolation for interpolating data points on a regular two-dimensional grid, and the surface interpolated by this technique is smoother than corresponding surfaces obtained by bilinear interpolation or nearest-neighbor interpolation. Bicubic interpolation can be accomplished using either Lagrange polynomials, cubic splines, or cubic convolution algorithm. In contrast to bilinear interpolation, which only takes 4 pixels (2×2) into account, bicubic interpolation considers 16 pixels (4×4). Images resampled with bicubic interpolation are smoother and have fewer interpolation artifacts. The general form of a bicubic interpolation is to calculate the gradients (the first derivatives) in both the x and y directions and the cross derivative at each of the four corners of the square, resulting in 16 equations that determine the 16 coefficients.

Spline interpolation. Spline interpolation is a form of interpolation where the interpolant is a special type of piecewise polynomial called a spline. Spline interpolation is often preferred over polynomial interpolation because the interpolation error can be made small even when using low degree polynomials for the spline. Spline interpolation avoids the problem of Runge phenomenon, in which oscillation can occur between points when interpolating using high degree polynomials.

Filtering-based Techniques. Filtering-based methods (also known as re-sampling methods) suggest a process of transforming discrete image pixels defined at one coordinate system to a new coordinate system of a different resolution. Frequently, the re-sampling technique is used to up-sample an image to enhance its resolution and appearance.

Lanczos interpolation. Lanczos resampling and Lanczos filtering are two applications of a mathematical formula. It can be used as a low-pass filter or used to smoothly interpolate the value of a digital signal between its samples, so that each sample of the given signal maps to a translated and scaled copy of the Lanczos kernel, which is a sinc function windowed by the central lobe of a second, longer, sinc function. The sum of these translated and scaled kernels is then evaluated at the desired points. Lanczos resampling is typically used to increase the sampling rate of a digital signal, or to shift it by a fraction of the sampling interval. The theoretically optimal reconstruction filter for band-limited signals is the sinc filter, which has infinite support. The Lanczos filter is one of many practical (finitely supported) approximations of the sinc filter. Each interpolated value is the weighted sum of 2a consecutive input samples, thus by varying the 2a parameter one may trade computation speed for improved frequency response. The parameter also allows one to choose between a smoother interpolation or a preservation of sharp transients in the data. For image processing, the trade-off is between the reduction of aliasing artifacts and the preservation of sharp edges. Also as with any such processing, there are no results for the borders of the image. Increasing the length of the kernel increases the cropping of the edges of the image. The Lanczos filtering and other filters are described in an article published by Graphics Gems I [Academic Press, pp. 147-165. ISBN 978-0-12-286165-9] authored by Ken Turkowski and Steve Gabriel (April 1990) entitled: "*Filters for Common Resampling Tasks*", which is incorporated in its entirety for all purposes as if fully set forth herein.

Adaptive Algorithms. Adaptive image interpolation algorithms typically exploit the intrinsic image features such as hue or edge information.

Downscaling techniques are further described in U.S. Patent Application Publication No. 2008/0260291 to Alakarhu et al. entitled: "Image Downscaling by Binning", in U.S. Patent Application Publication No. 2009/0016644 to Kalevo et al. entitled: "Method and Apparatus for Downscaling a Digital Matrix Image", and in U.S. Pat. No. 6,205,245 to Yuan et al. entitled: "Method and Apparatus for Rapid Down-Scaling of Color Images Directly from Sensor Color Filter Array Space", which are all incorporated in their entirety for all purposes as if fully set forth herein.

Photographic paper. Photographic paper is a paper coated with a light-sensitive chemical formula, used for making photographic prints, such that when the photographic paper is exposed to light it captures a latent image that is then developed to form a visible image. The light-sensitive layer of the paper is called the emulsion, and while is commonly based on silver salts, other alternatives are used as well. The print image is traditionally produced by interposing a photographic negative between the light source and the paper, either by direct contact with a large negative (forming a contact print) or by projecting the shadow of the negative onto the paper (producing an enlargement). The initial light exposure is carefully controlled to produce a gray scale image on the paper with appropriate contrast and gradation.

Photographic papers typically fall into the categories of papers that were or are used for negative-positive processes (includes all current black-and-white papers and chromogenic colour papers), papers that were or are used for positive-positive processes in which the "film" is the same as the final image (e.g., the Polaroid process), and papers that were or are used for positive-positive film-to-paper processes, where a positive image is enlarged and copied onto a photographic paper. Typically photographic papers consist of a light-sensitive emulsion, consisting of silver halide salts suspended in a colloidal material—usually gelatin-coated onto a paper, resin coated paper or polyester support. In black-and-white papers, the emulsion is normally sensitized to blue and green light but is insensitive to wavelengths longer than 600 nm in order to facilitate handling under red or orange safelighting. In Chromogenic color papers, the emulsion layers are sensitive to red, green and blue light, respectively producing cyan, magenta, and yellow dye during processing.

Modern black-and-white papers are coated on a small range of bases; baryta-coated paper, resin-coated paper, or polyester, while most color photographic materials available today are coated on either RC (resin coated) paper or on solid polyester. The photographic emulsion used for color photographic materials consists of three-color emulsion layers (cyan, yellow, and magenta) along with other supporting layers. The color layers are sensitized to their corresponding colors. Although it is commonly believed that the layers in negative papers are shielded against the intrusion of light of a wavelength different than the actual layer by color filters which dissolve during processing, this is not so. The color layers in negative papers are actually produced to have speeds that increase from cyan (red sensitive) to magenta (green sensitive) to yellow (blue sensitive), and thus when filtered during printing, the blue light is "normalized" so that there is no crosstalk. Therefore, the yellow (blue sensitive) layer is nearly ISO 100 while the cyan (red) layer is about ISO 25. After adding enough yellow filtration to make it neutral, the blue sensitivity of the slow cyan layer is lost.

Photograph. A photograph or photo as used herein includes any black-and-white or color print of an image created by photographic printing that is derived from a light falling on a light-sensitive surface, usually photographic film or an electronic medium such as a CCD or a CMOS chip. Most photographs are created using a camera, which uses a lens to focus the scene's visible wavelengths of light into a reproduction that can be seen by a human. The photo may consist of any photographic material, such as a photographic paper, film, plates, diazo print, or transparency. Photo sizes may be standardized and categorized as small photo prints and large photo prints, where the small photo prints size typically use sizes such as 4"×6" or 5"×7", while the large photo prints sizes commonly include 6"×9", 8"×10", 11"×17", 8"×12", and 20"×24".

Photo deterioration. Two main types of deterioration are associated with photographic materials: Chemical deterioration occurs when the chemicals in the photograph undergo reactions (either through contact with outside catalysts, or because the chemicals are inherently unstable) that damage the material, and physical or structural deterioration occurs when chemical reactions are not involved and deterioration is due to abrasion and tearing. In addition to aging, both types of deterioration are caused by environmental storage conditions (such as temperature and humidity), inappropriate storage enclosures and repair attempts, and human use and handling. Chemical damage can also be caused by improper chemical processing. Different types of photographic materials are particularly susceptible to different types and causes of deterioration. Hence, over the time, the optical density, color balance, lustre, and other qualities of a print will degrade. The rate at which deterioration occurs depends primarily on two main factors: the print itself, in particular, the colorants used to form the image, the medium on which image resides, and the type of environment the print is exposed to. Photos deterioration is described in a guide by Gawain Weaver (of Image Permanence Institute, Rochester Institute of Technology) published 2008 entitled: "*A GUIDE to Fiber-Base Gelatin Silver Print Condition and Deterioration*", which is incorporated in its entirety for all purposes as if fully set forth herein.

Photo Album. A photo album is a binder or book structure having front and rear covers (commonly opaque and rigid) in which pages are bound along one edge either by glueing, sewing, or by metal posts or rings. The collection of photographs stored in albums may be attached to pages that may have protective plastic cover sheets, or inserted into pockets pages, envelopes, or any other compartments that the photos may be slipped into. Other albums use a heavy paper with an abrasive surface covered with clear plastic sheets, on which surface photos can be put. Older style albums are often simply books of heavy paper in which photos could be glued to or attached to with adhesive corners or pages. Each page may include a different numbers of photos, and different types (portrait, landscape, round, oval, diamond, square, etc.) of images. A landscape format describes photos arranged so that they have longer lateral dimensions than their vertical dimensions, and a portrait format refers to photos positioned so that have longer vertical dimensions than their lateral dimensions.

An example of a photo album 41 is shown as closed in a view 40 in FIG. 4, and shown as open in a view 40a in FIG. 5. The photo album shown in FIG. 5 is an example of a one-side of an exemplary page 42 that contains no photos, and thus only a background consisting of multiple flower drawings, such as a flower 43. The photo album 41 further enclose three photos designated as a photo #1 44a, a photo #2 44b, and a photo #3 44c, stored on a page 42a.

Color balance. In photography and image processing, color balance may be defined as a global adjustment in the intensities of the colors (typically red, green, and blue primary colors). An important goal of this adjustment is to render specific colors—particularly neutral colors—correctly; hence, the general method is sometimes called gray balance, neutral balance, or white balance. Color balance changes the overall mixture of colors in an image and is used for color correction; generalized versions of color balance correction are used to get colors other than neutrals also to appear correct or pleasing.

Color balancing may be based on scaling all relative luminances in an image so that objects that are believed to be neutral appear so. Using RGB 8-bit color space, each pixel is associated with (r, g, b) values, each value between 0 and 255. Assuming a surface with r=240 which is believed to be a white object, and if 255 is the count which corresponds to white, scaling may be achieved by multiplying all red values by 255/240. Doing analogously for green and blue would result, at least in theory, in a color balanced image. Such simple scaling may be formalized as a transformation the 3×3 matrix that is a diagonal matrix:

$$\begin{pmatrix} r \\ g \\ b \end{pmatrix} = \begin{pmatrix} \frac{255}{r'w} & 0 & 0 \\ 0 & \frac{255}{g'w} & 0 \\ 0 & 0 & \frac{255}{b'w} \end{pmatrix} \begin{pmatrix} r' \\ g' \\ b' \end{pmatrix}$$

where r, g, and b are the color balanced red, green, and blue components of a pixel in the image; r', g', and b' are the red, green, and blue components of the image before color balancing, and r'w, g'w, and b'w are the red, green, and blue components of a pixel which is believed to be a white surface in the image before color balancing.

Color balancing techniques are further described in a paper by Jonathan Sachs (1999) entitled: "Color Balancing Techniques", in an article by Francesca Gasparini and Raimondo Schettini (of Universita degli Studi di Milano-Bicocca, Milano, Italy) (downloaded June 2015) entitled: "*Color Balancing of Digital Photos Using Simple Image Statistics*", and in a book by Alexis Van Hurkman published 2014 by Peachpit Press [ISBN—13: 978-0-321-92966-2], 2$^{nd}$ Edition, entitled: "*Color Correction Handbook: Professional Techniques for Video and Cinema, Second Edition*", which are all incorporated in their entirety for all purposes as if fully set forth herein. Various color balance correction algorithms are further described in U.S. Pat. No. 7,557,969 to Sone entitled: "Color Balance Correction Chart, Color Balance Correction Method, and Image Forming Apparatus", in U.S. Pat. No. 7,664,319 to Toyoda et al. entitled: "Method and Device for Color Balance Correction, and Computer Product", and in U.S. Pat. No. 7,702,148 to Hayaishi entitled: "Color Balance Correction Based on Color Cast Attribute", which are both incorporated in their entirety for all purposes as if fully set forth herein.

Contrast enhancement. Contrast is a difference in appearance of two or more parts of a field seen simultaneously or successively such as the difference in luminance or color that makes an object (or its representation in an image or display) distinguishable. In images, contrast is typically determined by the difference in the color and brightness of the object and other objects within the same field of view, and the maximum contrast of an image is referred to as the contrast ratio or dynamic range. As part of a photo deterioration, the contrast is degraded over time, affecting the quality of the photo image.

Contrast enhancement is frequently referred to as one of the most important issues in image processing. Contrast is created by the difference in luminance reflected from two adjacent surfaces. In visual perception, contrast is determined by the difference in the color and brightness of an object with other objects. The human visual system is more sensitive to contrast than absolute luminance; therefore, we can perceive the world similarly regardless of the considerable changes in illumination conditions. If the contrast of an image is highly concentrated in a specific range, the information may be lost in those areas which are excessively and uniformly concentrated. Contrast stretching may be used to increase the dynamic range of gray levels in the image being processed. Linear and nonlinear digital techniques are two widely practiced methods of increasing the contrast of an image.

Linear contrast enhancement. Linear contrast enhancement, also referred to as linear contrast stretching, linearly expands the original digital values of the image data into a new distribution. By expanding the original input values of the image, the total range of sensitivity of the display device can be utilized. Linear contrast enhancement also makes subtle variations within the data more obvious, and these types of enhancements are best applied to remotely sensed images with Gaussian or near-Gaussian histograms, meaning, all the brightness values fall within a narrow range of the histogram and only one mode is apparent. There are three methods of linear contrast enhancement: Min-Max Linear Contrast Stretch, Percentage Linear Contrast Stretch, and Piecewise Linear Contrast Stretch.

When using the minimum-maximum linear contrast stretch, the original minimum and maximum values of the data are assigned to a newly specified set of values that utilize the full range of available brightness values. Consider an image with a minimum brightness value of 45 and a maximum value of 205, hence when such an image is viewed without enhancements, the values of 0 to 44 and 206 to 255 are not displayed. Important spectral differences can be deselected by stretching the minimum value of 45 to 0 and the maximum value of 120. Using this method is applying with respect to image application type: $g(x,y)=(f(x,y)-min)/(max-min))*N$, where N is the number of the intensity level, $g(x,y)$ represents the output image, and $f(x,y)$ represents input image. In this equation, the "min" and "max" are the minimum intensity value and the minimum intensity value in the current image. Here N shows the total number of intensity values that can be assigned to a pixel. For example, normally in the gray-level images, the lowest possible intensity is 0, and the highest intensity value is 255, thus N=255.

The percentage linear contrast stretch is similar to the minimum-maximum linear contrast stretch except that this method uses specified minimum and maximum values that lie in a certain percentage of pixels from the mean of the histogram. A standard deviation from the mean is often used to push the tails of the histogram beyond the original minimum and maximum values.

When the distribution of a histogram in an image is bi or remodel, an analyst may stretch certain values of the histogram for increased enhancement in selected areas. This method of contrast enhancement is called a piecewise linear contrast stretch. A piecewise linear contrast enhancement involves the identification of a number of linear enhancement steps that expands the brightness ranges in the modes of the histogram. This type can be expressed by $f(x,y)=ax$ for $0 \leq x \leq x_1$, $f(x,y)=b(x-x_1)+y(x_1)$ for $x_1 \leq x \leq x_2$ and $f(x,y)=c(x-x_2)+y(x_1)$ for $x_2 \leq x \leq B$, where $f(x,y)$ is the Piecewise Linear Contrast Stretch in the image, a, b, and c are appropriate constants, which are the slopes in the respective regions and B is the maximum intensity value.

Nonlinear contrast enhancement. Nonlinear contrast enhancement typically involves histogram equalizations through the use of an algorithm. The nonlinear contrast stretch method has one major disadvantage. Each value in the input image can have several values in the output image, so that objects in the original scene lose their correct relative brightness value. There are four methods of nonlinear contrast enhancement: Histogram Equalizations, Adaptive Histogram Equalization, Unsharp Mask, and Homomorphic Filter.

Histogram equalization is a common form of nonlinear contrast enhancement, involving equalizing the image's histogram by redistributing all pixel values of the image so that there are approximately an equal number of pixels in each of the user-specified output gray-scale classes (e.g., 32, 64, and 256). Contrast is increased at the most populated range of brightness values of the histogram (or "peaks"), and it automatically reduces the contrast in very light or dark parts of the image associated with the tails of a normally distributed histogram. Histogram equalization can also separate pixels into distinct groups, if there are few output values over a wide range. Histogram equalization is effective only when the original image has a poor contrast to start with, since otherwise histogram equalization may degrade the image quality.

In an adaptive histogram equalization the image is divided into several rectangular domains, an equalizing histogram is computed and levels are modified so that they match across boundaries, depending on the nature of the nonuniformity of the image. Adaptive histogram equalization acts as a local operation and uses the histogram equalization mapping function supported over a certain size of a local window to determine each enhanced density value. Therefore, regions occupying different gray scale ranges can be enhanced simultaneously. A histogram modification may be applied to each pixel to improve local contrast based on the histogram of pixels that are neighbors to a given pixel, typically resulting in maximum contrast enhancement. According to this method, we partition the given image into blocks of suitable size and equalize the histogram of each sub-block, and in order to eliminate artificial boundaries created by the process, the intensities are interpolated across the block regions using bicubic interpolating functions.

Homomorphic filter is a filter which controls both high-frequency and low-frequency components. The homomorphic filtering technique has a multiplicative model and aims at handling image of large intensity. When images are acquired by optical means, the image of the object is a product of the illuminating light source and the reflectance of the object, as described by: $f(x,y)=I(x,y)\rho(x,y)$, where I is the intensity of the illuminating light source, f is the image, and $0 \leq \rho \leq 1$ is the reflectance of the object. In order to enhance an image with a poor contrast, we can use the model and selectively filter out the light source while boosting the reflectance component. The result will be an enhancement of the image. In order to separate the two components, they must be additive, therefore it is required to transform the image into a log domain, whereby the multiplicative components become additive, as Ln (f)=Ln (I)+Ln ($\rho$). Since the natural logarithm is monotonic, Ln (I) is low pass and Ln ($\rho$) is high pass, thus an image f'=ln (f) has additive components and can therefore be selectively filtered by a linear filter. In order to enhance an image, the homomorphic filter must have a higher response in the high-frequency region than in the low-frequency region so that the details, which fall in the high-frequency region, can be accentuated while lowering the illumination component.

The unsharp mask method is a technique to increase the sharpness in the image contrast, and unsharp masking can be expressed by y(m,n)=f(m,n)+a*g(m,n) where: f is the input image, y is the sharpened image, g is the gradient image, and a is the contrast constant greater than zero.

Various contrast enhancement techniques may be used to improve the contrast of a digital image, including linear and non-linear stretching, histogram equalization or specification, and adaptive histogram modification, such as the contrast enhancement techniques that are described in a presentation by Yao Wang (of Polytechnic University, Brooklyn, N.Y.) (downloaded June 2015) entitled: "*EL5123—Image Processing—Contrast Enhancement*", in an article by S. Gayathri, N. Mohanapriya, and Dr. B. Kalaavathi (all of Tiruchengode, Namakkal, India) published on International Journal of Advanced Research in Computer and Communication Engineering, Vol. 2, Issue 11, November 2013 [ISSN: 2319-5940], entitled: "*Survey on Contrast Enhancement Techniques*", in an article by Manpreet Kaur, Jasdeep Kaur, and Jappreet Kaur (of Guru Nanak Engineering College, Ludhiana, India), published on International Journal of Advanced Computer Science and Applications (IJACSA) Vol. 2, No. 7, 2011, entitled: "*Survey of Contrast Enhancement Techniques based on Histogram Equalization*", in an article by Sandeep Singh and Sandeep Sharma (of GNDU, Amristar) published on International Journal of Computer Science (IIJCS) Volume 2, Issue 5, May 2014 [ISSN 2321-5992] entitled: "*A Survey of Image Enhancement Techniques*", and in an article by Mr. Salem Saleh Al-amri et al. published on Internation Journal of Computer Science and Network Security (IJCSNS) Vol. 10 No. 2, February 2010 entitled: "*Linear or Non-Linear Contrast Enhancement Image*", which are all incorporated in their entirety for all purposes as if fully set forth herein. Various image contrast enhancement techniques are further described in U.S. Pat. No. 6,463,173 to Tretter entitled: "System and Method for Histogram-Based Image Contrast Enhancement", and in U.S. Pat. No. 8,228,560 to Hooper entitled: "Image Contrast Enhancement", which are both incorporated in their entirety for all purposes as if fully set forth herein.

Line segment. A line segment herein refers to a part of a straight line that is bounded by two distinct end-points, and contains every point on the line between the end points. Examples of line segments include the sides of a triangle or a square. More generally, when both of the segment end points are vertices of a polygon or polyhedron, the line segment is either an edge or side (of that polygon or polyhedron) if they are adjacent vertices, or otherwise a diagonal. Commonly, photos in a photo album are in a form of a rectangle, which is any quadrilateral with four right angles.

Before the digital era, consumers have been taking pictures that were stored as hard copy prints. These photos (or prints) were taken at various personal and professional occasions, often having great sentimental value to the taker and the people associated therewith, typically for viewing thereafter. Due to the relatively inexpensive nature of taking photographs, people have often taken many photographs over the years. While some attempts have been made in trying to organize the images and pictures taken by consumers, often due to the extensive amount of pictures taken, the photographic prints are stored into various containers such as photo albums and shoe boxes in random fashion. Thus, over the course of many years, people often store hundreds of pictures in boxes where the images are not placed in any particular order or organization. While there are various solutions for arranging and storing digitally captured images (such as images captured by digital cameras), there is a need for easy sorting and organizing photographs for the consumer to go through, rather than sorting a pile of stored pictures or in photo albums. Further, there is a need to harmonized and align the methods of arrangement and handling of digital images with those used with hardcopy photos.

Various providers are available for providing a service of scanning of photos and photo albums. However, these services require the customer to send physically the photos to the service provider for physical scanning, which is inconvenient, costly, and time-consuming. Such services are provided for example by ScanCafe Inc. (Headquartered in Hayward, Calif., U.S.A.) offering services as described in the web page www.scancafe.com/services/photo-scanning (preceded by http://) downloaded June 2015, which is incorporated in its entirety for all purposes as if fully set forth herein, or by EverPresent (Headquartered in Newton, Mass., U.S.A.) offering services as described in the web page everpresentonline.com/services/photo-scanning-to-digital (preceded by http://) downloaded June 2015, which is incorporated in its entirety for all purposes as if fully set forth herein.

Various services associated to the digital images are known such as digital archive and internet storage services, and such services are provided for example by FOREVER.com (Headquartered in Pittsburgh, Pa., U.S.A.) offering services as described in the web page www.forever.com/features (preceded by https://) downloaded June 2015, which is incorporated in its entirety for all purposes as if fully set forth herein, or by iMemories Inc. (Headquartered in Scottsdale, Ariz., U.S.A.), offering services as described in the web page www.imemories.com/features (preceded by http://) downloaded June 2015, which is incorporated in its entirety for all purposes as if fully set forth herein.

Availability of printed photos enable users to store, organize, manage, edit, enhance, and share digital images locally, or over the Internet using a web browser or other software applications. A user may also share photos, post photos online, and create personalized photo products or projects. Creating personalized image products, however, can take a considerable amount of time and effort. Additionally, it is challenging to personalize image products using mobile devices because these devices often have smaller displays, lower communication bandwidth, and possibly have lower computing power compared to the desktop computers. Users of mobile devices also tend to have shorter attention spans than users of desktop or laptop computers. Further, customers are often interested to design and personalize their products. The term "personalized" refers to the information that is specific to the recipient, the user, the gift product, and the occasion, which may include personalized content, personalized text messages, personalized images, and personalized designs that can be incorporated in the image products. The content of personalization may be provided by a user or selected by the user from a library of content provided by the service provider. Examples of the image-based products include image prints, photo books, photo calendars, photo greeting cards, holiday cards, photo stationeries, photo mugs, and photo T-shirts, which incorporate image content provided by the user or the image service provider.

A computer-implemented method for creating an image collage is described in U.S. Patent Application Publication No. 2014/0307980 to Hilt entitled: "Adaptive and fast Image Collage Creation", which is incorporated in its entirety for all purposes as if fully set forth herein. The method includes automatically selecting a first image from the group of images that best fits image-collage template based on pre-determined criteria, placing and fitting the first image in the image-collage template, automatically selecting one or more additional images from the group of images that best fits the image-collage template including one or more already placed images that include the first image, and placing and fitting the one or more additional images image in the image-collage template by the computer system. An image collage is formed after all the images in the group are placed in the image-collage template. A computer software product and a method of organizing and searching images, where the digital images may be obtained from a plurality of hard copy prints that are digitally scanned, and where the digital images are analyzed in accordance with a pre-determined criteria are described in a U.S. Pat. No. 7,260,587 to Testa et al., entitled: "Method for Organizing Digital Images", which is incorporated in its entirety for all purposes as if fully set forth herein.

A digital image manipulation system for automatically cropping acquired digital images is described in U.S. Pat. No. 8,406,515 to Cheatle entitled: "Method for Automatically Cropping Digital Images", which is incorporated in its entirety for all purposes as if fully set forth herein. The system includes a memory device configured to store at least one acquired digital image, a crop analysis segmentation subsystem configured to divide at least one image into a set of similarly colored regions, a classification subsystem configured to classify each region into one of a set of possible classes which include subject background and distraction at a minimum, an optimization search configured to search possible crop boundaries and a selection module configured to automatically select a highest rated crop boundary determined from the search and based on an optimization criterion that is derived from results of the crop analysis segmentation and classification subsystems.

An image processing apparatus and method, an image capturing apparatus, and a program which make it possible to crop an image with an optimal composition even for a subject other than a person is described in U.S. Patent Application Publication No. 2010/0290705 to Nakamura entitled: "Image Processing Apparatus and Method, Image Capturing Apparatus, and Program", which is incorporated in its entirety for all purposes as if fully set forth herein. The disclosure describes a composition pattern setting section sets a composition pattern corresponding to an input image, on the basis of the number of salient regions to which attention is directed in the input image, and the scene of the input image. On the basis of the composition pattern set by the composition pattern setting section, a composition analyzing section determines a crop region in the input image which is optimal for an image to be cropped in the composition pattern from the input image.

A method and system for cropping an image is described in U.S. Pat. No. 7,529,390 to Zhang et al. entitled: "Automatically cropping an image", which is incorporated in its entirety for all purposes as if fully set forth herein. The cropping system automatically crops an image by selecting an image template whose condition is best satisfied by the image and then by selecting a cropping of the image that best attains the goal of the selected image template, and may use a metric or objective function to rate how well a cropping attains the goal of the selected image template. The cropping system may apply various optimization algorithms to identify a cropping that is the best as indicated by the metric, and can then automatically crop the image based on the identified cropping.

An image processing apparatus that determines crop positions for an image including a plurality of objects in a preferred manner is described in U.S. Patent Application Publication No. 2014/0176612 to Tamura; Yusuke; et al. entitled: "Image Processing Apparatus, Image Capturing Apparatus, Image Processing Method, and Storage Medium", which is incorporated in its entirety for all purposes as if fully set forth herein. The image processing apparatus specifies object regions from the image and sets a plurality of crop region candidates for each of the specified object regions. The image processing apparatus selects a predetermined number of crop regions from among the plurality of crop region candidates based on evaluation values obtained for the plurality of crop region candidates and on similarities among the plurality of crop region candidates.

Methods and systems for cropping images of book pages are disclosed in U.S. Pat. No. 7,945,116 to Curtis entitled: "Computer-Assisted Image Cropping for Book Scans", which is incorporated in its entirety for all purposes as if fully set forth herein. The method may include identifying reference images and receiving cropping rectangles for the reference images. These cropping rectangles associated with reference images may then be used to generate cropping rectangles for images of book pages between the reference images, and may be generated based on a linear interpolation of the cropping rectangles associated with the reference images and the number of pages between images. The method may also display one or more images of book pages with the associated one or more cropping rectangles superimposed thereon. A user may then have the opportunity to adjust the position and/or size of the cropping rectangles.

A method for auto-cropping is described in U.S. Pat. No. 8,660,351 to Tang entitled: "Auto-Cropping Images Using Saliency Maps", which is incorporated in its entirety for all purposes as if fully set forth herein. The method includes, creating a saliency map corresponding to a digital image, the saliency map indicating a relevance of pixels within the digital image with saliency values within a number range, a lower end of the number range being less than zero and an upper end of the number range being greater than zero. The method further includes analyzing the saliency map to find a potential cropping rectangle, the potential cropping rectangle having a maximum sum of saliency values within borders of the rectangle.

A method and computer program/system for cropping a digital image is described in U.S. Pat. No. 6,654,506 to Luo et al. entitled: "A Method for Automatically Creating Cropped and Zoomed Versions of Photographic Images", which is incorporated in its entirety for all purposes as if fully set forth herein. The method includes inputting a belief map of a photographic image, (a belief value at a location in the belief map indicates an importance of a photographic subject at the same location in the photographic image), selecting a zoom factor and a crop window, clustering regions of the belief map to identify background portions, secondary portions and main portions, positioning the crop window such that the crop window is centered around a main portion having a highest belief value, moving the crop window such that the crop window is included completely within the image, moving the crop window such that a sum of belief values is at a maximum, and cropping the image according to the crop window.

A method for selecting important digital images in a collection of digital images is described in U.S. Pat. No. 8,774,528 to Hibino et al. entitled: "Method of Selecting Important Digital Images", which is incorporated in its entirety for all purposes as if fully set forth herein. The method comprising: analyzing the digital images in the collection of digital images to identify one or more sets of similar digital images; identifying one or more sets of similar digital images having the largest number of similar digital images; selecting one or more digital images from the identified largest sets of similar digital images to be important digital images; and storing an indication of the selected important digital image in a processor accessible memory.

U.S. Pat. No. 6,535,636 to Savakis, entitled "Method for Automatically Detecting Digital Images That are Undesirable for Placing in Albums", which is incorporated in its entirety for all purposes as if fully set forth herein, teaches automatically determining an overall image quality parameter by assessing various technical image quality attributes (e.g., sharpness, contrast, noise, and exposure). U.S. Pat. No. 6,658,139 to Coolcingham et al., entitled "Method for Assessing Overall Quality of Digital Images", which is incorporated in its entirety for all purposes as if fully set forth herein teaches a method determining a numerical representation of user perceived overall image quality of a digital image. The method involves creating a digital reference image series with each reference digital image having a corresponding numerical representation of overall image quality. User inputs are collected while iteratively displaying a digital test image in comparison with the digital reference images. The user inputs are analyzed to infer a numerical representation of the overall image quality of the digital test image. U.S. Pat. No. 6,940,545 to Ray, entitled "Face Detecting Camera and Method", which is incorporated in its entirety for all purposes as if fully set forth herein, teaches automatically assessing aesthetic image quality based on whether detected faces are positioned in a location consistent with the 'rule of thirds'.

Pre- and post-capture user interaction monitoring has also been used to determine important images. Such approaches are based on the monitoring of user behavior, changes to user expressions, or changes to user physiology while capturing, viewing, or utilizing images. These techniques often involve additional devices such cameras to monitor, record, and analyze facial expressions or eye gaze or dilation, or devices that monitor galvanic skin response (GSR), heart rate, breathing rate or the like. In other cases, user interaction with images is monitored and recorded within the capture device to monitor user interactions with the image capture device. For example, interaction with the zoom control, exposure button, exposure modes and settings can be monitored to determine the level of effort the user engaged in to capture the image. Similarly post capture interaction, such as image review with a capture device's integrated display screen or after the images have been transferred to a computer or printer, these interactions can be analyzed to determine via utilization models which images are important to users. U.S. Pat. No. 7,620,270 to Matraszek et al. entitled "Method for Creating and Using Affective Information in a Digital Imaging System", which is incorporated in its entirety for all purposes as if fully set forth herein, discloses a retrieval procedure for stored digital images based a user's affective information. The affective information is obtained by a signal detecting means representing an emotional reaction of the user to one of the stored digital images. Digital images are categorized based on the affective information. U.S. Pat. No. 7,742,083 to Fredlund et al., entitled "In-camera Dud Image Management", which is incorporated in its entirety for all purposes as if fully set forth herein, teaches automatically determining a value index from one or more of: user inputs to said camera during capture, usage of a particular image record following capture, semantic image content of an image record, and user reactions to the image record. Image records are classified into unacceptable image records having value indexes within a predetermined threshold and acceptable image records having respective said value indexes beyond the predetermined threshold.

In consideration of the foregoing, it would be an advancement in the art to provide an image analysis solution and other methods and systems for improving capturing, arrangement, storage, or any other handling of photos and other papers, that are simple, secure, cost-effective, load-balanced, redundant, reliable, provide lower CPU and/or memory usage, easy to use, reduce latency, faster, has a minimum part count, minimum hardware, and/or uses existing and available components, protocols, programs and applications for providing better quality of service, overload avoidance, better or optimal resources allocation, better communication and additional functionalities, and provides a better user experience.

SUMMARY

A method for detecting one or more rectangular-shaped objects regions in a captured image is disclosed. The method may comprise obtaining (such as capturing) the captured image by using a digital camera; detecting corners within the captured image, each corner defined by a point location and two direction; producing a list of quads (or any other polygons) in the captured image, each of the quads (or any other polygons) may be a quadrilateral having two or more vertices that may be selected from the detected corners; estimating for each pair of quads selected from the list a correlation value corresponding to underlying similarities of the quads (or any other polygons) pair; selecting quads (or any other polygons) from the list based on the estimated correlation values; analyzing the content of each of the regions defined by the selected quads (or any other polygons); or determining that the regions defined by the selected quads (or any other polygons) correspond to the objects regions.

Alternatively or in addition, the method may be used for detecting one or more objects regions in the captured image, each of the boundaries of the objects regions is defined by an N-sides polygon having N vertices and satisfies a first criterion, where N=3, 4, 5, 6, 7, or 8, and each pair of boundaries of the objects regions is corresponding to underlying similarity that satisfies a second criterion, where the content in each of the object region satisfies a third criterion. The method may comprise analyzing the captured image for detecting items using an image processing algorithm; producing a list of polygons in the captured image based on the detected items, wherein each of the polygons is an N-sides polygon having N vertices; checking each of the polygons in the list for satisfying the first criterion; removing from the list the polygons that are not satisfying the first criterion; checking each pair of polygons selected from the list for satisfying the second criterion; selecting polygons from the list based on satisfying the second criterion; checking the content of each of the regions defined by the selected polygons for satisfying the third criterion; and determining that the regions defined by the selected polygons that satisfies the third criterion correspond to the objects regions. The items may be corners, each corner defined by a point location and two direction, and the image processing algorithm may be according to, may be based on, or may consist of, a corner detection algorithm.

The N-sides polygon may be a simple and convex polygon, such as an equiangular or an equilateral polygon, where N=3 whereby the N-sides polygon is a triangle that may be a right, obtuse, or acute triangle, where N=4 whereby the N-sides polygon is a quadrilateral, that may be a rectangle, a square, a trapezium, a trapezoid, a parallelogram, a kite, or a rhombus, or where N=5 whereby the N-sides polygon is a pentagon that may be a regular pentagon or a pentagram.

The captured image may be obtained by capturing an image using a digital camera, and the method may further comprise obtaining the captured image. A non-transitory tangible computer readable storage media may comprise code to perform the steps of the method, and a device housed in a single enclosure may comprise in the single enclosure the digital camera, a memory for storing computer executable instructions, and a processor for executing the instructions. The processor may be configured by the memory to perform acts comprising the method. The single enclosure may be a portable or a hand-held enclosure, the device may be battery-operated, and the device may consist of, comprise, or may be part of, a notebook, a laptop computer, a media player, a cellular phone, a tablet, a Personal Digital Assistant (PDA), or an image-processing device.

The objects may be rectangular-based papers, such as photographs, and the captured image may comprise an entire or part of a page of a photo album. Alternatively or in addition, the objects may be receipts, business cards, sticky notes, printed newspapers, or stamps. The captured image may be a single image file that may be in a format that may be according to, may be based on, or may consist of, Portable Network Graphics (PNG), Graphics Interchange Format (GIF), Joint Photographic Experts Group (JPEG), Windows bitmap (BMP), Exchangeable image file format (Exif), Tagged Image File Format (TIFF), or Raw Image Formats (RIF).

The obtaining of the captured image may comprise capturing the captured image using the digital camera that may be part of, or comprise, a single enclosure that may be a portable or a hand-held enclosure that may include a battery for powering the digital camera. The single enclosure may comprise a notebook, a laptop computer, a media player, a cellular phone, a tablet, a Personal Digital Assistant (PDA), or an image-processing device. Alternatively or in addition, the obtaining of the captured image may comprise fetching the captured image from a memory that may be a volatile memory or a non-volatile memory that may consist of, or may comprise, a Hard Disk Drive (HDD), a Solid State Drive (SSD), RAM, SRAM, DRAM, TTRAM, Z-RAM, ROM, PROM, EPROM, EEPROM, Flash-based memory, CD-RW, DVD-RW, DVD+RW, DVD-RAM BD-RE, CD-ROM, BD-ROM, and DVD-ROM.

The captured image may be a color image that may be using a color model. The color model may be according to, or may be based on, a CIE color space, and wherein the color model may consist of, may be according to, or may be based on, CIE 1931 RGB, CIE 1931 XYZ, CIELUV, or CIEUVW color model. Alternatively or in addition, the color model may be according to, or may be based on, an RGB color space, and may consist of, may be according to, or may be based on, RGB, sRGB, Adobe RGB, Adobe Wide Gamut RGB, ProPhoto RGB color space, Apple RGB, ISO RGB, ROMM RGB, International Telecommunication Union (ITU) Radiocommunication Sector (ITU-R) Recommendation ITU-R BT.709, or ITU-R BT.202 color model. Alternatively or in addition, the color model may be according to, or may be based on, the Luma plus chrominance (YUV) color space, and may consist of, may be according to, or may be based on, YUV, YCbCr, Y'CbCr, YDbDr, YPbPr, xvYCC, YCgCo, or YIQ color model. Alternatively or in addition, the color model may be according to, or may be based on, a Hue and Saturation color space, and may consist of, may be according to, or may be based on, HSL (Hue-Saturation-Lightness), HSV (Hue-Saturation-Value), or HSI (Hue-Saturation-Intensity) color model.

The method may further comprise capturing a first image by the digital camera and forming the captured image by converting the first image from the color space to a grayscale format, and the converting of the captured image to a grayscale format may be according to, may be based on, or may be using, linearly encoding grayscale intensity from linear RGB. The color space may be RGB based, and the converting may be based on calculating for each pixel a grayscale value that may be based on the pixel value 'r' representing R where $0 \leq r \leq 255$, the pixel value 'g' representing G where $0 \leq g \leq 255$, and the pixel value 'b' representing B where $0 \leq b \leq 255$. Alternatively or in addition, the method may be used with a color weighting coefficients $\alpha$, $\beta$, and $\gamma$, so that $\alpha+\beta+\gamma=256$, and a grayscale value may be calculated for each pixel in the captured image according to $c=[(\alpha*r)+(\beta*g)+(\gamma*b)]/256$. Alternatively or in addition, the method may be used with a color weighting coefficients $\alpha$, $\beta$, and $\gamma$, where $\alpha=76$, $\beta=150$, and $\gamma=28$, and a grayscale value may be calculated for each pixel in the captured image according to $c=[(\alpha*r)+(\beta*g)+(\gamma*b)]/256$.

The method may further comprise capturing a first image by the digital camera, and downscaling the first image using a downscaling algorithm, to form the captured image by downscaling the first image. The first image may be a color image in a color space, and the method may further comprise converting the captured image from the color space to a grayscale format. The captured image may include less than 10%, 7%, 5%, 3%, or 1% pixels of the first image, or may include less than 10,000, 5,000, 2,000, or 1,000 pixels. The downscaling algorithm may be according to, may be based on, or may use, an adaptive image interpolation algorithm or a non-adaptive image interpolation algorithm. The non-adaptive image interpolation algorithm may consist of, may comprise, or may be part of, nearest-neighbor replacement, bilinear interpolation, bi-cubic interpolation, Spline interpolation, Lanczos interpolation, or a digital filtering technique.

The detecting of the corners may be according to, may be based on, or may consist of, a corner detection algorithm. The detecting of the corners may comprise detecting straight-line segments in the captured image, the detecting may be according to, may be based on, or may consist of, a pattern recognition algorithm, a Line Segment Detectors (LSD) technique, a Hough transformation, or an edge detection algorithm. The edge detection algorithm may be according to, may be based on, or may consist of, Canny edge detection, Sobel operator, Prewitt operator, Deriche edge detector, RANSAC, or Differential edge detection (such as by using Apple Quartz™ 2D software application). Alternatively or in addition, the edge detection algorithm may be according to, may be based on, or may use, a first-order derivative expression, second-order derivative expression, a non-linear differential expression, a gradient magnitude, zero-crossing detection, or a Gaussian smoothing.

Alternatively or in addition, the detecting of the corners further may comprise extending the detected straight-line segments towards the edges of the captured image, may further comprise detecting intersections in the captured image of the detected straight-line segments extensions, and may further comprise identifying each intersection as a corner, the intersection point location may be determined as the corner point location, and the corner directions may be determined as the directions to the detected line segments forming the extensions at the intersection point. The method may be used with an angle tolerance $\theta$, and an intersection may be identified as a corner only if the angle $\phi$ formed between the two extensions in their intersection point may be in a range of $90°-\theta \leq \phi \leq 90°+\theta$, and the angle tolerance $\theta$ may be equal to, or less than, 15°, 10°, 7°, 5°, 3°, or 1°.

The list of quads (or polygons) may include only quads (or polygons) where two of the detected corners may be diagonal vertices, such as wherein one of the diagonal vertices consists of a corner having an up direction component towards the top edge of the captured image and a right direction component towards the right edge of the captured image, and the other corner having a down direction component towards the bottom edge of the captured image and a left direction component towards the left edge of the captured image, or wherein one of the diagonal vertices consists of a corner having a down direction component towards the bottom edge of the captured image and a right direction component towards the right edge of the captured image, and the other corner having an up direction component towards the top edge of the captured image and a left direction component towards the left edge of the captured image. The method may be used with a feature associated with a threshold value, and may further comprise removing from the list quads (or polygons) that their related feature does not satisfy the threshold value and may further be used with multiple features, each associated with a respective threshold value, and may further comprise removing from the list quads (or polygons) that their at least one of the features do not satisfy the threshold values associated with the at least one of the features. The feature may comprise the quad (or polygon) size measured by the pixels counts in the quad (or polygon), the threshold value may be a minimum value, and a quad (or polygon) having a size below the minimum value may be removed from the list. The minimum value may be equal to, or less than, 5%, 3%, or 1% of the pixels count in the captured image, or the minimum value may be equal to, or less than, 1000, 500, 300, or 100 pixels.

The method may further comprise detecting straight-line segments in the captured image, the detecting of straight-line segments may be part of the detecting of corners in the captured image, and the feature may be based on, or may comprise, a total length of the detected straight-line segments in the quad (or polygon) perimeter; and the threshold value may be a minimum value. The feature may be the ratio of the total length of the detected straight-line segments to the total quad (or polygon) perimeter length, and a quad (or polygon) having a ratio below the minimum value may be removed from the list. The minimum value may be equal to, or may be less than, 50%, 55%, 60%, 70%, 80%, 85%, 90%, or 95%. The method may further comprise detecting in the list all the pairs of a first and second quads (or polygons) wherein a first region defined by the first quad (or polygon) may be part of a second region defined by the second quad (or polygon), and may further comprise determining whether the same detected line segments may be included in both the first and second regions, and comprising responsive to the detecting that the same detected line segments are included in both the first and second regions, removing the first quad (or polygon) from the list.

The feature may be an aspect ratio of the quad (or polygon), and the method may further comprise calculating an aspect ratio for each a quad (or polygon) by dividing the horizontal length by the vertical length of the quad (or polygon), and the threshold value may be associated with a minimum value or a maximum value. A quad (or polygon) having an aspect ratio below the minimum value or above the maximum value may be removed from the list, and using a tolerance value $\alpha$, the minimum value may be $3/4*(1-\alpha)$, $2/3*(1-\alpha)$, $5/7*(1-\alpha)$, $8/10*(1-\alpha)$, or $11/14*(1-\alpha)$, or the maximum value may be $4/3*(1+\alpha)$, $3/2*(1+\alpha)$, $7/5*(1+\alpha)$, $10/8*(1+\alpha)$, or $14/11*(1+\alpha)$, wherein $\alpha$=30%, 25%, 20%, 15%, 10%, or 5%.

The correlation value may correspond to a similarity in size of the quads (or polygons) pair, wherein a first quad (or polygon) in the pair defines a region includes Na pixels, the second quad (or polygon) in the pair defined a region includes Nb pixels, and the correlation value may be based on |Na−Nb|, on 1−(|(Na−Nb)|)/(Na+Nb), or on comparing 1−(|(Na−Nb)|)/(Na+Nb) to the maximum value. The correlation value may be set to 1 responsive to 1−(|(Na−Nb)|)/(Na+Nb)≤MAX, and the maximum value may be equal to, or higher than, 75%, 80%, 85%, 90%, or 95%.

The correlation value may correspond to a similarity in aspect ratio of the quads (or polygons) pair wherein an aspect ratio of a first quad (or polygon) in the pair may be ASPRa, an aspect ratio of a second quad (or polygon) in the pair may be ASPRb, and the correlation value may be based on ASPRa/ASPRb or on |ASPRa−ASPRb|, or on comparing ASPRa/ASPRb to a threshold value. The threshold value may be a maximum value MAX, and the method may further comprise setting the correlation value to 1 responsive to 1≤ASPRa/ASPRb≤MAX, where the maximum value may be equal to 1.05, 1.1, 1.15, 1.2, 1.25, 1.3, or 1.35. Alternatively or in addition, the method according to claim 4 wherein the threshold value may be a minimum value MIN, and the method may further comprise setting the correlation value to 1 responsive to MIN≤ASPRa/ASPRb≤1, where the maximum value may be equal to 0.95, 0.9, 0.85, 0.8, 0.75, or 0.7.

The correlation value may correspond to a size of overlapped region of the regions defined by the quads (or polygons) in the pair, wherein a first quad (or polygon) in the pair defines a region includes Na pixels, the second quad (or polygon) in the pair defined a region includes Nb pixels, the overlapped region includes Np pixels, and the correlation value may be based on Np/(Na+Nb). A maximum value MAX may be used, and the correlation value may be based on comparing Np/(Na+Nb) to the maximum value, and the method may further comprise setting the correlation value to 1 responsive to 2*Np/(Na+Nb)≤MAX, where the maximum value may be equal to 30%, 25%, 20%, 15%, 10%, or 5%.

Quads may be selected from the list in response to being associated with highest correlation values. A maximum value N may be used, the number of quads (or polygons) selected from the list may be less than N. The method according to claim 1 for use with a maximum value N, and the method may further comprise ascertaining that the number of quads (or polygons) selected from the list may be below N, and the maximum value N may be equal to, or less than, 10, 9, 8, 7, 6, 5, 4, 3, or 2.

The method may further comprise creating a symmetric matrix N*N including elements $a_{ij}$, wherein N may be the number of quads (or polygons) in the list, i=1 to N, and j=1 to N, wherein each of the elements $a_{ij}$ corresponds to the correlation value of quad (i) (or polygon) and quad (j) (or polygon). The value of any element all (i=1 to N) may be set to 1. Alternatively or in addition, the method may further comprise detecting straight-line segments in the captured image, and calculating for each quad (or polygon) in the list the ratio r(i) (where 0≤r(i)≤1) by dividing a total length of the detected straight-line segments in the polygon (i) perimeter by the total length of the polygon (i) (or quad (i)) perimeter. A constant α may be used, and the value of any element $a_{ii}$ (i=1 to N) may be calculated based on, or using, the expression $\alpha*r(i)^6$, and wherein 5≤α≤15, such as α=10. Alternatively or in addition, the method may further comprise calculating an aspect ratio ASPR(i) for each quad (i) (or polygon (i)) by dividing the horizontal length by the vertical length of the quad (or polygon), or by dividing the vertical length by the horizontal length of the quad (or polygon), and calculating for each quad (i) (or polygon (i)) the deviation s(i) of the calculated aspect ratio ASPR(i) from the closest common aspect ratios selected from the list consisting of 1, 1.25, 1.273, 1.33, 1.4, and 1.5. A constant β may be used, and the value of any element $a_{ii}$ (i=1 to N) may be calculated based on, or using, the expression $EXP(-\beta*s(i)^2)=e^{-\beta*s^2}$, and wherein 4≤β≤12, such as β=8. Alternatively or in addition, the value of any element $a_{ii}$ (i=1 to N) may be calculated based on, according to, or using, the expression $\alpha*r(i)^6*e^{-\beta*s^2}$. The method may further comprise calculating the Eigenvector of the matrix, and using a minimum value; the quads (or polygons) associated with a value in the Eigenvector that may be above the minimum value may be selected from the list.

The analyzing of the content of each of the regions may comprise generating a saliency map identifying salient pixels or saliency region in the captured image, calculating the salient pixels or the saliency regions in each of the regions defined by the selected quads (or polygons), calculating the number of salient pixels in the region divided by the total number of pixels in that region, or calculating the number of salient pixels all the regions defined by the selected quads (or polygons) divided by the total number of pixels in the captured image.

Alternatively or in addition, the checking of the content of each of the regions may comprise generating a saliency map identifying salient pixels or saliency region in the captured image, and the third criterion may comprise using, or may be based on, the identified salient pixels or saliency regions, and the method may further comprise removing from the list the polygons that are not satisfying the third criterion. Alternatively or in addition, the checking of the content of each of the regions further may comprise calculating the salient pixels or the saliency regions in each of the regions defined by the selected polygons, and may be used with a minimum threshold value, and the method may further comprise removing from the list the polygons having calculated salient pixels or the saliency regions that are less than the minimum threshold value. Alternatively or in addition, the checking of the content of each of the regions further may comprise calculating the number of salient pixels in the region divided by the total number of pixels in that region, and may be used with a minimum threshold value such as 75%, 80%, 85%, 90%, or 95%, and the method may further comprise removing from the list the polygons having the calculated number of salient pixels in the region divided by the total number of pixels in that region that are less than the minimum threshold value, Alternatively or in addition, the checking of the content of each of the regions may be using, or may be based on, a neural network, that may be a deep convolutional neural network. The neural network may be trained to detect the objects regions in the captured image, and the method may further comprise training the neural network to detect the objects regions in the captured image. Alternatively or in addition, the neural network may be trained to recognize or classify the objects the captured image and having multiple stages or layers, and the checking of the content of each of the regions may use the output of an intermediate stage or layer in the neural network. The neural network may be ImageNet having 26 stages or layers, the intermediate stage or layer may be the eighth stage or layer, the output may include 256 saliency maps, and the checking of the content may comprise generating an output map calculated by the weighted average of the 256 saliency maps.

The method may further comprise displaying on a display the captured image and the selected quads (or polygons), and the display may be based on one out of LCD (Liquid Crystal Display), TFT (Thin-Film Transistor), FED (Field Emission Display) or CRT (Cathode Ray Tube). The method may further comprise cropping or extracting from the captured image the regions defined by the selected quads (or polygons), storing in a memory each of the cropped or extracted region as an individual file, or obtaining information from a user relating to one or more of the cropped or extracted, and accordingly tagging the respective one or more files or adding the obtained information to a metadata of the respective one or more files.

The method may comprise enhancing the region image in one or more of the extracted or cropped regions, and the enhancing of the region image may comprise generating a color balanced image by correcting the color balance of the image. The region image color space may use RGB whereby each pixel is defined by (r, g, b), and the correcting the color balance may comprise obtaining a gray reference pixel values ($r_{ref}$, $g_{ref}$, $b_{ref}$); calculating the average pixel values of the region image ($r_{avg}$, $g_{avg}$, $b_{avg}$); calculating the color shift ($r_{sft}$, $g_{sft}$, $b_{sft}$) of the region image according to, or based on, ($r_{sft}$, $g_{sft}$, $b_{sft}$)=($r_{avg}$, $g_{avg}$, $b_{avg}$)−($r_{ref}$, $g_{ref}$, $b_{ref}$); and calculating the color balanced image having pixels values ($r_c$, $g_c$, $b_c$), where each pixel value is calculated ($r_c$, $g_c$, $b_c$)=(r, g, b)−($r_{sft}$, $g_{sft}$, $b_{sft}$). The gray reference pixel values may be obtained based on, or equal to, an average of pixel values in multiple images, such as an average of pixel values in all of the extracted or cropped regions.

The enhancing of the image may comprise generating a color-balanced image by correcting the color balance of the region image followed by enhancing the contrast in the color balanced image, and the enhancing of the contrast may comprise, may use, or may be based on, a linear contrast enhancement that may be Min-Max Linear Contrast Stretch, Percentage Linear Contrast Stretch, or Piecewise Linear Contrast Stretch. Alternatively or in addition, the enhancing of the contrast may comprise, may use, or may be based on, a non-linear contrast enhancement that may be Histogram Equalizations, Adaptive Histogram Equalization, Unsharp Mask, or Homomorphic Filter.

The method may further comprise transmitting one or more of the individual files over a digital network using a transmitter, and the digital network may a wireless network, and the transmitter may a wireless transmitter. The wireless network may be an in-building or in-vehicle network that may be a Wireless Personal Area Network (PAN), and the wireless transmitter may be part of a WPAN transceiver, and the WPAN may be according to, or based on, Bluetooth™ or IEEE 802.15.1-2005 standards, or the WPAN may be a wireless control network that may be according to, or may be based on, Zigbee™, IEEE 802.15.4-2003, or Z-Wave™. Alternatively or in addition, the wireless network may be a Wireless LAN (WLAN) and the wireless transmitter may be part of a WLAN transceiver, and the WLAN may be according to, or may be based on, IEEE 802.11-2012, IEEE 802.11a, IEEE 802.11b, IEEE 802.11g, IEEE 802.11n, or IEEE 802.11ac. Alternatively or in addition, the wireless network may be a cellular telephone network and the wireless transmitter may be part of a cellular telephone network transceiver, and the cellular telephone network may be according to, or may be based on, a Third Generation (3G) network that uses UMTS W-CDMA, UMTS HSPA, UMTS TDD, CDMA2000 1xRTT, CDMA2000 EV-DO, or GSM EDGE-Evolution, or wherein the cellular telephone network may be a Fourth Generation (4G) network that uses HSPA+, Mobile WiMAX, LTE, LTE-Advanced, MBWA, or may be based on IEEE 802.20-2008.

The method may further comprise using or operating an operating system, that may consist of, may comprise, may be based on, or may be using, Microsoft Windows 7, Microsoft Windows XP, Microsoft Windows 8, Microsoft Windows 8.1, Linux, or Google Chrome OS. The operating system may be a mobile operating system that may consist of, may comprise, may be based on, or may be using, Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 5, Apple iOS version 6, Apple iOS version7, Apple iOS version 8, Apple iOS version 9, Microsoft Windows® Phone version 7, Microsoft Windows® Phone version 8, Microsoft Windows® Phone version 9, or Blackberry® operating system.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments and are not therefore to be considered limiting in scope:

FIG. 10c depicts pictorially a view of overlapping photos images;

FIG. 14 illustrates schematically a correlation matrix of candidate quads;

FIG. 15a depicts pictorially a view of a saliency map of a captured image page;

DETAILED DESCRIPTION

Figure 1:
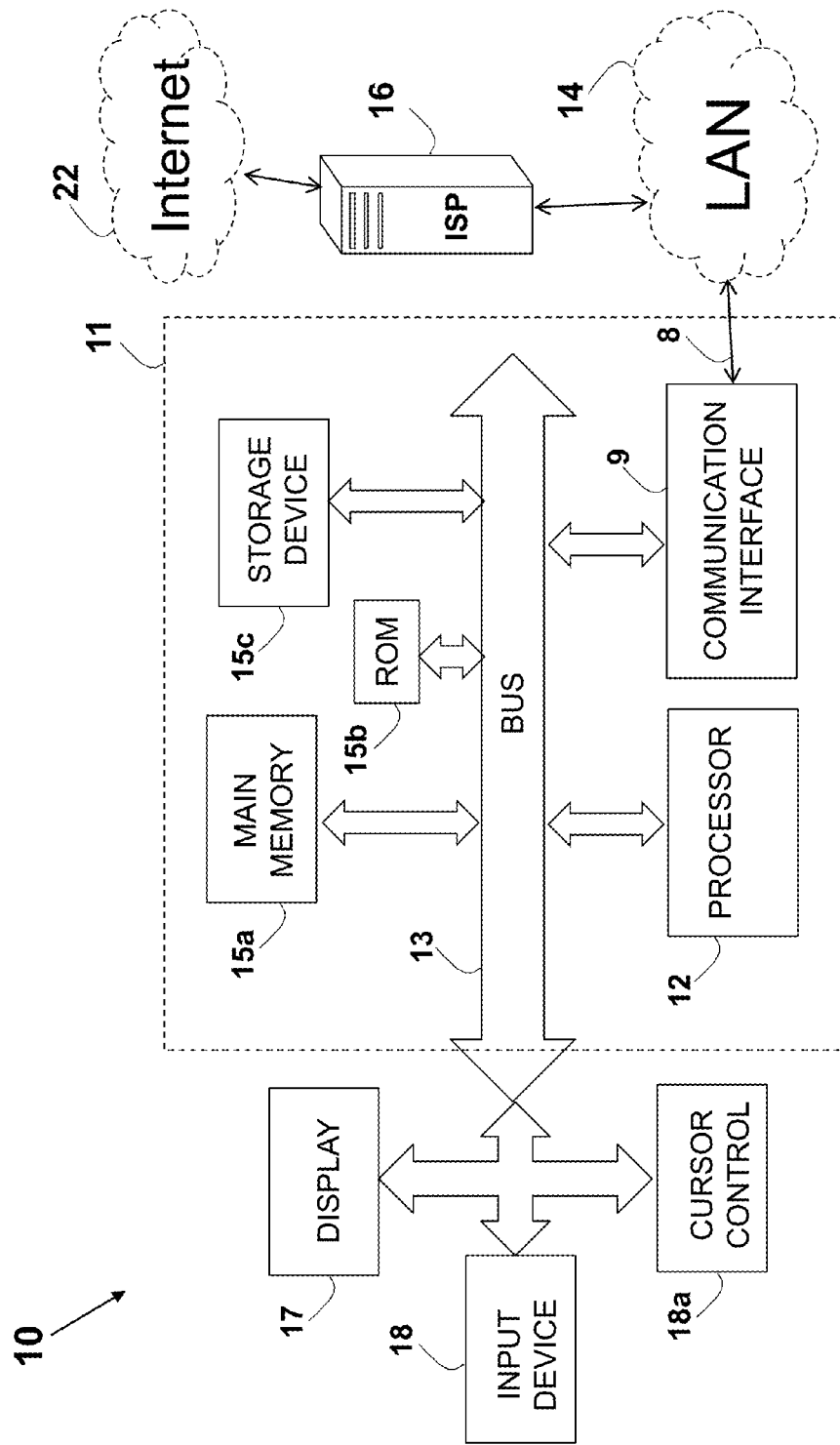
FIG. 1 illustrates schematically a block diagram of a computer.
Figure 2:
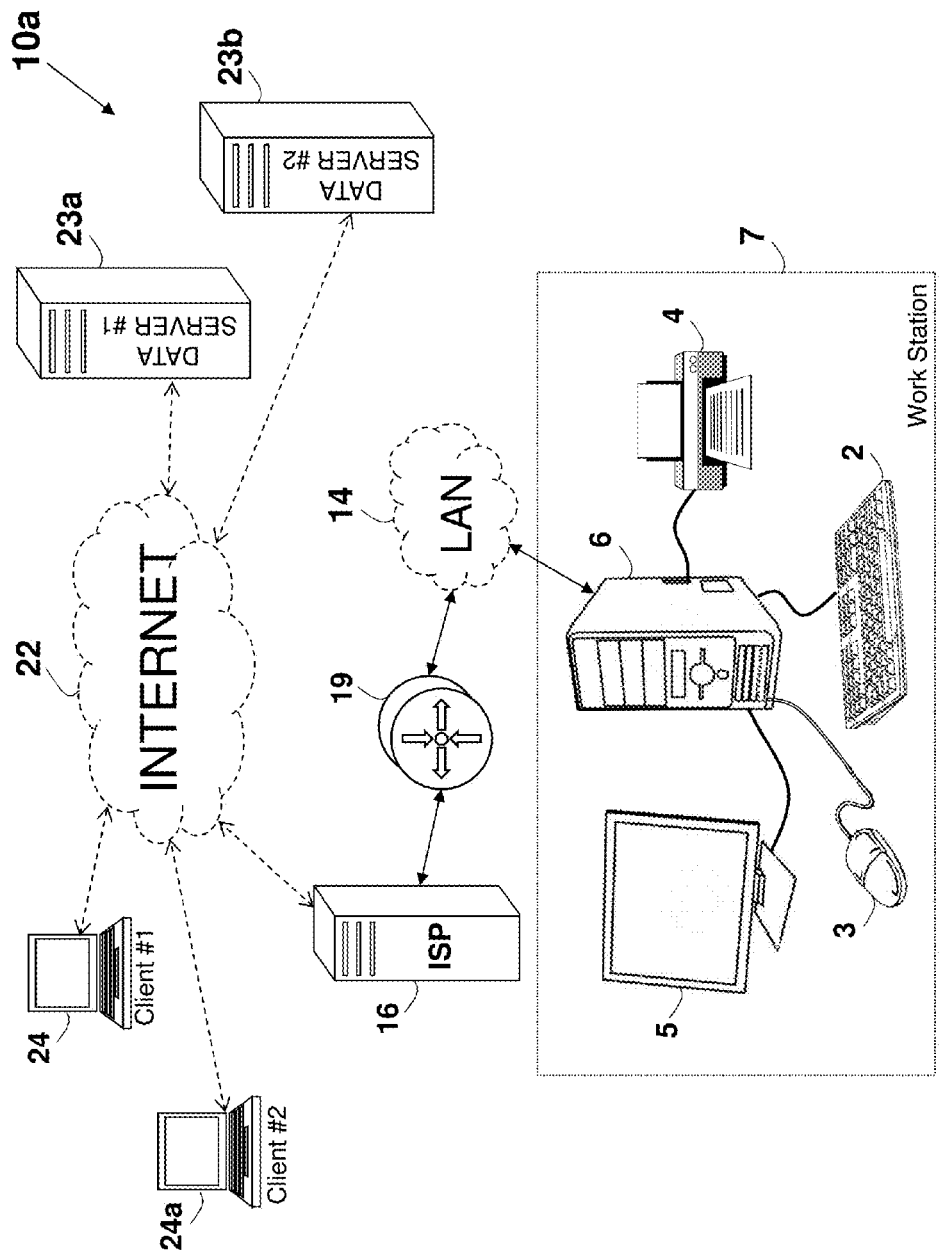
FIG. 2 illustrates schematically a block diagram of Internet, and servers, clients, and a computer workstation connected to the Internet.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively, or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5*a*, 5*b* and 5*c*) refer to functions or actual devices that are either identical, substantially similar, similar, or having similar functionality. It is readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a", "an", and "the" herein include plural referents unless the context clearly dictates otherwise. Thus, for example, a reference to "a component surface" includes a reference to one or more of such surfaces. By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention.

Figure 3:
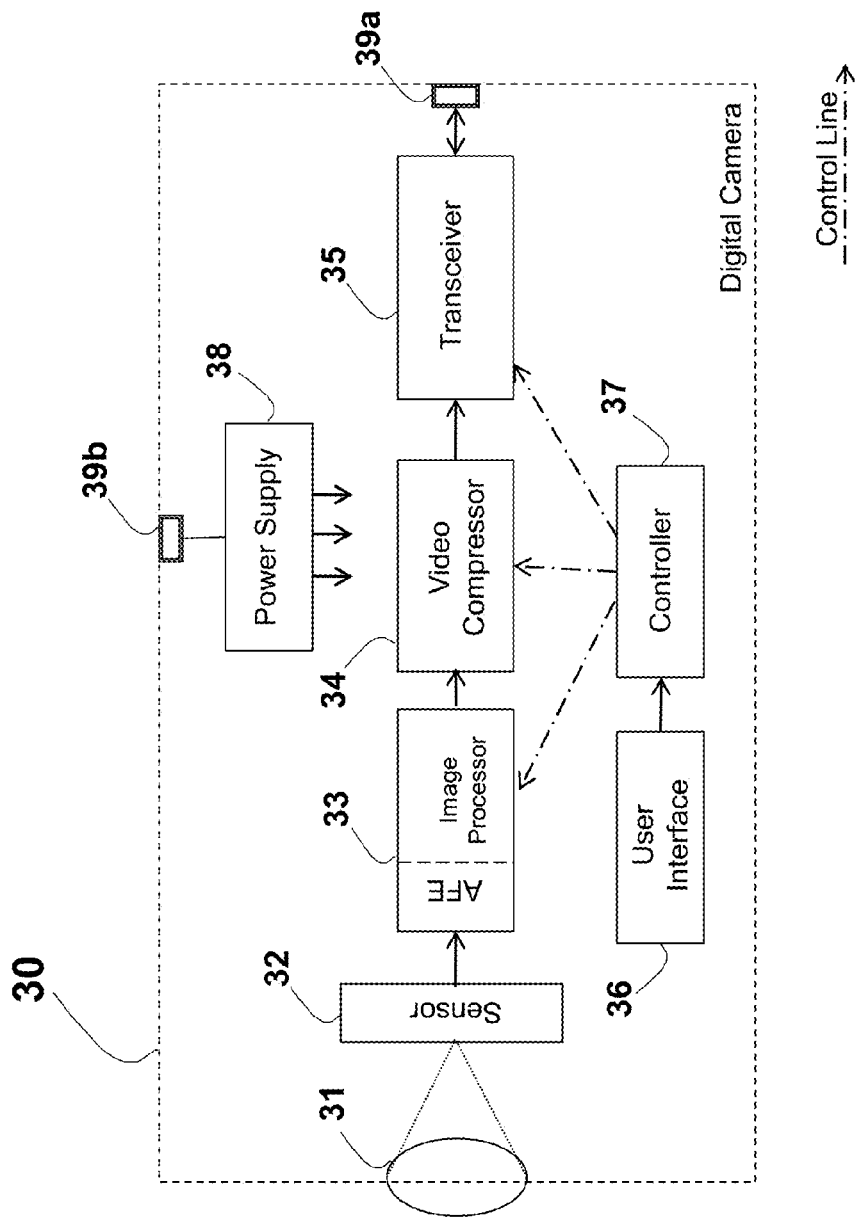
FIG. 3 illustrates schematically a block diagram of a digital camera.
Figure 4:
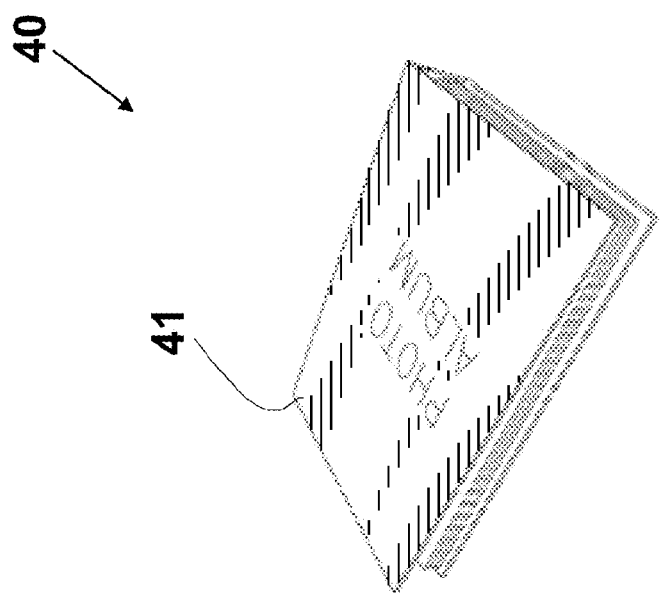
FIG. 4 depicts pictorially a closed photo album.
Figure 5:
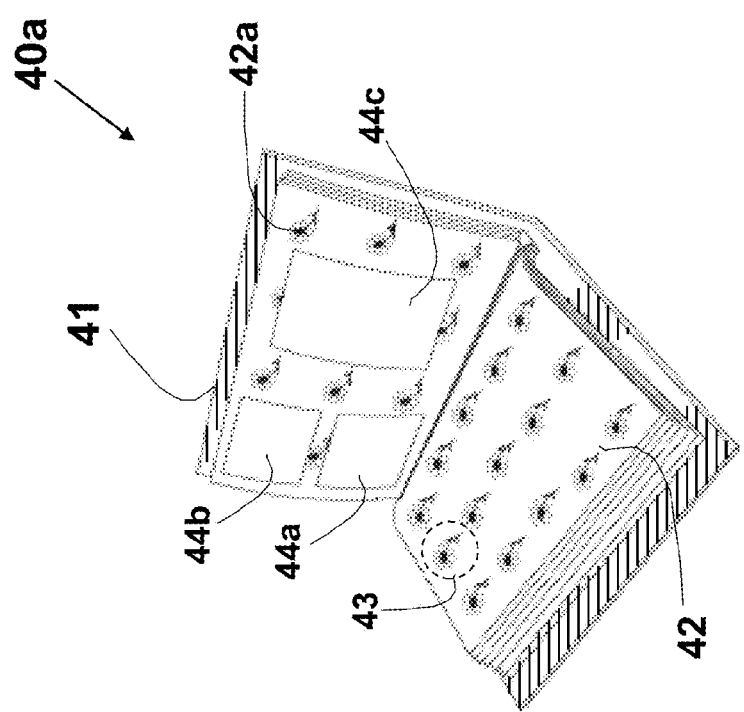
FIG. 5 depicts pictorially an open photo album.
Figure 6:
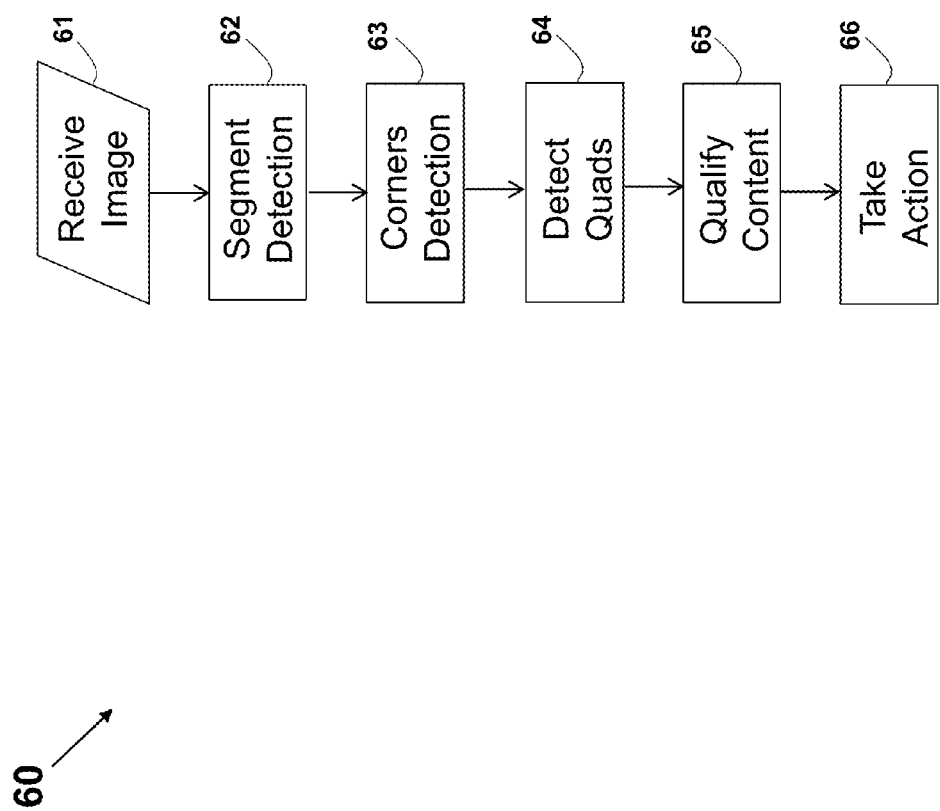
FIG. 6 illustrates schematically a flow diagram of detecting photo images in a page image of a photo album.
Figure 7:
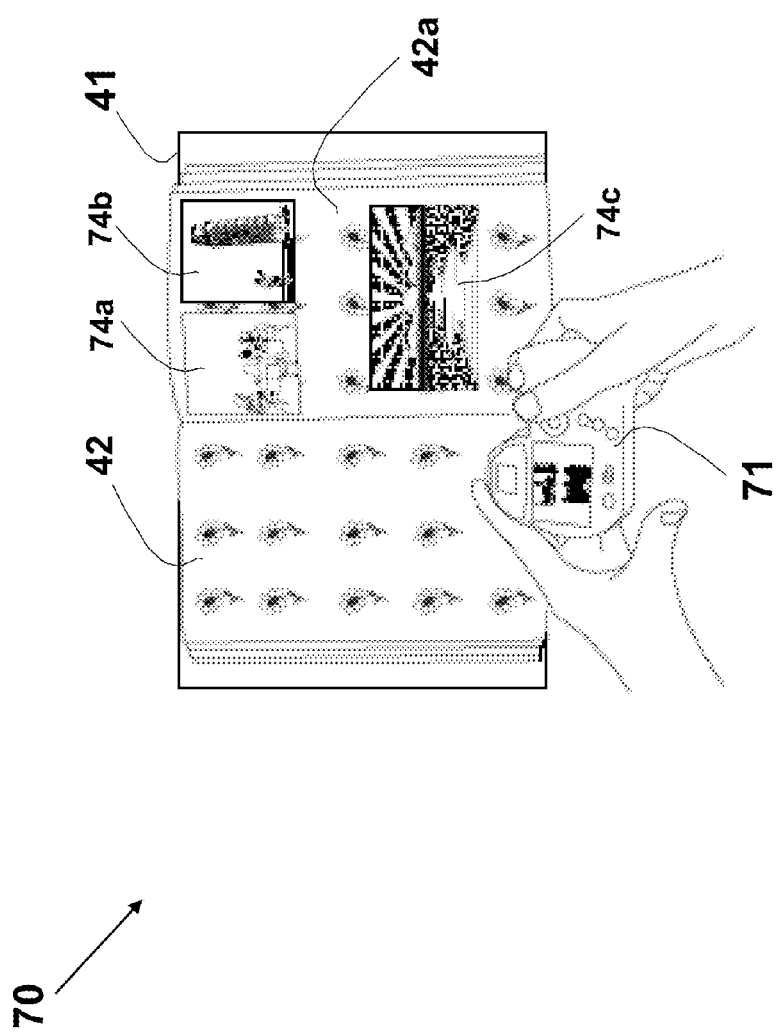
FIG. 7 depicts pictorially a view of a person holding a digital camera capturing a page in a photo album.
Figure 7A:
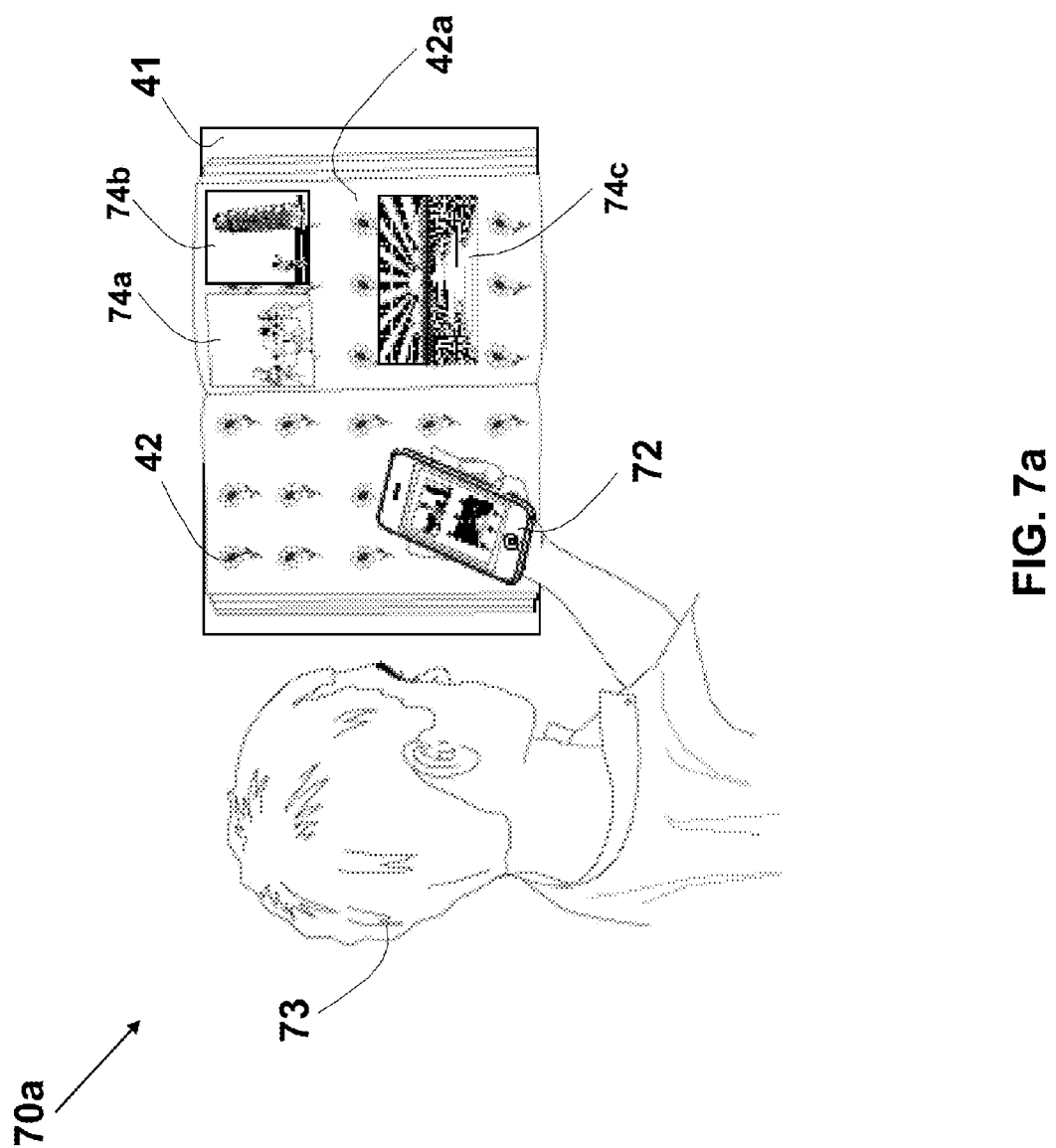
FIG. 7a depicts pictorially a view of a person holding a smartphone that includes a digital camera capturing a page in a photo album.
Figure 7B:
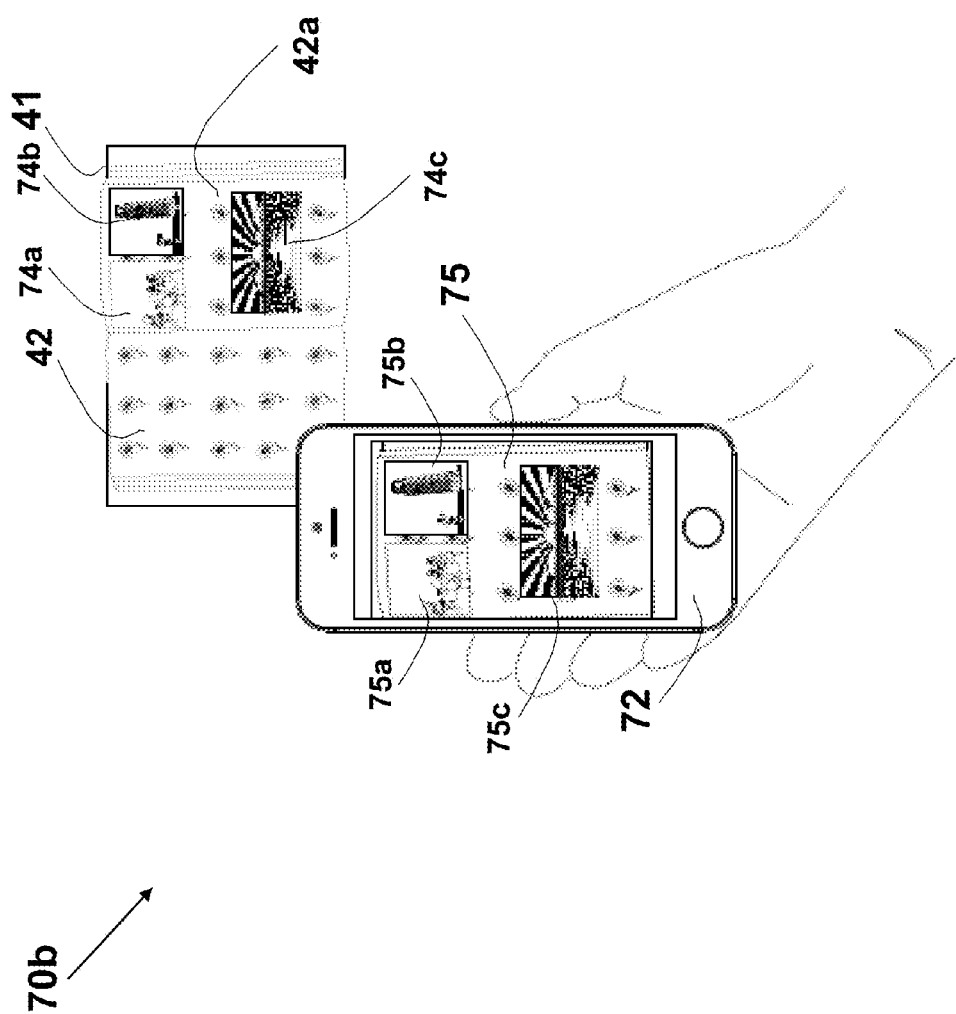
FIG. 7b depicts pictorially a view of the captured image page on a smartphone screen.
Figure 7C:
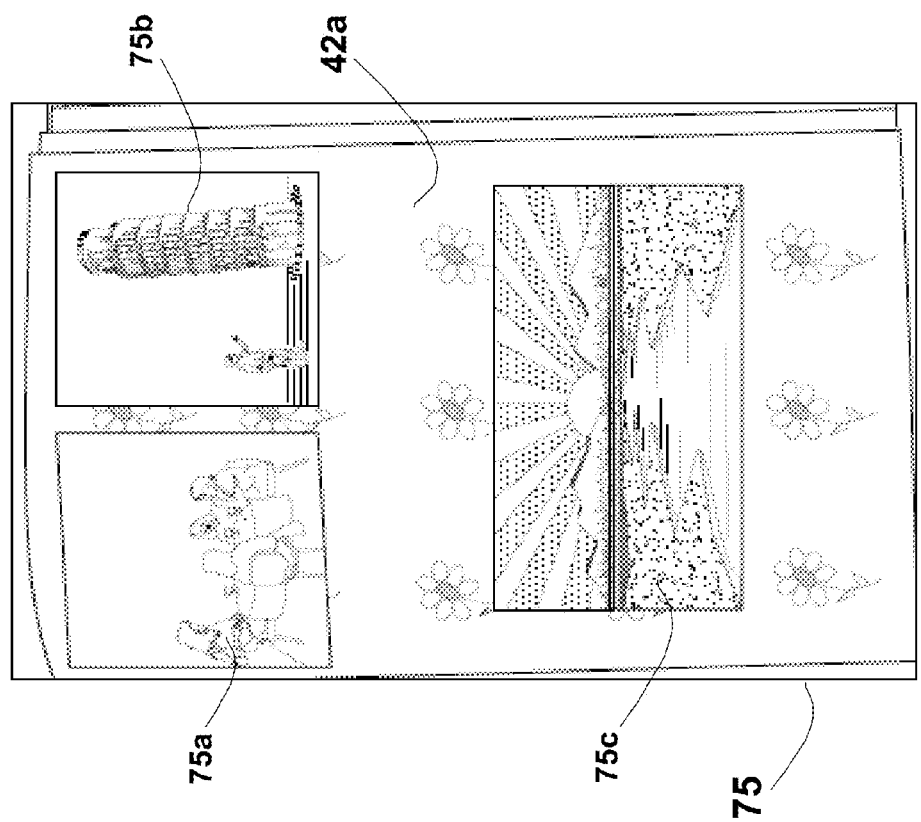
FIG. 7c depicts pictorially a view of the captured image page.
Figure 8:
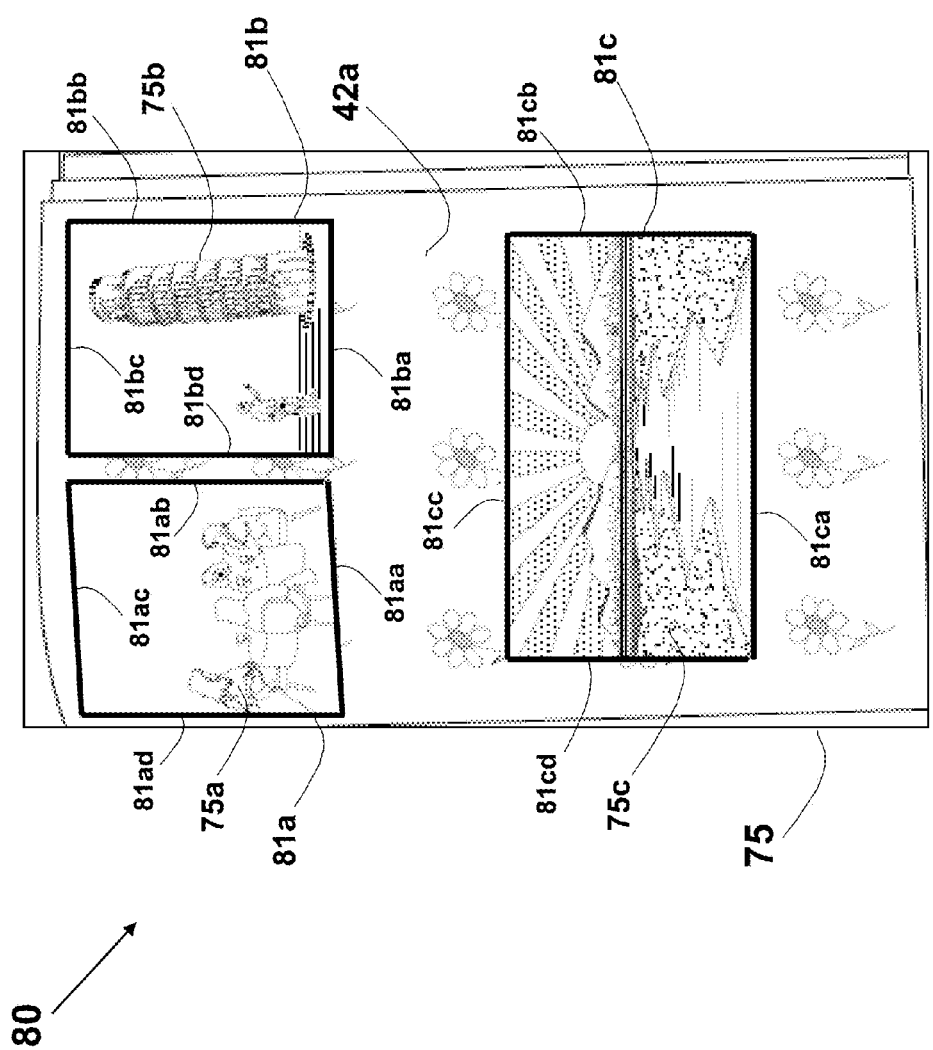
FIG. 8 depicts pictorially a view of the photos regions in a captured image page.

A method for identifying, extracting, and cropping photos from a captured image on a photo album page is described in a flow chart 60 shown in FIG. 6. First, the image is captured or otherwise received (such as from a human user) in a "Receive Image" step 61. Any image capturing device may be used, such as a camera 71 (that may correspond to the digital camera 30 shown in FIG. 3), that may be used by the human user to capture a page 42*a* of the photo album 41, as shown in a view 70 in FIG. 7. The page 42*a* is supporting three photos, a photo #1 74*a* (that may correspond to the photo 44*a* in the view 40*a*) depicting a family seated around a table, a photo #2 74*b* (that may correspond to the photo 44*b* in the view 40*a*) depicting the Leaning Tower of Pisa, and a photo #3 74*c* (that may correspond to the photo 44*c* in the view 40*a*) depicting a scenic view of a sunset. As a substitute to the stand-alone digital camera 71, the page 42*a* may be captured by a digital camera (such as the digital camera 30) that is integrated with a cellular telephone handset 72 used by a human user 73, as shown in view 70*a* in FIG. 7*a*. The captured image 75 of the page 42*a* of the photo album 41 may be visualized on a screen that is part of the digital camera 71 or the cellular telephone handset 72, as shown in a view 70*b* in FIG. 7*b*. The captured image 75 is further separately shown in FIG. 8. For example, the image 75 may be captured as a TIFF file using RGB color space.

In order to allow for extraction of the content of the photos from the image 75 of the page 42*a* of the photo album 41, the photos boundaries need to be identified. In the case wherein the photos are in a form that is shaped like a square or a rectangle (or substantially square or rectangle) as shown in the view 80 in FIG. 8, a virtual four-sided surrounding polygon (frame), typically rectangular shaped, need to be identified as accurately as practically possible, such as a rectangle 81*a* indicating the location of the image #1 75*a* representing the photo #1 74*a*, a rectangle 81*b* indicating the location of the image #2 75*b* representing the photo #2 74*b*, and a rectangle 81*b* indicating the location of the image #2 75*b* representing the photo #2 74*b*. The frame 81*a* (associated with photo #1 image 75*a*) consists of a lower horizontal side 81*aa*, an upper horizontal side 81*ac*, a left vertical side 81*ad*, and a right vertical side 81*ab*. Similarly, the frame 81*b* (associated with photo #2 image 75*b*) consists of a lower horizontal side 81*ba*, an upper horizontal side 81*bc*, a left vertical side 81*bd*, and a right vertical side 81*bb*, and the frame 81*c* (associated with photo #3 image 75*c*) consists of a lower horizontal side 81*ca*, an upper horizontal side 81*cc*, a left vertical side 81*cd*, and a right vertical side 81*cb*. The identified frame defines the region of the image photo of interest, and allows for cropping the image, forming a new file containing only the image photo, where the frame serves as the outer boundaries of the produced image Alternatively or in addition to the side lines shown in the view 80, the photo image regions may be defined by vertices of the rectangular frame, as shown in a view 80*b* in FIG. 8*b*. The photo #1 74*a* image region 75*a* may be defined by an up-left vertex 83*ac* (an intersection of the side lines 81*ad* and 81*ac*), an up-right vertex 83*ab* (an intersection of the side lines 81*ab* and 81*ac*), a down-right vertex 83*aa* (an intersection of the side lines 81*ab* and 81*aa*), and a down-left vertex 83*ad* (an intersection of the side lines 81*ad* and 81*aa*). Similarly, the photo #2 74*b* image region 75*b* may be defined by an up-left vertex 83*bc* (an intersection of the side lines 81*bd* and 81*bc*), an up-right vertex 83*bb* (an intersection of the side lines 81*bb* and 81*bc*), a down-right vertex 83*ba* (an intersection of the side lines 81*bb* and 81*ba*), and a down-left vertex 83*bd* (an intersection of the side lines 81*bd* and 81*ba*), and the photo #3 74*b* image region 75*c* may be defined by an up-left vertex 83*cc* (an intersection of the side lines 81*cd* and 81*cc*), an up-right vertex 83*cb* (an intersection of the side lines 81*cb* and 81*cc*), a down-right vertex 83*ca* (an intersection of the side lines 81*cb* and 81*ca*), and a down-left vertex 83*cd* (an intersection of the side lines 81*cd* and 81*ca*).

Figure 8A:
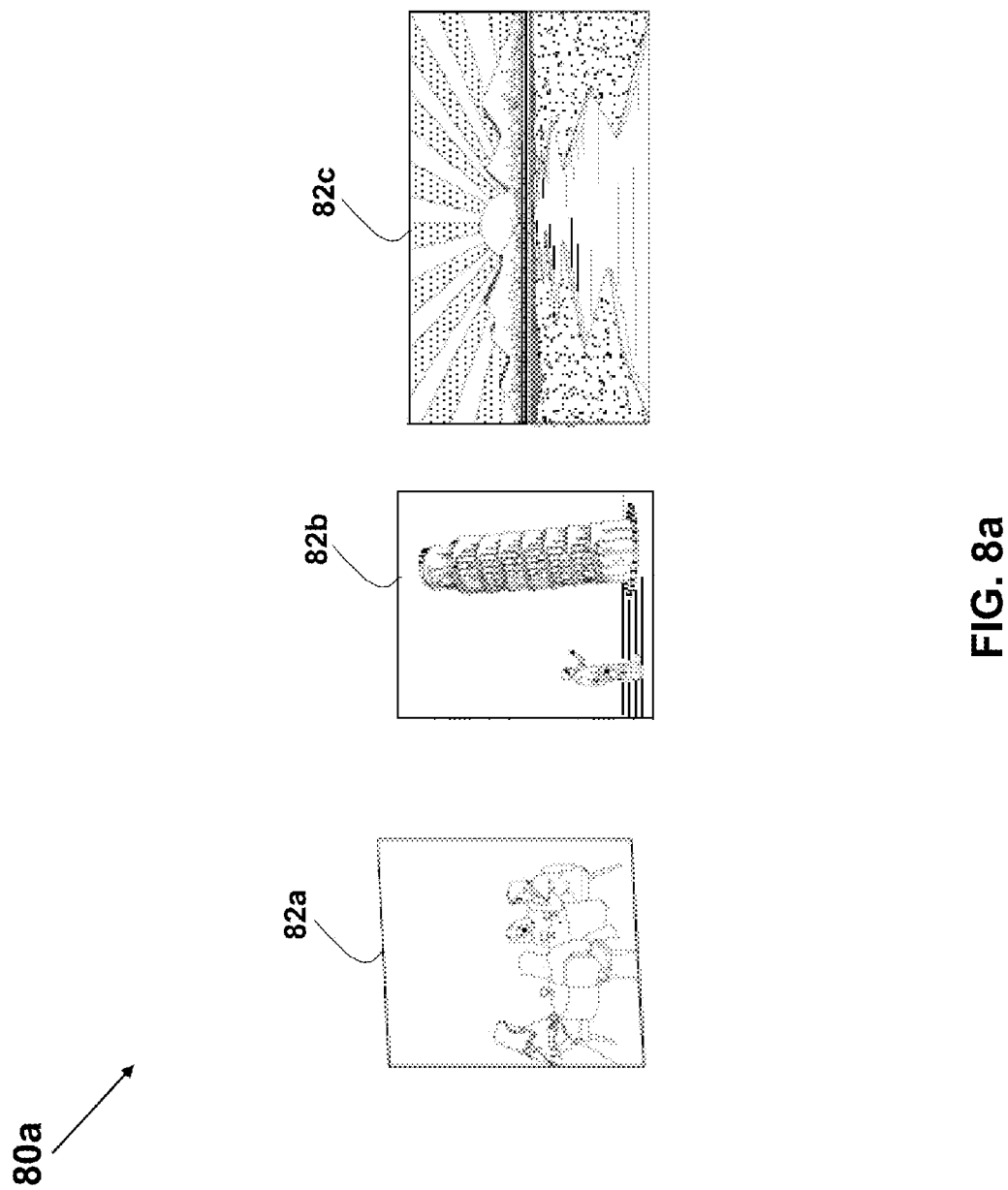
FIG. 8a depicts pictorially a view of the extracted photos regions.
Figure 8B:
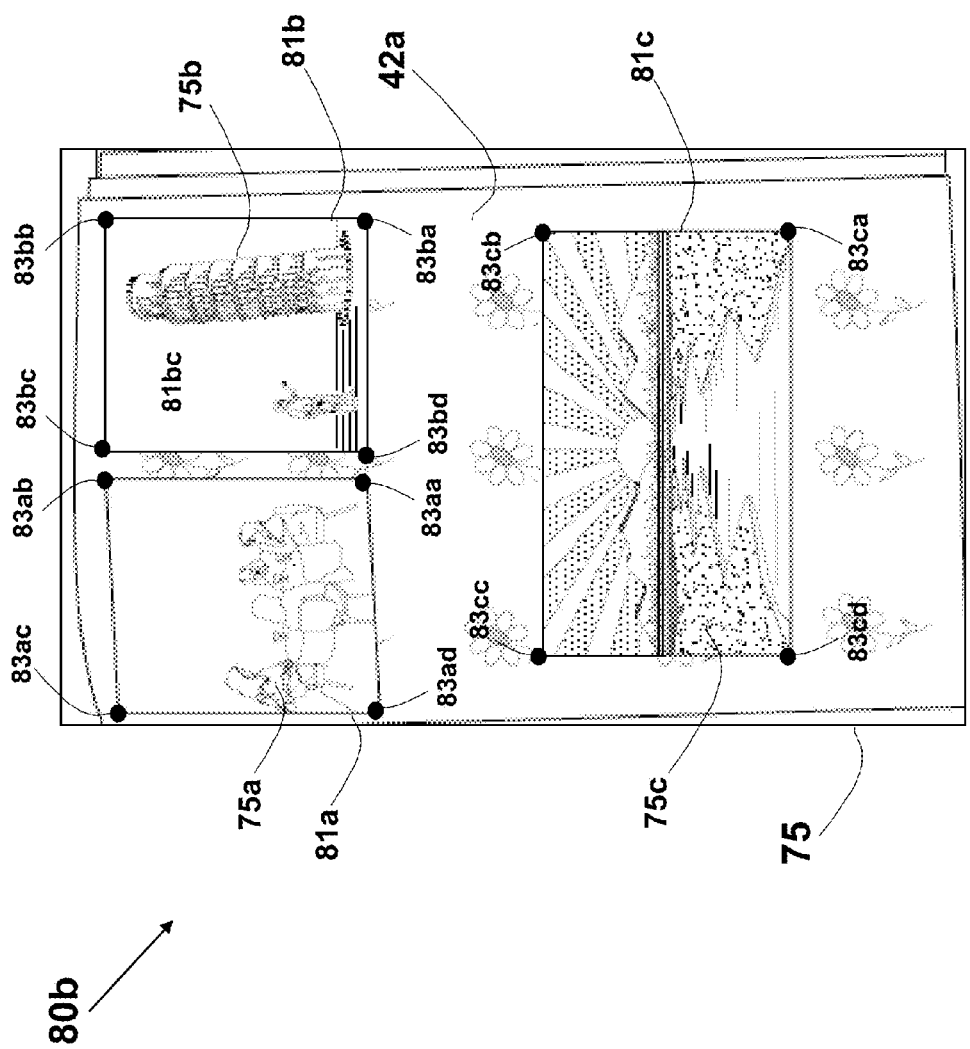
FIG. 8b depicts pictorially a view of the vertices of the photos regions in a captured image page.

Alternatively or in addition to the side lines or the vertices, the photo image regions may be defined by corners of the substantially rectangular shaped frame, as shown in a view 80*c* in FIG. 8*b*. The photo #1 74*a* image region 75*a* may be defined by an up-left corner 84*ac* (corresponding to the vertex 83*ac*), an up-right corner 84*ab* (corresponding to the vertex 83*ab*), a down-right corner 84*aa* (corresponding to the vertex 83*aa*), and a down-left corner 84*ad* (corresponding to the vertex 83*ad*). Similarly, the photo #2 74*b* image region 75*b* may be defined by an up-left corner 84*bc* (corresponding to the vertex 83*bc*), an up-right corner 84*bb* (corresponding to the vertex 83*bb*), a down-right corner 84*ba* (corresponding to the vertex 83*ba*), and a down-left corner 84*bd* (corresponding to the vertex 83*bd*), and the photo #3 74*c* image region 75*c* may be defined by an up-left corner 84*cc* (corresponding to the vertex 83*cc*), an up-right corner 84*cb* (corresponding to the vertex 83*cb*), a down-right corner 84*ca* (corresponding to the vertex 83*ca*), and a down-left corner 84*cd* (corresponding to the vertex 83*cd*). In addition to the vertex location, a corner further includes information about the directions of the line segments intersected in the corner. For example, the information identifying the up-left corner 84*ac*, form at the intersection of the 'up' side lines 81*ac* and the left side line 81*ad*, includes that the segment line 81*ad* is coming downwards from the corner, and that the segment line 81*ac* is coming rightwards from the corner.

Upon identifying the perimeter of each photo image (such as by the frame such as the frames 81*a*, 81*b*, and 81*c*), the images may be easily extracted from the page image 75 to individual files that may be independently used, such as for storing, manipulating, or displaying. A view 80a in FIG. 8a depicts an independent single image #1 82a (corresponding to photo #1 74a) as an independent single image file, an independent image #2 82b (corresponding to photo #2 74b) as an independent image file, and an independent image #3 82c (corresponding to photo #3 74c) as an independent image file.

Figure 9:
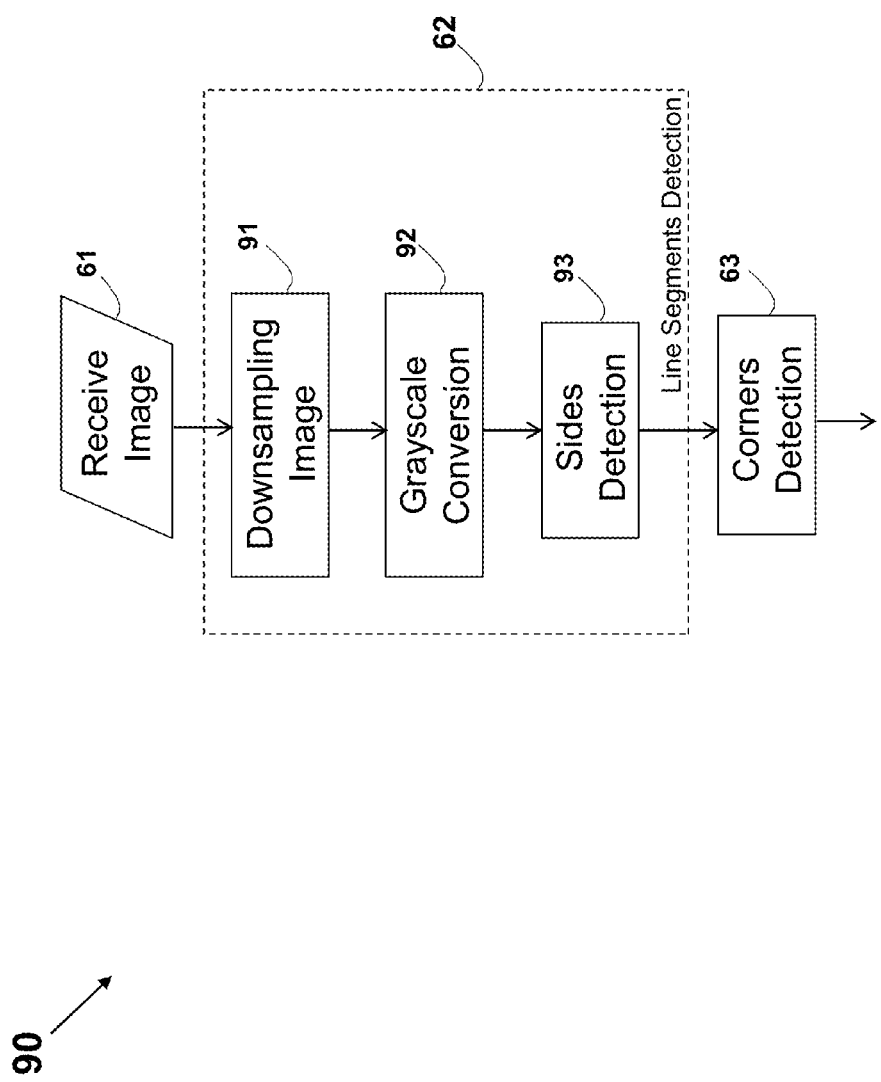
FIG. 9 illustrates schematically a flow diagram of detecting line segments.

After, the image content region has been identified, the process moves to a "Segment Detection" step 62, where the straight-line segments that may be part of the sides forming the frames of the photos images are identified. The "Segment Detection" step 62 may be further described in a flow chart shown as part of a flow chart 90 in FIG. 9. In order to simplify and accelerate the process, first the captured page image 75 is downsampled, such as to a total pixel count of 500, 1000, or 5,000 pixels, as part of a "Downsampling Image" step 91.

The downsampling step may consist of, may be based on, may use, or may include, adaptive or non-adaptive interpolation. The non-adaptive interpolation may consist of, may be based on, may use, or may include, a nearest-neighbor replacement, bilinear interpolation, bicubic interpolation, Lanczos interpolation, spline interpolation, or filtering-based approach.

Next, the reduced sized image is converted (for example from RGB) to a grayscale, as part of a "Grayscale Conversion" step 92. The conversion may be based on colorimetric (luminance-preserving) conversion, which is based on matching the luminance of the grayscale image to the luminance of the original color image, resulting in both images having the same absolute luminance, as can be measured in its SI units of candelas per square meter, in any given area of the image, given equal whitepoints. In addition, matching luminance provides matching perceptual lightness measures, such as L* (as in the 1976 CIE Lab color space) which is determined by the luminance Y (as in the CIE 1931 XYZ color space). To convert a color from a color space based on an RGB color model to a grayscale representation of its luminance, weighted sums must be calculated in a linear RGB space, that is, after the gamma compression function has been removed first via gamma expansion.

The coefficients represent the measured intensity perception of typical trichromat humans, depending on the primaries being used; in particular, human vision is most sensitive to green and least sensitive to blue. To encode grayscale intensity in linear RGB, each of the three primaries can be set to equal the calculated linear luminance Y (replacing R,G,B by Y,Y,Y to get this linear grayscale). Linear luminance typically needs to be gamma compressed to get back to a conventional non-linear representation. In practice, because the three sRGB components are then equal, it is only necessary to store these values once in sRGB-compatible image formats that support a single-channel representation. Web browsers and other software that recognizes sRGB images typically produce the same rendering for such a grayscale image as it would for an sRGB image having the same values in all three-color channels.

In one example, the page image 75 is represented by using the RGB color space, and each pixel color is defined by the three channels information value 'r', 'g', and 'b' (respectively corresponding to R, G, and B), where each of the values may be in the 0 to 255 range (using 8 bits). In such a case, the grayscale converting may be based on providing weighting factors $\alpha$, $\beta$, and $\gamma$ ($\alpha+\beta+\gamma=156$), and each grayscale pixel may be calculated as $c=[(\alpha*r)+(\beta*g)+(\gamma*b)]/256$. For example, $\alpha=76$, $\beta=150$, and $\gamma=28$.

Various techniques for color to grayscale conversion are described in U.S. Pat. No. 7,382,915 to Bala et al. entitled: "Color to Grayscale Conversion Method and Apparatus", in U.S. Pat. No. 7,706,606 to Ruzon et al. entitled: "Fast Adaptive Color to Grayscale Conversion", in U.S. Pat. No. 8,355,566 to Ng entitled: "Method and Device for Use in Converting a Colour Image Into a Grayscale Image", in U.S. Pat. No. 8,594,419 to Majewicz et al. entitled: "Method and Apparatus for Converting a Color Image to Grayscale", and in U.S. Pat. No. 8,971,617 to Ubillos et al. entitled: "Method and Interface for Converting Images to Grayscale", which are all incorporated in their entirety for all purposes as if fully set forth herein.

An algorithm for detecting straight line segments in the image, now in a grayscale palette and after being downsampled, as part of a "Sides Detection" step 93. Ideally, all the sides of the frames surrounding the photos images, and only those edges, are to be identified in full. Any line-segment detection technique may be used, such as the LSD or the Hough transformation. Alternatively or in addition, the line-segment detection technique may consist of, may include, or may be based on, any edge detection algorithm or technique. For example, the edge detection technique may be based on search-based that detect edges by first computing a measure of edge strength, usually a first-order derivative expression such as the gradient magnitude, and then searching for local directional maxima of the gradient magnitude using a computed estimate of the local orientation of the edge, usually the gradient direction. Alternatively or in addition, the edge detection technique may be based on zero-crossing, where a search for zero crossings in a second-order derivative expression is computed from the image in order to find edges, usually the zero-crossings of the Laplacian or the zero-crossings of a non-linear differential expression. As a pre-processing step to edge detection, a smoothing stage, typically Gaussian smoothing, is commonly always applied. The edge detector technique used may consist of, may comprise, or may be based on, the Canny edge detection, the Sobel operator, the Prewitt operator, the Deriche edge detector, RANSAC, Hough transform, LSD technique, or the Differential edge detection.

However, due to inherent limitations in the techniques available or used, and due to potential deterioration (such as a blur) in the captured photo quality, practically not all the photo edges may be identified. Edges extracted from non-trivial images are often hampered by fragmentation, meaning that the edge curves are not connected, missing edge segments as well as false edges not corresponding to interesting phenomena in the image—thus complicating the subsequent task of interpreting the image data. For example, only part of the sides may be detected. Further, even where an edge is found, only a part of the actual side may be identified.

Furthermore, in addition to the straight lines forming the edges of the captured photos, other straight lines may also exist in the image that may be detected by the edge detection or by corner detection techniques. For example, the background 42a may include decorative drawings that include straight lines, and further the edges of the page of the photo album 41 may be captured and detected as straight-line segments. In addition, the content in the photos may include straight-line segments that may be detected. The detection of any line segments that are not part of the photos edges may interfere and complicate the identifying of the photos regions, unless they are identified as non-photo edge lines.

Figure 10:
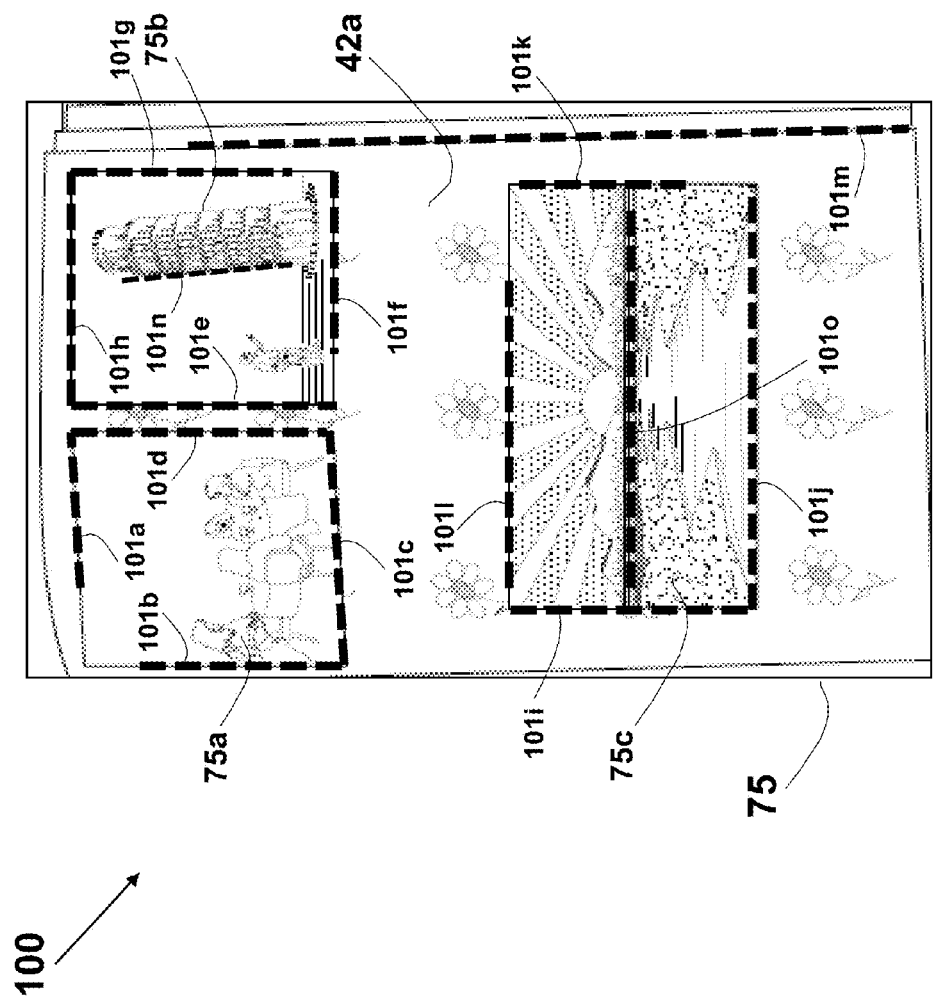
FIG. 10 depicts pictorially a view of the detected line segments in a captured image page.

An example of a result of applying the "Segment Detection" step 62 to the image 80 is shown as a view 100 in FIG. 10. The detected line segments are shown as dashed lines in the view 100. The 'down' side line 81aa and the right side line 81ab of the photo #1 74a image 75a were properly detected in full and are respectively shown as a line segment 101c and 101d. Similarly, the left side line 81bd and the 'up' side line 81bc of the photo #2 74b image 75b were properly detected in full, and are respectively shown as a line segment 101e and 101h, and the left side line 81cd and the down side line 81ca of the photo #3 74c image 75c were properly detected in full, and are respectively shown as a line segment 101l and 101j. The up side line 81ac and the left side line 81ad of the photo #1 74a image 75a were only partly detected, such as the right part only of the left side line 81ac and the lower part only of the left side line 81ad, and are respectively shown as a line segment 101a and 101b. Similarly, the right side line 81bb and the down side line 81ba of the photo #2 74b image 75b were only partly detected, and are respectively shown as a line segment 101g and 101f, and the up side line 81cc and the right side line 81cb of the photo #3 74c image 75c were only partly detected, and are respectively shown as a line segment 101i and 101k.

However, the "Segment Detection" step 62 may also identify straight lines that are not photo edges. For example, line segments may be detected which are part of the background, such as objects external to the album page 42a. Further, the page 42a right edge may also be detected, denoted as dashed line 101m in the view 100. In addition, objects or lines which are part of the photos images content may be identified, such as the horizon line in the image 75c that is detected as a segment line 101o, and the left part of the Tower of Pisa in the image 75b that is detected as a segment line 101n.

After, the line segments have been identified the process moves to a "Corners Detection" step 63, where the image 75 is analyzed for detecting corners. Preferably, all the corners of the regions including the captured photos, and only these corners are to be detected, such as the corners shown in the view 80c. Alternatively or in addition, all the vertices of the regions including the captured photos, and only these vertices, are to be detected, such as the vertices shown in the view 80c. In one example, a corner detection algorithm may be used, and any available corner detection technique may be used.

Figure 11:
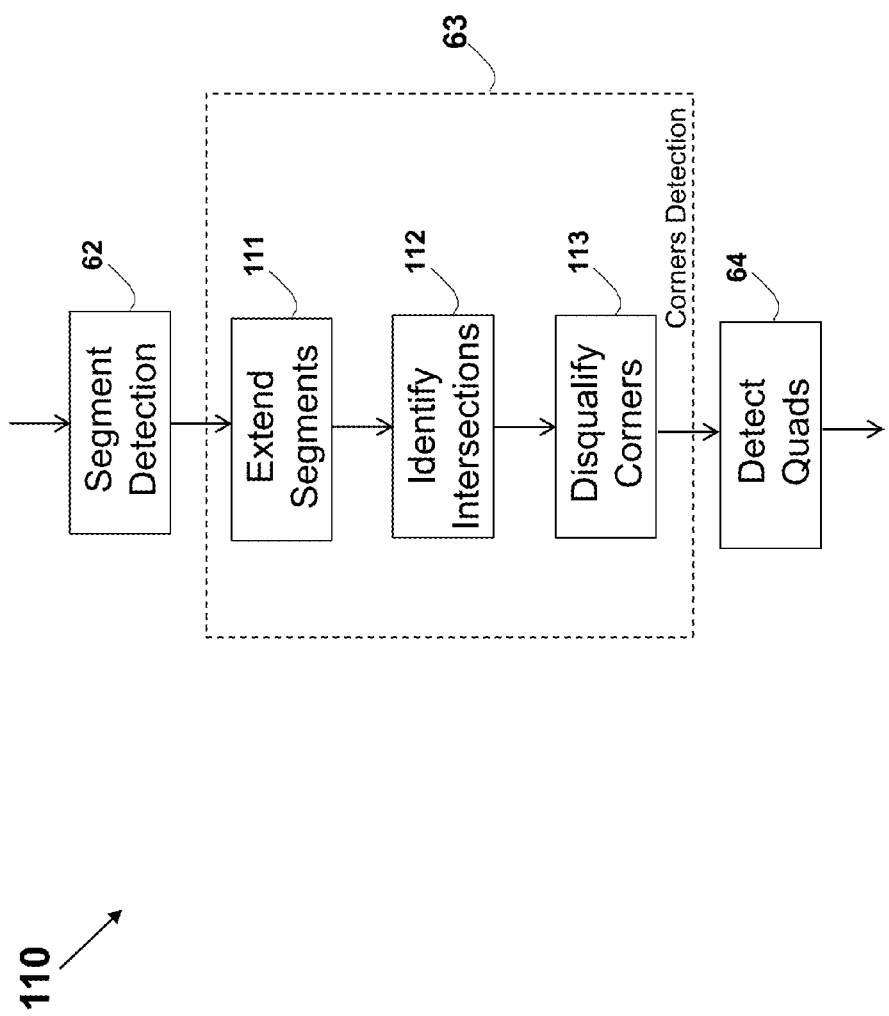
FIG. 11 illustrates schematically a flow diagram of detecting corners using the extensions and the detected line segments in a captured image page.

Alternatively or in addition, the line segments detected as part of the "Segment Detection" step 62 are used as a basis for detecting corners in the captured image 75. In such a case, the "Corners Detection" step 63 may be performed using a flow chart shown as part of a flow chart 110 in FIG. 11.

Figure 10A:
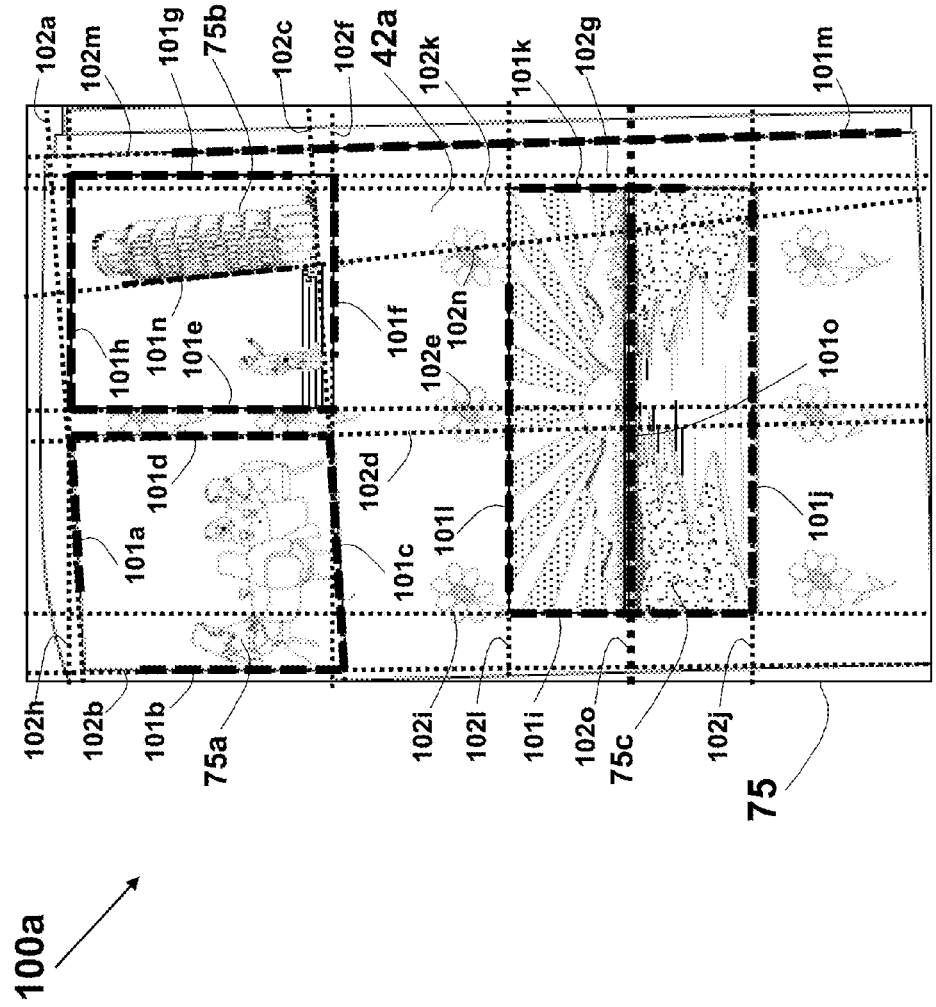
FIG. 10a depicts pictorially a view of the extensions of the detected line segments in a captured image page.

The process starts in an "Extend Segments" step 111, where the detected line segments are extended in the captured image 75 until the image ends. For example, horizontally detected line segments are extended rightwards and leftwards, until reaching the respective image 75 rightmost and leftmost sides. Similarly, vertically detected line segments are extended upwards and downwards until reaching the respective image 75 topmost and bottommost portions or edges. An example of the extended line segments is shown as a view 100a in FIG. 10a, where dashed lines represent the extended line segments. The extended dashed line 102a is an extension to the left and the right of the detected line segment 101a, and the extended dashed line 102h is an extension to the left and the right of the detected line segment 101h. Similarly, the horizontal (or substantially horizontal) extended lines 102c, 102f, 102i, 102o, and 102j are respectively extensions of the detected line segments 101c, 101f, 101i, 101o, and 101j. The extended dashed line 102b is an extension to the image top and the image bottom of the detected line segment 101b, and the extended dashed line 102d is an upwards and downwards extension of the detected line segment 101d. Similarly, the vertical (or substantially vertical) extended lines 102e, 102g, 102i, 102k, and 102m are respectively extensions of the detected line segments 101e, 101g, 101i, 101k, and 101m. The extended line 102n is an extension of the detected diagonal line segment 101n.

Figure 10B:
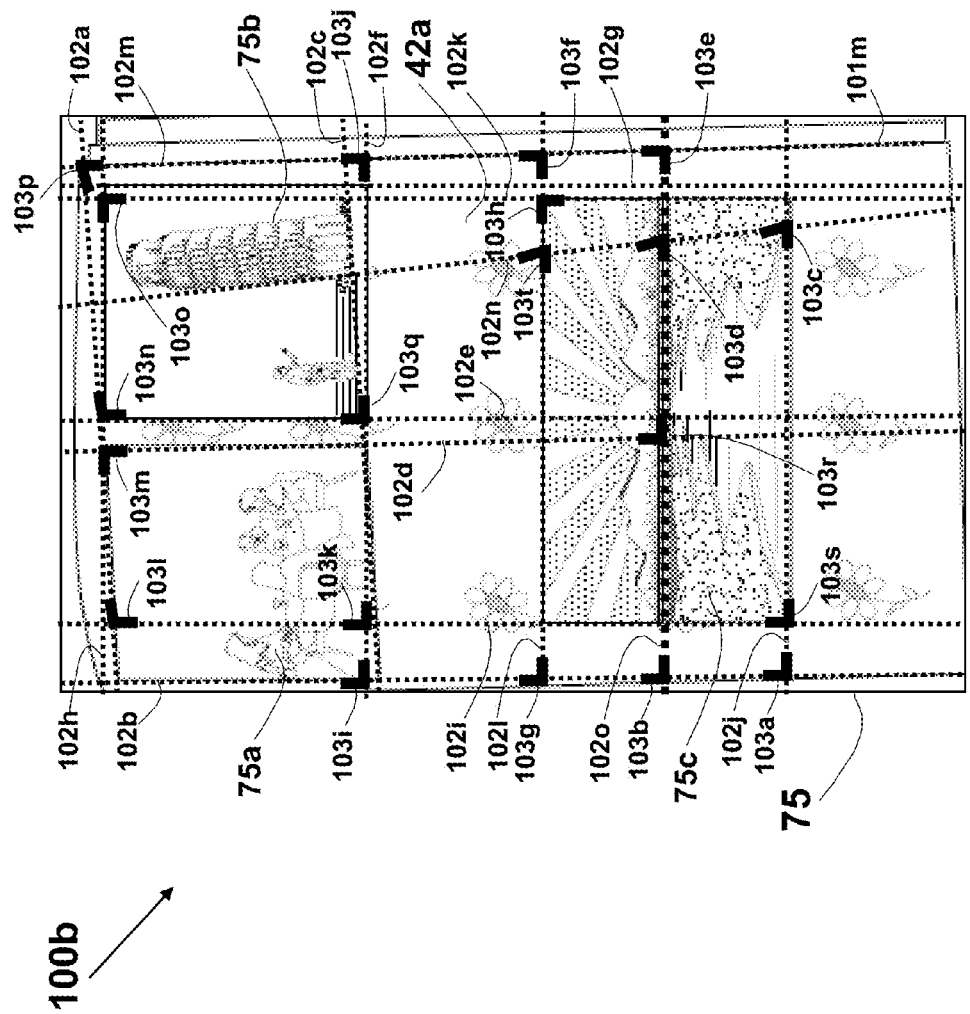
FIG. 10b depicts pictorially a view of the corners of the extensions and the detected line segments in a captured image page.

After the line segments have been extended, the method moves to an "Identify Intersection" step 112, where all the possible intersections are identified as corners. The intersection may use only the extension parts (that were added as part of the "Extend Segments" step 111), only the detected line segments (that were identified as part of the "Segment Detection" step 62), or both. A view 100b in FIG. 10b depicts few of the possible corners at the line extensions intersections. For the sake of simplicity and clarity, not all the possible corners are shown, and the detected line segments (shown as part of the view 100) are omitted. A corner 103a is shown at an intersection point of lines 102j and 102b, a corner 103b is shown at an intersection point of lines 102o and 102b, a corner 103c is shown at an intersection point of lines 102n and 102j, a corner 103d is shown at an intersection point of lines 102n and 102o, a corner 103e is shown at an intersection point of lines 102m and 102o, a corner 103f is shown at an intersection point of lines 102m and 102i, a corner 103g is shown at an intersection point of lines 102b and 102i, a corner 103h is shown at an intersection point of lines 102k and 102i, a corner 103i is shown at an intersection point of lines 102b and 102f, a corner 103j is shown at an intersection point of lines 102m and 102f, a corner 103k is shown at an intersection point of lines 102f and 102i, a corner 103l is shown at an intersection point of lines 102a and 102i, a corner 103m is shown at an intersection point of lines 102d and 102h, a corner 103n is shown at an intersection point of lines 102a and 102e, a corner 103o is shown at an intersection point of lines 102k and 102h, a corner 103p is shown at an intersection point of lines 102m and 102a, a corner 103q is shown at an intersection point of lines 102e and 102f, a corner 103r is shown at an intersection point of lines 102d and 102o, a corner 103s is shown at an intersection point of lines 102i and 102j, and a corner 103t is shown at an intersection point of lines 102i and 102n.

Some of the corners obtained may be associated with a 'virtual' corner, that is hidden in plain view, such as when a photo is placed partly under (or above) another photo in the photo album. Such an example is shown in view 100c in FIG. 10c, where the photo #2 74b (depicting the Tower of Pisa) is located partly above the photo #2 74c, so that the left-bottom corner of the photo #2 74c. In such a case, the respective images of the photo #3 82c is captured partly covered by the photo #2 82b, and the left-down vertex 105 of the image of photo #3 82c is hidden.

Figure 8C:
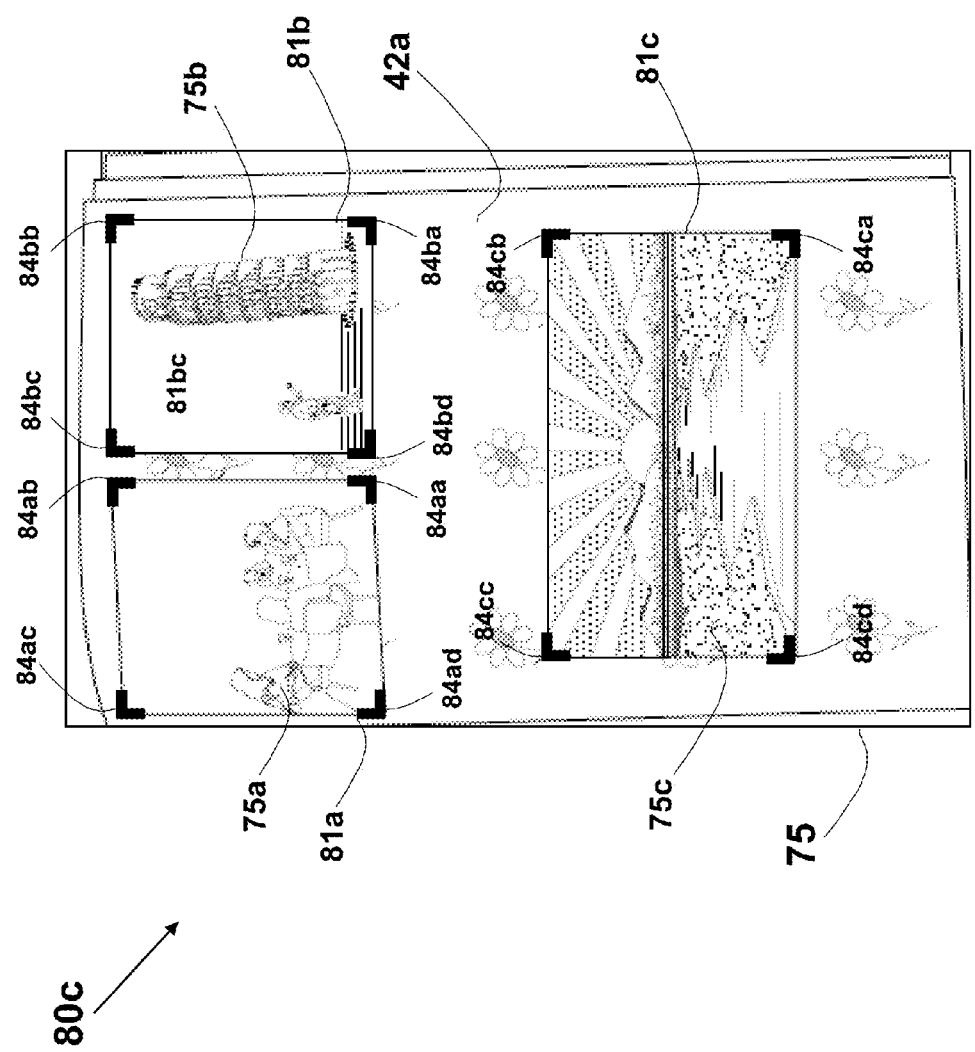
FIG. 8c depicts pictorially a view of the corners of the photos regions in a captured image page.

By isolating from the total possible corners only the actual corners that are part of the photos images, the photo images frames may be defined, and the photos images may be cropped. All of, or at least most of, the actual photos images corners that are shown in the view 80c in FIG. 8c, are expected to be identified and considered as possible corners. For example, the detected corner 103q corresponds to the actual corner 84bd, the detected corner 103o corresponds to the actual corner 84bb, the detected corner 103s corresponds to the actual corner 84cd, and the detected corner 103h corresponds to the actual corner 84cb. Hence, it is required to qualify the corners and to remove those corners that are not likely to be part of the actual photos images. Various criteria may be used, alone or combined, to disqualify corners from being considered as photos images corners, as part of a "Disqualify Corners" step 113.

In one example, an angle associated with each corner is checked. It is assumed that the photos are ideal, near ideal, or substantially rectangular-shaped, such as due to perspective distortion. It is further assumed that the photos are positioned in the photo album 41 at near (or substantially near) horizontally or vertically, hence the angle associated with the photo corners should be substantially close to 90°. A tolerance of 1°, 3°, 5°, 7°, or 10° may be used. In an example of using 5°, each of the detected corners is checked to be in the range of 85° to 95°, while in an example of using 10°, each of the detected corners is checked to be in the range of 80° to 100°. The corners associated with angles that are not within that range are disqualified and removed from further consideration. For example, it can be estimated that the corners 103c, 103d, and 103t, derived from the extended line 103o (based on the image 75b content of the Tower of Pisa) are lower than 80°, and thus are disqualified, and indeed not part of the real photos edges. Alternatively, the photos may be positioned in the photo album 41 at any angle, not limited to be near (or substantially near) horizontally or vertically. In such a case, no corners are disqualified and removed from further consideration based on such criterion.

Figure 10D:
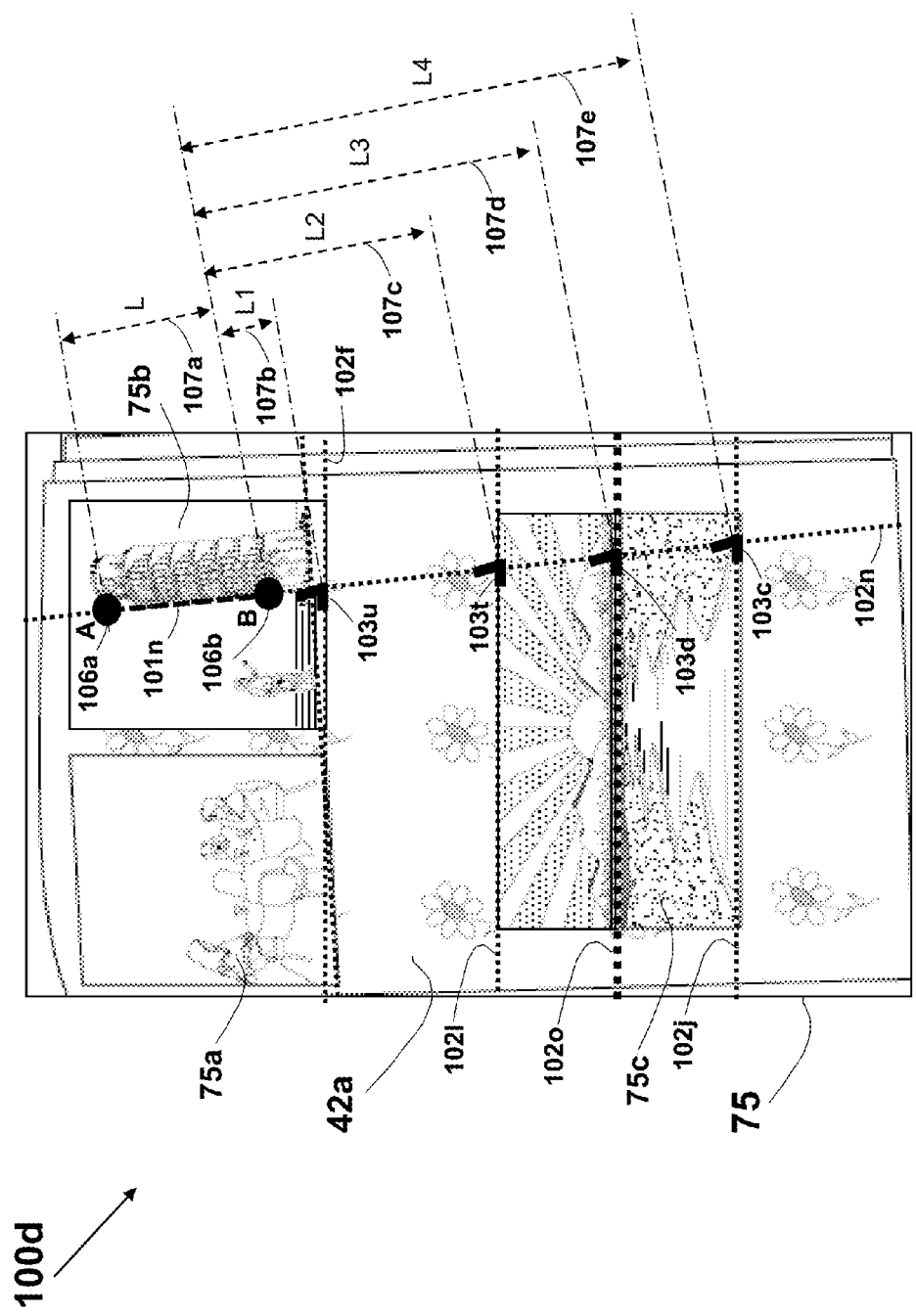
FIG. 10d depicts pictorially a view of the lengths associated with an extension of a detected line segment in a captured image page.

Alternatively or addition, detected corners may be qualified (or disqualified) according to their distance from a respective detected line segment, as exempled regarding the detected line segment 101n shown in a view 100d in FIG. 10d. The line segment 101n is of length L 107a (measured in pixels or otherwise) and is defined between an end-point A 106a and an end point B 106b, and is extended to form the extended line (shown as dashed) 102n, forming the detected corner 103c with the extended line 102j located at a distance L4 107e from the end point B 106b, forming the detected corner 103d with the extended line 102o located at a distance L3 107d from the end point B 106b, forming the detected corner 103t with the extended line 102l located at a distance L2 107c from the end point B 106b, and forming a detected corner 103u with the extended line 102f located at a distance L1 107b from the end point B 106b, where L4>L3>L2>L1.

In one example, the corners are qualified by their distance sequence from a line segment end point. In the example shown in the view 100d, the detected corner 103u is the closest to the end point B 106b, the detected corner 103t is further from the detected corner 103u, the detected corner 103c is the most distant, and the detected corner 103d is located between the detected corners 103c and 103t. In one example, only the closest detected corner is qualified, and any further detected corners are disqualified, so that only the closest detected corner 103u is qualified, while the other detected corners are disqualified. In another example, only the first two closest detected corners are qualified, such as the detected corners 103u and 103t in the example shown in the view 100d.

Alternatively or in addition, a length threshold LT is set regarding the distance from an end point, and only detected corners that are below the threshold are qualified (<LT), thus disqualifying all detected corners beyond the set threshold (>LT). Using the example that is shown in the view 100d in FIG. 10d, a length threshold may be set to be equal to L3 (LT=L3), thus disqualifying all detected corners that are more distant than the threshold. In such a scenario, the detected corner 103c is disqualified, since L4 is above the set threshold L3 (L4>LT). Similarly, in the case the threshold is set to L1, only the closest detected corner 103u is qualified, and all other detected corners are disqualified.

In one example, the length threshold may be based on the length of the detected line segment (L). For example, the threshold may be a linear function of the detected line segment, such as LT=α*L. For example, a margin of 10% may be used, where α=1.1, a margin of 50% may be used, where α=1.5, a margin of 100% may be used, where α=2, or a margin of 150% may be used, where α=2.5.

Figure 13:
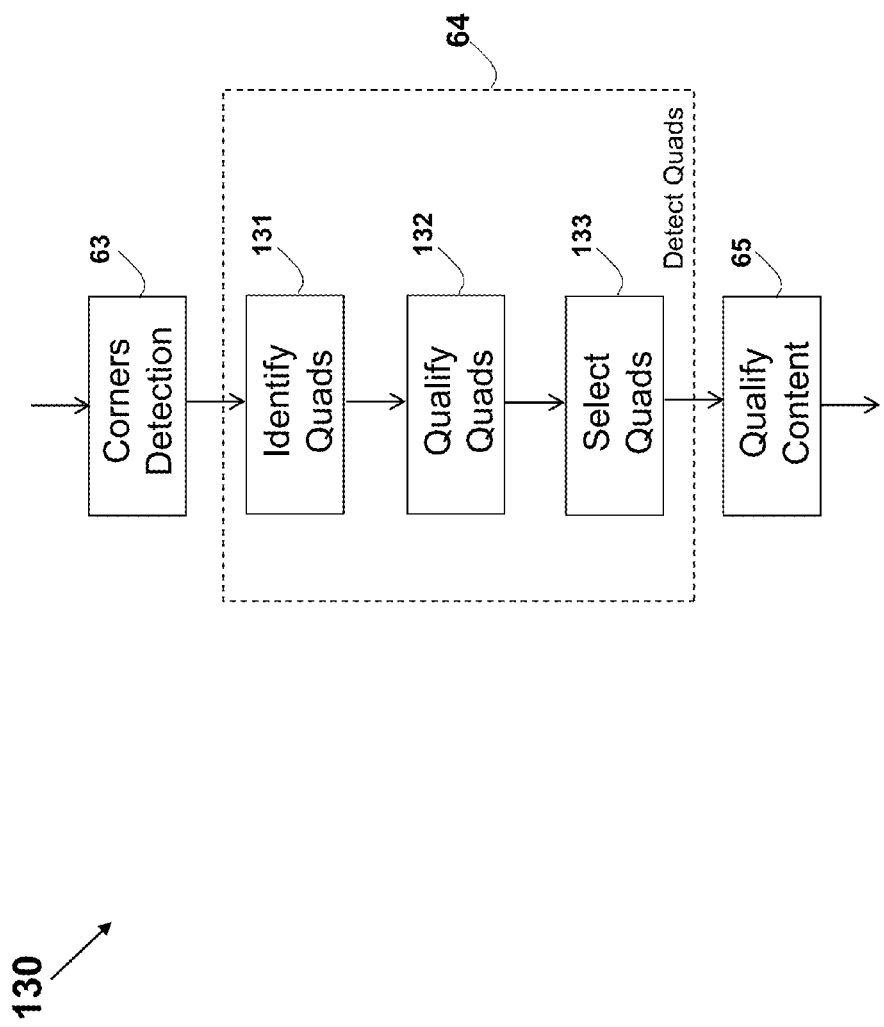
FIG. 13 illustrates schematically a flow diagram of detecting quads using the detected corners.

The qualified detected corners found in the "Corners Detection" step 63, may be used for identifying various regions in the image, as part of a "Detect Quads" step 64 that is a part of the flow chart 60 shown in FIG. 6, which may include the steps shown as part of a flow chart 130 shown in FIG. 13. As part of an "Identify Quads" step 131, all possible quads that meets one or more criteria are identified in the image, where 'quad' (also known as quadrilateral) may be defined herein as any polygon with four sides (or edges) and four vertices or corners. In one example, a polygon may be identified by every combination of four points represented by the corners that selected from the 'qualified corners'. Qualified corners are defined as the corners (or points) that were detected as part of the "Identify Intersections" step 112 and were not disqualified as part of the "Disqualified Corners" step 113. Each selected four corner points defined a frame that encloses a region in the image referred to herein as a 'quad'. Assuming N corner points, the total number of possible quads is the number of combinations of selecting 4 points from a group of N points, known to be calculated as a binomial coefficient indexed by N and 4, calculated as:

$$\binom{N}{4} = \frac{N!}{4! \times (N-4)!}.$$

For example, in the case of N=five, there are 5 possible quads, in the case of N=6, there are 15 possible quads, and in the case of N=10, there are 210 possible quads. Alternatively or in addition, only the quads that use the corners direction information may be produced, so the four selected corners enclose a feasible region in the image. For example, a corner having up and right directions may be connected to form a straight line edge only with mating corners, such as to a corner having up and left directions or to a corner having down and right directions (or to both), but not to a corner having left and down direction, or to a similar corner having also up and right directions. Using the corners directivity information further limits the number of possible quads.

Figure 12:
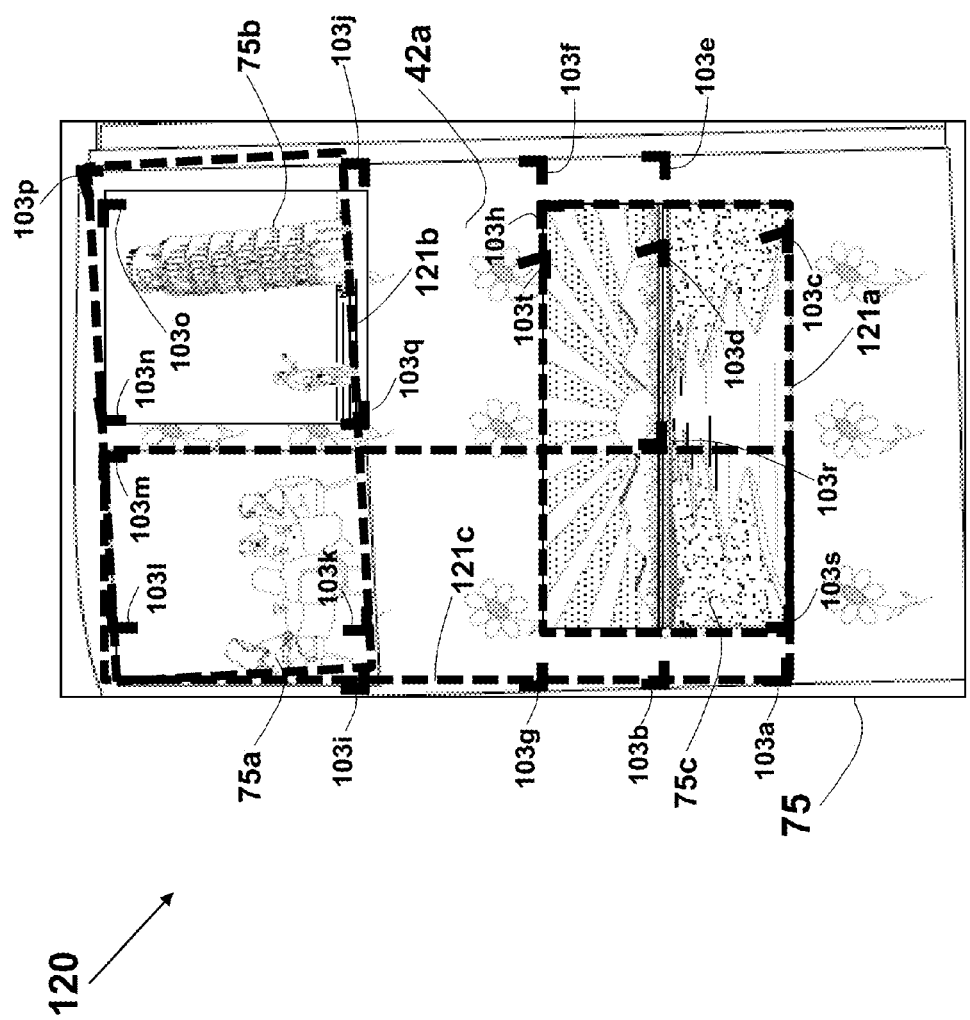
FIGS. 12, 12a, 12b, and 12c depict pictorially a view of potential quads using the corners of the extensions and of the detected line segments in a captured image page.
Figure 12A:
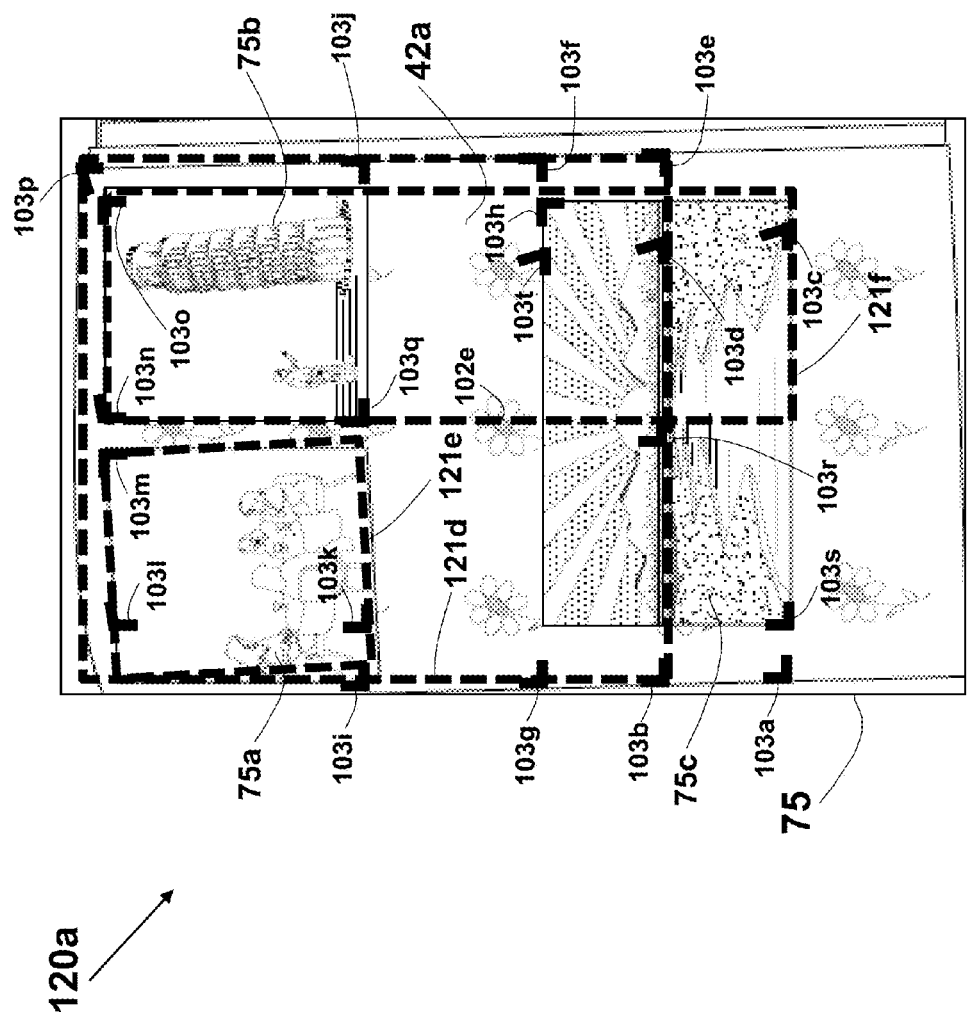
Figure 12B:
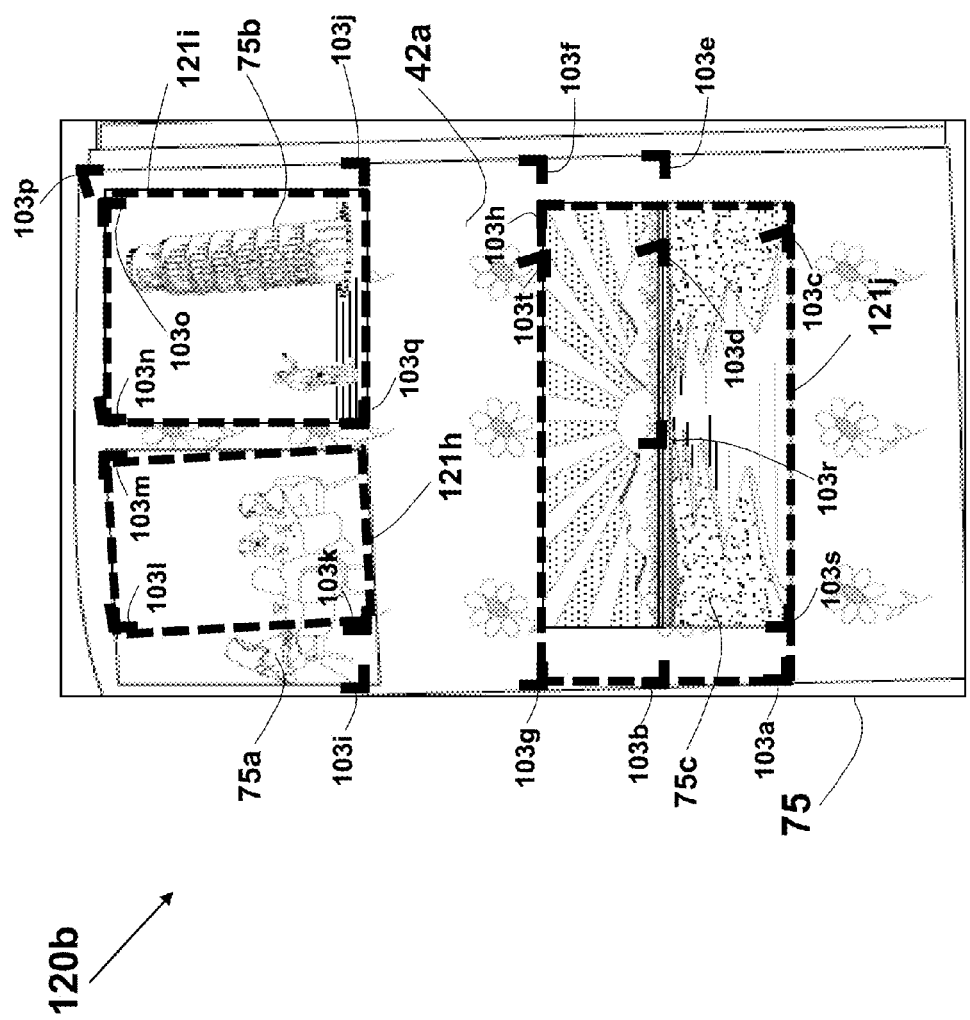

For the sake of clarity, only a few examples of possible quads, based on the corners (or points) in the example shown in the view 100b, are described in a view 120 in FIG. 12, in a view 120a in FIG. 12a, and in a view 120b in FIG. 12b. A possible quad 121a shown as part of the view 120 is formed by a detected corner 103s, a detected corner 103h, a corner detected an intersection of the lines 102l and 102l (not shown as a corner in the figure), and a corner detected by an intersection of the lines 102j and 102k (not shown as a corner in the figure). A possible quad 121b shown as part of the view 120 is formed by the detected corner 103p, a corner detected by an intersection of the lines 102b and 102h (not shown as a corner in the figure), a corner detected by an intersection of the lines 102c and 102b (not shown as a corner in the figure), and a corner detected by an intersection of the lines 102c and 102m (not shown as a corner in the figure). A possible quad 121c shown as part of the view 120 is formed by the detected corner 103a, the detected corner 103m, a corner detected by an intersection of the lines 102d and 102j (not shown as a corner in the figure), and a corner detected by an intersection of the lines 102h and 102b (not shown as a corner in the figure).

A possible quad 121d shown as part of the view 120a is formed by the detected corner 103b, the detected corner 103p, the detected corner 103e, and a corner detected by an intersection of the lines 102h and 102b (not shown as a corner in the figure). A possible quad 121e shown as part of the view 120a is formed by a corner detected by an intersection of the lines 102a and 102b (not shown as a corner in the figure), a corner detected by an intersection of the lines 102c and 102b (not shown as a corner in the figure), a corner detected by an intersection of the lines 102c and 102d (not shown as a corner in the figure), and a corner detected by an intersection of the lines 102a and 102d (not shown as a corner in the figure). A possible quad 121f shown as part of the view 120a is formed by a corner detected by an intersection of the lines 102k and 102h (not shown as a corner in the figure), a corner detected by an intersection of the lines 102h and 102e (not shown as a corner in the figure), a corner detected by an intersection of the lines 102e and 102j (not shown as a corner in the figure), and a corner detected by an intersection of the lines 102j and 102g (not shown as a corner in the figure).

A possible quad 121h shown as part of the view 120b is formed by the detected corner 103b, the detected corner 103l, a corner detected by an intersection of the lines 102i and 102c (not shown as a corner in the figure), a corner detected by an intersection of the lines 102c and 102d (not shown as a corner in the figure), a corner detected by an intersection of the lines 102d and 102a (not shown as a corner in the figure). A possible quad 121l shown as part of the view 120b is formed by the detected corner 103o, the detected corner 103q, a corner detected by an intersection of the lines 102e and 102h (not shown as a corner in the figure), and a corner detected by an intersection of the lines 102f and 102k (not shown as a corner in the figure). A possible quad 121g shown as part of the view 120b is formed by the detected corner 103a, the detected corner 103g, the detected corner 103h, and a corner detected by an intersection of the lines 102k and 102j (not shown as a corner in the figure).

Alternatively or in addition, the possible quads are identified by using each two diagonally directed corners. For example, each of the detected corners that are top-left vertices, hence serving as an intersection point for line segments extending to the right and downwards, is paired with all detected corners that are bottom-right vertices, hence serving as an intersection point for line segments extending to the left and upwards. The lines are extended so that the other two vertices (namely the top-right and bottom-left vertices) are extrapolated at the respective intersections. Similarly, each of the detected corners that are top-right vertices, hence serving as an intersection point for line segments extending to the left and downwards, is paired with all detected corners that are bottom-left vertices, hence serving as an intersection point for line segments extending to the right and upwards. The lines are extended so that the other two vertices (namely the bottom-right and up-left vertices) are extrapolated at the respective intersections. For example, the quad 121a may be formed by the bottom-left vertex identified by the detected corner 103s and the top-right vertex identified by the detected corner 103h. Similarly, the quad 121i may be formed by the bottom-left vertex identified by the detected corner 103q and the top-right vertex identified by the detected corner 103o.

The quads detected as part of the "Identify Quads" step 131 may include the required photo image regions, as well as other various other quads not related to the photos images regions. For example, the quads may include only a part of a required photo image region, background, or few required photo image regions. In the example shown in FIGS. 12-12b, the detected quad 121a corresponds to the frame 81c enclosing the region of the photo #3 image 75c, the detected quad 121e corresponds to the frame 81a enclosing the region of the photo #1 image 75a, and the detected quad 121l corresponds to the frame 81b enclosing the region of the photo #2 image 75b. The detected quads are qualified by using one or more criteria in a "Qualify Quads" step 132, for isolation of the photos images enclosed quads, and disqualify the others. In one example, a value is calculated or assigned to each of the detected quads according to its characteristics or features, and quads associated with a value below a pre-set threshold value, are considered to be disqualified.

In one example, a criterion may be based on the number of edges of a detected quad that include detected line segments. A higher number of sides that include detected line segments are associated with a higher value, hence less likely to be disqualified. For example, the detected quad 121a in the view 120 includes the 4 detected line segments 101j, 101k, 101l, and 101l, while the detected quad 121b in the view 120 includes only 3 detected line segments 101a, 101b, and 101c. Similarly, the detected quad 121c in the view 120 includes only 2 detected line segments 101d and 101j. Similarly, the detected quad 121f includes 3 detected line segments while the detected quad 121f includes only 2 detected line segments. A threshold may be set to 3 so that only the detected quads having 3 or more line segments in their perimeter are to be considered, thus for example disqualifying the detected quads 121c and 121f.

Alternatively or in addition, the criterion is based on the aggregated length of the line segments that are part of a perimeter of a detected quad versus the total length of the quad perimeter. For example, a ratio of the aggregated length of the line segments to the perimeter length may be calculated and compared to a threshold value. In the case where all of the quad sides are formed by the detected line segments, the ratio is 100%. In the case no line segment is part of a quad perimeter, the ratio is 0%. In the case of a quad shaped as a square, where only one side is formed by a detected line segment, the ratio is calculated to be 25%, while two sides may result in 50%. A threshold may be set to 50%, 55%, 60%, 70%, 80%, 85%, 90%, or 95%.

Alternatively or in addition to using the quads perimeter qualification, the area covered or enclosed in each quad may be calculated and used as a criterion for qualification. Since it is assumed that too small photos are not used or stored in the photo album 41, and that the capturing and zooming are reasonable, a minimum size may be set as a threshold. For example, a minimum size of 5%, 3%, or 1% of the total image area may be set as a threshold for qualification of the quads, such that in the case of an image 75 consisting of 10,000 pixels, quads that are respectively enclosing less than 500, 300, or 100 pixels are disqualified.

Figure 12C:
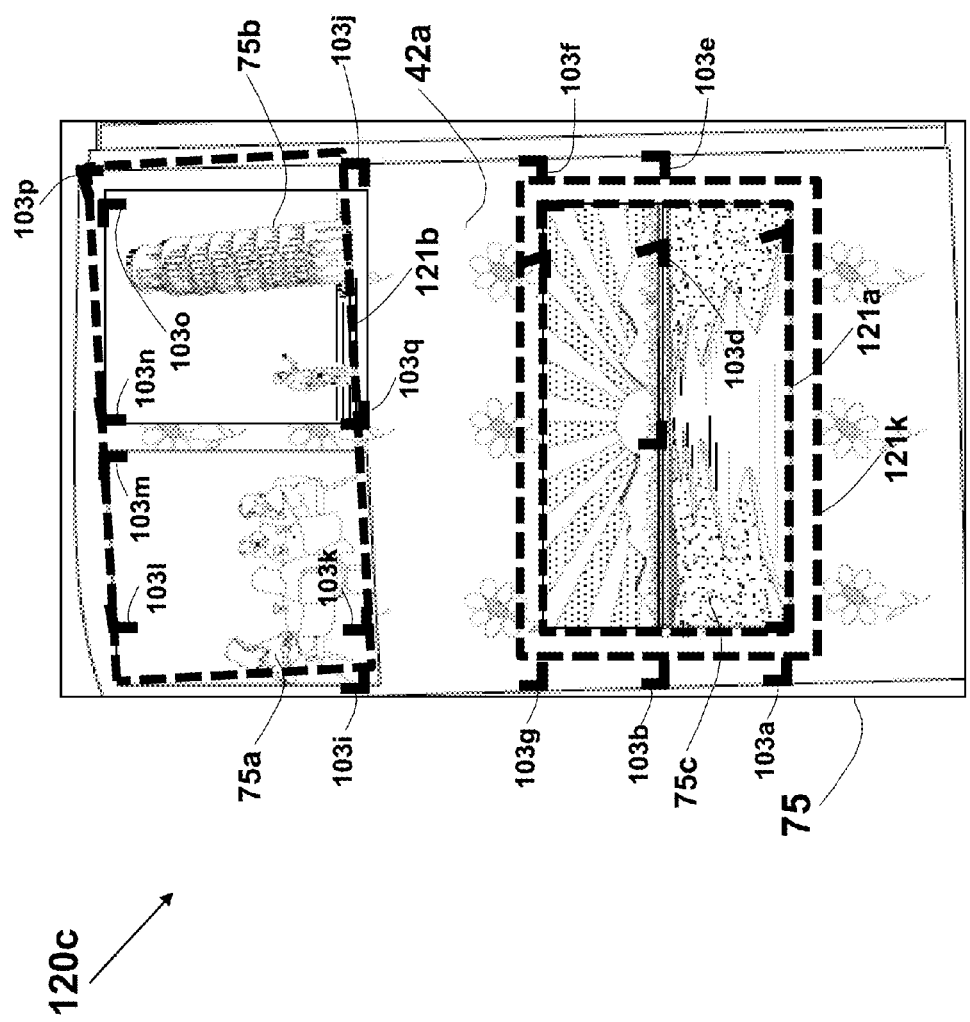

In some scenarios, a detected quad may be fully contained in another detected quad. For example, the detected quad 121c shown in the view 120 contain in full the detected quad 121e shown as part of the view 120a. Similarly, the detected quad 121d shown as part of the view 120a enclose in full the detected quads 121h and 121l, and the detected quad 121 shown as part of the view 120 is included in full in the detected quad 121*j* shown as part of the view 120*b*. Similarly, a view 120*c* in FIG. 12*c* shows a detected quad 121*k* that is slightly bigger than, and includes, the detected quad 121*a*, similar to a slightly larger frame. In the case wherein a detected quad frame is determined to be fully included in a bigger detected quad, the detected line segments (and any part thereof) included in the perimeter or inside these detected quads are checked. In the case where the same detected line segments are included in both the inner and the outer detected quads, the external (bigger) quad is disqualified, as being redundant or not relevant, and only the inner (smaller) detected quad is qualified for additional manipulation. In the examples shown, the detected quad 121*k* is likely to be qualified, since there are no line segments forming it or included in it that are not part of the inner detected quad 121*a*, while the detected quad 121*c* shown in the view 120 to contain in full the detected quad 121*e* is not to be qualified, since for example it contain part of the line segment 101*l* that is not part of the detected quad 121*e*.

Practically, due to the limited area of a photo album 41 page, the number of photos placed on a page is limited. Typically, in order not to overpopulate a photo album page, commonly only 3-5 photos are placed on a single page, thus it may be assumed that no more than M photos are placed on a page; hence, the number of photos regions to be detected should be 1 to M. The value M is assumed less than 10, such as 8, 7, 6, 5, 4, 3, 2, or 1. The quads that were not disqualified in the "Qualify Quads" step 132, referred to as candidate quads, may be further qualified to be selected from as part of a "Select Quads" step 133, being part of the "Detect Quads" step 64 as shown in the flow chart 130 in FIG. 13. In this step, the best 1 to M quads are to be selected from the list of candidate quads, based on pre-defined criteria, as best candidates that include the photos images.

In order to please the viewer's eye, as well as to improve a utilization of the photo album 41 storage areas, photos in a page commonly share similar features and characteristics, that may be used for selecting the best candidate quads. Hence, the correlation between candidate quads may be estimated to be used in the selecting the best ones.

In one example, photos placed on a page may be assumed to be of same or similar size. Hence, the difference or similarity of sizes of two quads may indicate their correlation. For example, in case one candidate quad A enclose Na pixels, and a second candidate quad B enclose Nb pixels, a correlation value of their area may be calculated as $SIZE\_CORRab=1-(|(Na-Nb)|)/(Na+Nb)$. For example, assuming an equal area where Na=1000 pixels and Nb=1000 pixels, the correlation SIZE_CORRab may be calculated to be 1 (100%, best correlation), while in a case where Na=1000 pixels and Nb=1 pixels, the correlation SIZE_CORRab may be calculated to be 0.002 (0.2%, near worst correlation), in a case where Na=1000 pixels and Nb=500 pixels, the correlation SIZE_CORRab may be calculated to be 0.666 (66.6%, medium correlation), and in a case where Na=1000 pixels and Nb=750 pixels, the correlation SIZE_CORRab may be calculated to be 0.857 (85.7%, medium correlation). A size correlation threshold may be used for determining if two candidate quads are correlated or not, where a value of SIZE_CORRab above the size threshold value may be used to indicate highly correlated candidate quads, and a value of SIZE_CORRab below the size threshold value may be used to indicate not correlated candidate quads. For example, assuming a size threshold value of 80%, a candidate quad including 1000 pixels (Na=1000) may be considered as correlated with candidate quads having 1500 pixels or more. The size threshold value used may be 75%, 80%, 85%, 90%, or 95%.

Alternatively or in addition, photos placed on a page may be assumed to be of same or similar aspect ratio. Most cameras have an aspect ratio of 1.33 (4:3) (the same as analog television or early movies), and a 35 mm picture aspect ratio is 1.5 (3:2), such as a printing on the "standard" size of 4"×6". Some print photos are using 4:3 ratio paper, as well as the existing 3:2. Other standard ratios are 5"×7", 8"×10", or 11"×14". Hence, the difference or similarity of an aspect ratio of two quads may indicate their correlation. For example, in case one candidate quad A aspect ratio is ASPRa pixels, and a second candidate quad B aspect ratio is ASPRb pixels, a correlation value of their area may be calculated as $ASPR\_CORRab=ASPRa/ASPRb$ (assuming ASPRb>ASPRa). For example, assuming an equal aspect ratio where ASPRa=1.33 (4:3) and ASPRb=1.33 (4:3), the correlation may be calculated to be 1 (100%, best correlation), while in a case where ASPRa=1.33 (4:3) and ASPRb=1.5 (3:2) the correlation may be calculated to be 0.887 (88.7%), in a case where ASPRa=1.33 (4:3) and ASPRb=4, the correlation may be calculated to be 0.3325 (33.25%, medium correlation), and in a case where ASPRa=1.33 (4:3) and ASPRb=7, the correlation may be calculated to be 0.19 (19%). An aspect ratio correlation threshold may be used for determining if two candidate quads are correlated or not, where a value of ASPR_CORRab above the aspect ratio threshold value may be used to indicate highly correlated candidate quads, and a value of ASPR CORRab below the aspect ratio threshold value may be used to indicate not correlated candidate quads. For example, assuming an aspect ratio threshold value of 80%, a candidate quad having an aspect ratio of 1.33 (ASPRa=1.33) may be considered as correlated with candidate quads having an aspect ratio in the 1.064-1.66 range (1.064<ASPRb<1.66). The aspect ratio threshold value used may be 75%, 80%, 85%, 90%, or 95%.

In one example, photos placed on a page may be assumed not to overlap (or to have minimum overlapping) so that minimal content will not be visible. Hence, in case of excessive overlapping between the two candidates quads may indicate that they are not correlated. For example, in case one candidate quad A encloses Na pixels, a second candidate quad B encloses Nb pixels, and there is an overlapping region of Np pixels between the two candidates quads, an overlapping OVERLab value may be calculated as $OVERLab=2*Np/(Na+Nb)$. For example, assuming an equal area where Na=1000 pixels and Nb=1000 pixels and no overlapping region (Np=0 pixels), the overlapping may be calculated to be 0 (0%, no overlapping), while in case of full overlapping region (Np=1000 pixels), the overlapping may be calculated to be 1 (100%, full overlapping). In a case of an overlapping region of 200 pixels, the overlapping may be calculated to be 0.2 (20%, partly overlapping), while in a case where Np=700 pixels, the correlation OVERLab may be calculated to be 0.7 (70%, above half overlapping), in a case where Np=500 pixels, the overlapping OVERLab may be calculated to be 0.5 (50%, half overlapping), and in a case where Np=50 pixels, the overlapping OVERLab may be calculated to be 0.05 (5%, medium low overlapping). An overlapping threshold may be used for determining if two candidate quads are overlapping, where a value of OVERLab below the overlapping threshold value may be used to indicate lower overlapping candidate quads and a value of OVERLab above the overlapping threshold value may be used to indicate not correlated candidate quads. For example, assuming an overlapping threshold value of 20%, and assuming that the two candidate quads each including 1000 pixels (Na=Nb=1000), these two candidate quads are considered to overlap if the shared region is above 200 pixels. The overlapping threshold value used may be 30%, 25%, 20%, 15%, or 10%.

Other techniques that may be used for evaluating similarities are described in U.S. Pat. No. 7,702,185 to Keating et al. entitled: "Use of Image Similarity in Annotating Groups of visual Images in a Collection of Visual Images", which is incorporated in its entirety for all purposes as if fully set forth herein.

At any stage, a detected or qualified quad may be fully contained in another detected quad. For example, the detected quad 121c shown in the view 120 contain in full the detected quad 121e shown as part of the view 120a. Similarly, the detected quad 121d shown as part of the view 120a enclose in full the detected quads 121h and 121l, and the detected quad 121 shown as part of the view 120 is included in full in the detected quad 121j shown as part of the view 120b. Similarly, a view 120c in FIG. 12c shows a detected quad 121k that is slightly bigger than, and includes, the detected quad 121a, similar to a slightly larger frame. In the case wherein a detected quad frame is determined to be fully included in a bigger detected quad, the detected line segments (and any part thereof) included in the perimeter or inside these detected quads are checked. In the case where the same detected line segments are included in both the inner and the outer detected quads, the external (bigger) quad is disqualified, as being redundant or not relevant, and only the inner (smaller) detected quad is qualified for additional manipulation. In the examples shown, the detected quad 121k is likely to be qualified, since there are no line segments forming it or included in it that are not part of the inner detected quad 121a, while the detected quad 121c shown in the view 120 to contain in full the detected quad 121e is not to be qualified, since for example it contain part of the line segment 101l that is not part of the detected quad 121e.

Each possible pair of candidate quads may be checked for correlation and overlapping, and a pair of candidate quads may be considered as correlated if their size correlation value (SIZE_CORRab) is above a set size correlation threshold value, their aspect ratio correlation value (ASPR_CORRab) is above a set aspect ratio correlation threshold value, and their overlapping value (OVERLab) value overlapping is below a set overlapping threshold value. Further, a sequential number may be assigned to the candidates quads, such as i, i=1 . . . N (N is the number of candidate quads), and a variable $a_{ij}$ may be assigned to be 1 in case of correlation between the candidate quads respectively numbered (i) and (j), and may be assigned to be 0 in case where no correlation was determined between the candidate quads numbered i and j. A symmetric correlation matrix A may be formed including the values. An example of such a matrix A, where N=10 thus the matrix is of a size of 10×10, is shown as matrix A 140 in FIG. 14. The first column 141a represents the quad#1, the second column 141b represents the quad #2, the third column 141c represents the quad #3, the fourth column 141d represents the quad #4, the fifth column 141e represents the quad #5, the sixth column 141f represents the quad #6, the seventh column 141g represents the quad #7, the eighth column 141h represents the quad #8, the ninth column 141i represents the quad #9, and the tenth column 141j represents the quad #10. Similarly, the first row 142a represents the quad#1, the second row 142b represents the quad #2, the third row 142c represents the quad #3, the fourth row 142d represents the quad #4, the fifth row 142e represents the quad #5, the sixth row 142f represents the quad #6, the seventh row 142g represents the quad #7, the eighth row 142h represents the quad #8, the ninth row 142i represents the quad #9, and the tenth row 142j represents the quad #10.

In one example, $a_{ii}$=1 (for any i=1 N) since the self-correlation of a quad is known to be 1. Alternatively or in addition, the value of an $a_{ii}$ element may correspond to the confidence level associated with the quad numbered (i). For example, the value of $a_{ii}$ may be based on the aggregated length of the detected line segments (that were, for example, detected as part of the "Sides Detection" step 93) that are part of a perimeter of a detected quad versus the total length of that quad perimeter. For example, a ratio (designated 'r', 0≤r≤1) of the aggregated length of the detected line segments to the perimeter length may be calculated. In the case where all of the quad sides are formed by the detected line segments, the ratio is r(i)=1 (100%), and in the case no detected line segment is part of a quad perimeter, the ratio is r(i)=0 (0%). In the case of a quad shaped as a square, where only one side is formed by a detected line segment, the ratio is calculated to be r(i)=0.25 (25%), while two sides may result in r(i)=0.5 (50%). In one example, the value of the $a_{ii}$ element (corresponding to the quad numbered (i)) may be linearly or exponentially dependent upon the value of r(i). In one example, the value of the $a_{ii}$ element may be based on $\alpha r(i)^6$ (0≤r(i)≤1) where α is a constant preferably in the 5 to 15 range, such as α=10.

Alternatively or in addition, the value of an $a_{ii}$ element may be based on the aspect ratio of the quad (i), designated ASPR(i)=$ASPR_i$. Most photos are known to be associated with an aspect ratio of 1.33 (4:3) (the same as analog television or early movies), and a 35 mm picture aspect ratio is 1.5 (3:2), such as printing on the "standard" size of 4"×6". Some print photos are using 4:3 ratio paper, as well as the existing 3:2. Other standard ratios are 5"×7", 8"×10", or 11"×14". Hence, the difference or similarity of an aspect ratio to a known used aspect ratio may be used for calculating the value of an $a_{ii}$ element. Assuming the aspect ratios are calculated to be equal or above 1, the common aspect ratios are 1 (1:1), 1.25 (10:8), 1.273 (14:11), 1.33 (4:3), 1.4 (7:5), and 1.5 (3:2). Hence, upon measuring an aspect ratio of a quad of 1.39 ASPR(i)=1.39 for quad number (i), it is most likely that the actual aspect ratio is 1.4 (7:5), being the closest value, and the aspect ratio error (s(i)=ASPR_ERR(i)) is the absolute difference between the actual and the closest value, calculated as s=ASPR_ERR(i)=|1.39−1.4|=0.01. Similarly, a measured aspect ratio of a quad (j) of 1.19 ASPR(j)=1.19 for quad number (j), it is most likely that the actual aspect ratio is 1.25 (10:8), being the closest value, and the aspect ratio error (ASPR_ERR(j)) is calculated as s(j) =ASPR_ERR(j)=|1.19−1.25|=0.06. In one example, the value of the $a_{ii}$ element (corresponding to the quad numbered (i)) may be linearly or exponentially dependent upon the value of s(i). In one example, the value of the $a_{ii}$ element may be based on $EXP(-\beta*s(i)^2)=e^{-\beta*s^2}$, where β is a constant preferably in the 4 to 12 range, such as β=8.

Alternatively or in addition, the value of an $a_{ii}$ element may be based on both the deviation of the aspect ratio of the quad (i) from a closest common value 's' (=ASPR_ERR(i)) and the ratio ('r') of the aggregated length of the detected line segments to the perimeter length. Various functions may be used for calculating the value of the $a_{ii}$ element relating to the quad (i). For example, the value of the $a_{ii}$ element may be calculated as $\alpha r^6 * e^{-\beta*s^2}$.

An Eigenvector or characteristic vector of a square matrix is a vector that does not change its direction under the associated linear transformation: If v is a vector that is not zero, then it is an eigenvector of a square matrix A if Av is a scalar multiple of v. Calculating Eigen vector is described in Chapter 6 entitled: "*Eigenvalues and Eigenvectors*" (pp. 283-297) of a 4th Edition book published 2009 by Wellesley-Cambridge Press and SIAM, and authored by Gilbert Strang and entitled: "*Introduction to Linear Algebra*", which is incorporated in its entirety for all purposes as if fully set forth herein. The Eigenvector of the matrix A may be used for the selecting of the best candidate quads. An Eigenvector EV of the correlation matrix A 140 is calculated as V=[0.45, 0.45, 0.38, 0.38, 0.33, 0.33, 0.00, 0.19, 0.17, 0.17]. In one example, a threshold is set, and all quads associated with a value in the vector EV that is above the threshold, are selected. For example regarding the matrix A 140, a threshold value of 0.35 results in the selection of the quads #1, #2, #3, and #4 only. Alternatively or in addition, the quad associated with the highest value is first selected. Then the quad associated with the second highest value is checked versus the first quad. In case the two cannot exist together, such as since one is included in the other or excessive overlapping, the second selected quad is deselected, and the process proceed with the next highest value quad. In the example of matrix A 140, first quad #1 is selected having the highest value of 0.45. Next, the quad #2 is selected. In case it cannot co-exist with the first selected, the quad #2 is deselected. Then the quad #3 is selected, having the current non-selected highest value of 0.38. Then this quad #3 is checked to co-exist and correlate with the quads #1 and #2. The quad 4 is next selected, and the process continues until all the quads (having value above 0 such as the quad #7 in the above example) are selected, or until the total number of the quads to be selected is exhausted.

Two candidate quads where one quad closely encloses the candidate quad, such as the quad 121*k* enclosing the quad 121*a* shown as part of the view 120*c*, are typically associated as highly correlated. In one example, the external enclosing candidate quad may be de-selected based on the line segments as described above. Alternatively or in addition, in the case where two of the quads selected by using the Eigenvector technique are such that one fully enclose the other, the bigger one is de-selected from further handling.

As an alternative, or in addition, to the above image processing that is based on the shape of photos in a photo album, the processing may further be based on the content in the photos, by analyzing or checking the image 75 content, as part of a "Qualify Content" step 65 shown as part of the flow chart 60 in FIG. 6.

Figure 15:
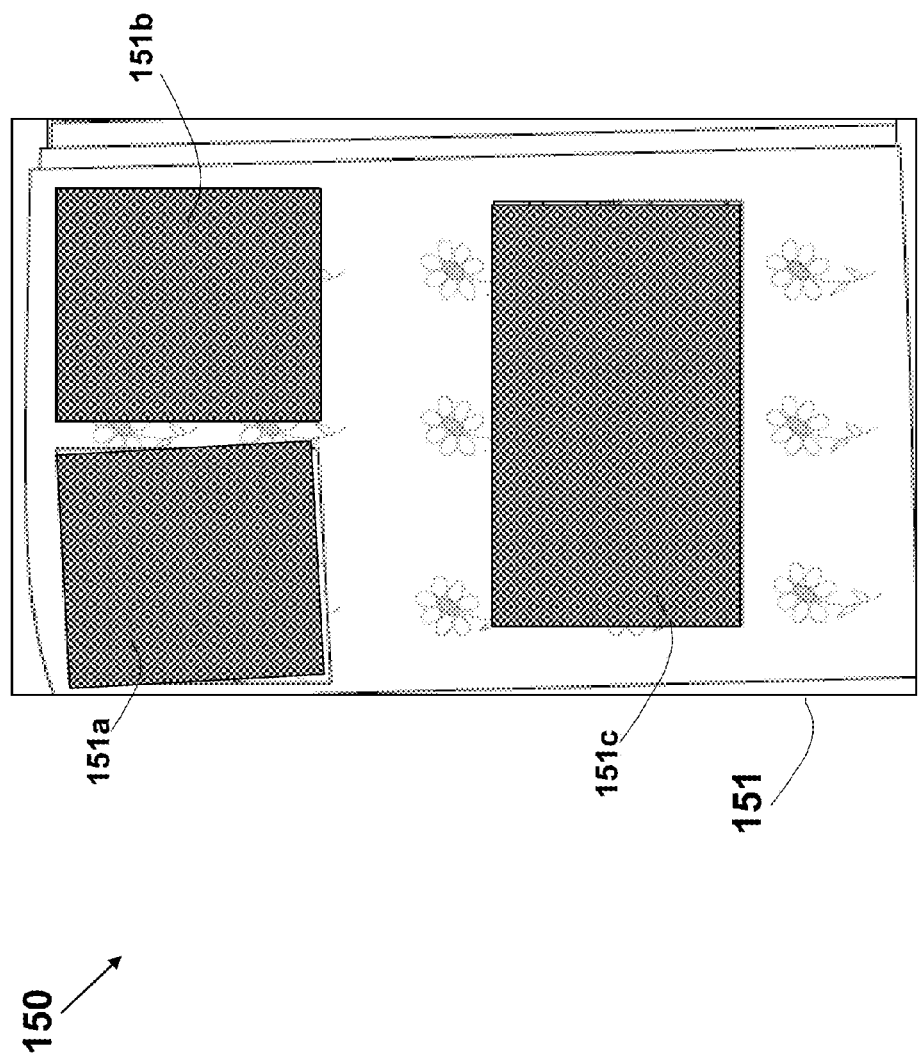
FIG. 15 depicts pictorially a view of an object detection output of a captured image page.

In one example, the quads are qualified in the "Qualify Content" step 65 by using a neural network, such as a deep convolutional neural network. At the first step, the neural network is trained, for example by analyzing multiple pages including images and identifying the photos regions in each page image. After the neural network is trained, it may be used for detecting or identifying regions in a page image that include photos. An example of an output of such trained neural network is shown in a view 150 in FIG. 15, the output include identified regions in a page image 151 (corresponding to the input page image 75), where the identified region 151*a* corresponds to the photo #1 region 75*a*, the identified region 151*b* corresponds to the photo #2 region 75*b*, and the identified region 151*c* corresponds to the photo #3 region 75*c*. Quads in the list that do not correspond to the identified objects in the page image 151 may be removed from the list. For example, a quad is qualified and is not removed from the list if it includes at least 75%, 80%, 85%, 90%, or 95% of an identified object region.

Alternatively or in addition, a saliency map may be generated by analyzing the content, and may be used to qualify, disqualify, select, or deselect quads or regions detected or identified in the image 75. In one example, the saliency map formed by assigning to each pixel (or to a group of neighboring pixels) in the captured image 75 a value, such as '1' for a pixel (or group of pixels) that are considered or analyzed to be a 'content' or an 'important' pixel, and '0' is assigned to 'non-important' or 'background' considered pixels. A view 150*a* in FIG. 15*a* is an example of a saliency map for the image 75, illustrating a saliency region 151*c* in the photo image region 75*a*, two saliency regions 151*a* and 151*b* in the photo image region 75*b*, a saliency region 151*d* in the photo image region 75*c*, and multiple saliency regions 151*e*, 151*f*, 151*g*, 151*h*, 151*i*, and 151*j* in the background part 42*a*.

In one example, the analysis and the generation of the saliency map are based on using neural networks. For example, an open source software named DeepBelief may be used, whose SDK is described and may be downloaded from the website github.com/jetpacapp/ DeepBeliefSDK#api-reference (preceded by http://), a copy of the web page which incorporated in its entirety for all purposes as if fully set forth herein. Alternatively or in addition, a pre-trained neural network may be used, such as the project ImageNet described in the website www.image-net.org/(preceded by http://) whose API is described in a web page image-net.org/download-API (preceded by http://), a copy of which is incorporated in its entirety for all purposes as if fully set forth herein. The project is further described in a presentation by Fei-Fei Li and Olga Russakovsky (ICCV 2013) entitled: "*Analysis of large Scale Visual Recognition*", in an ImageNet presentation by Fei-Fei Li (of Computer Science Dept., Stanford University) entitled: "*Outsourcing, benchmarking, & other cool things*", and in an article (downloaded June 2015) by Alex Krizhevsky, Ilya Sutskever, and Geoffrey E. Hinton (all of University of Toronto) entitled: "*ImageNet Classification with Deep Convolutional Neural Networks*", which are both incorporated in their entirety for all purposes as if fully set forth herein.

In one example, the 'content' ratio of a candidate or selected quad is calculated by the dividing total number of 'content' pixels in the quad by the total number of pixels in the quad. A 'content' ratio threshold may be used for determining or estimating if a quad is indeed a photo image or is rather a background. In the case the content ratio is above the content ratio threshold, the quad is considered to be selected, while a content ratio below the threshold is disqualified or de-selected for further use. For example, the content ratio threshold value used may be 20%, 25%, 30%, 35%, 40%, 45%, or 50%.

Alternatively or in addition, the saliency map may be used to identify a scenario where the captured image contains only a single photo. For example, a large photo occupying the whole album page, or a regular photo that was captured closely or by zooming-in to the photo. Such a case may be identified by calculating the ratio of the number 'content' pixels in the selected quads and the whole image. For example, a ratio threshold may be used for determining or estimating if only a single photo is involved, such as 20%, 25%, 30%, 35%, 40%, or 45%. In the case where the ratio of the number of the 'content' pixels in the selected quads versus the whole image is less than the threshold, a single photo is determined to exist.

Alternatively or in addition, the quads may be qualified in the "Qualify Content" step 65 by using a neural network trained for object detection or object classification. Such trained network may be publicly available and may be easily used, such as ImageNet. While the output of such a trained neural network involves classification of an object (or objects) in an image, intermediate or interim results, as part of the classification process, may be used for the object (or objects) region (or regions) detection. For example, the neural network used in the ImageNet project involves 26 layers or stages of operation. The eighth layer includes generating of 256 'maps' (that may correspond to salience maps or 'heat' maps) having 27*27 pixels. A weighted average of these maps may provide a detection of photos regions that may be used for qualifying of the quads, such as removing from the list the quads that do not correspond to the identified regions.

While exemplified above regarding the cropping of photos images captured in a photo album, the techniques and methods herein may equally apply to any detection of paper pages in any captured or scanned image, such as receipts, business cards, sticky notes, printed newspapers, and stamps. Further, objects other than paper-based may equally be detected, such as museum pictures, artwork, and road signs.

While exemplified above regarding the cropping of photos images captured in a photo album, the techniques and methods herein may equally apply to any detection in an image of any objects that share specific features or characteristics. Further, while exemplified above regarding rectangular based shapes of the photos, any polygon or any other shapes may be equally used.

Figure 16:
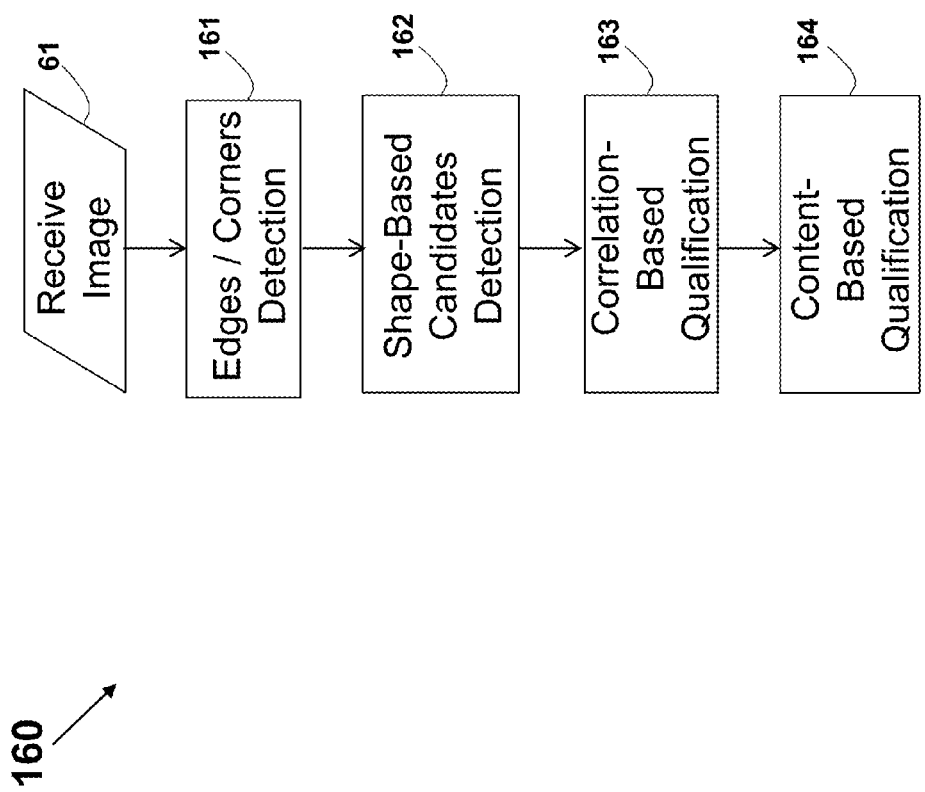
FIG. 16 illustrates schematically a general flow diagram of detecting objects in a captured image.

A general flow chart 160 for object detection and cropping is shown in FIG. 16. An image to be analyzed is received in the "Receive Image" step 61, which may include capturing a scene using a digital camera. In one example, the objects to be identified in the captured image are having the same or similar shape. The shape may be of any polygon or a two-dimensional (plane) figure that is bounded by a finite chain of straight-line segments closed in a loop to form a closed chain or circuit. The polygon may be a convex type, where any line that is drawn in the polygon (and not tangent to an edge or corner) meets its boundary exactly twice, or a Non-convex type, where a line may be found which meets its boundary more than twice. Further, the polygon may be a simple polygon where the boundary of the polygon does not cross itself, a Concave polygon that is Non-convex and simple, and there is at least one interior angle greater than 180°. Alternatively or in addition, the polygon may be Star-shaped, where the whole interior is visible from a single point, without crossing any edge, a self-intersecting one, where the boundary of the polygon crosses itself, or may be a Star polygon, which self-intersects in a regular way. Further, the polygon may be Equiangular, where all corner angles are equal, Cyclic where all corners lie on a single circle, Isogonal (or vertex-transitive) where all corners lie within the same symmetry orbit, Equilateral where all edges are of the same length, Tangential where all sides are tangent to an inscribed circle, Isotoxal (or edge-transitive) where all sides lie within the same symmetry orbit, or Regular, where the polygon is both isogonal and isotoxal.

Using edge detection, line detection, corner detection, or any other technique for detecting or identifying the polygon edges or vertices, potential lines that may be candidates for the polygons edges are detected in the image in an "Edges/Corners Detection" step 161. Next, as part of a "Shape-Based Candidates Detection" step 162, candidates for the polygon-based objects are identified. Assuming that a known correlation exists between the objects in the image, all pairs of the polygons candidates are checked versus the correlation features, and candidates that do not meet the correlation criteria are disqualified as part of a "Correlation-Based Qualification" step 163. Assuming that the objects to be detected share content characteristics, the qualified candidates are checked to satisfy the content characteristics as part of a "Content-Based Qualification" step 164, and those candidates that have not been disqualified are selected as the objects to be detected.

The method described herein allows for automatically capturing, analyzing, identifying, cropping, extracting, storing, and handling of photos, which may be in a photo album or a shoebox. There is no need to take out the photos from the photo album, or to arrange the photos in any way before capturing, and further the existence of a background does not interfere with the process, allowing easy and simple process for a user. Further, there is no need for any special or non-standard equipment, and the method may be performed in real-time locally in a digital camera or a smartphone having limited computing power source. The extracted images may be easily stored, manipulated, sent to other computers, or restored, which is particularly important when using a mobile devices, since users of mobile devices tend to have shorter attention span than users of desktop or laptop computers. The method further allows for proper analyzing even in non-optimal conditions such as low lighting intensity or capturing at non-straight angles.

Figure 17:
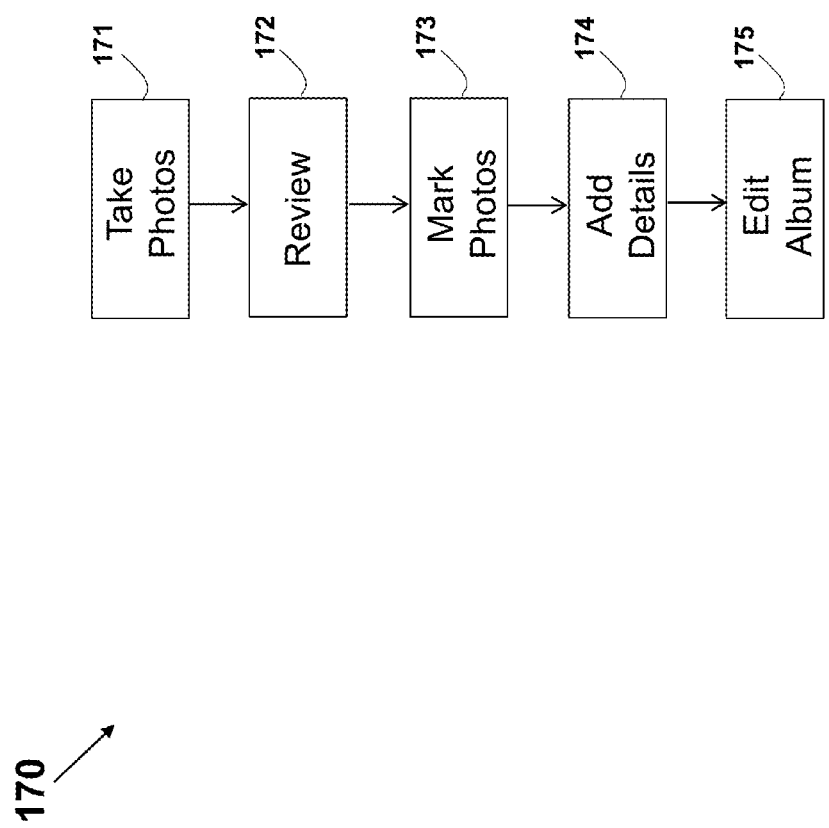
FIG. 17 illustrates schematically a general flow diagram by a user of capturing and detecting photo images in a page image of a photo album.
Figure 18A:
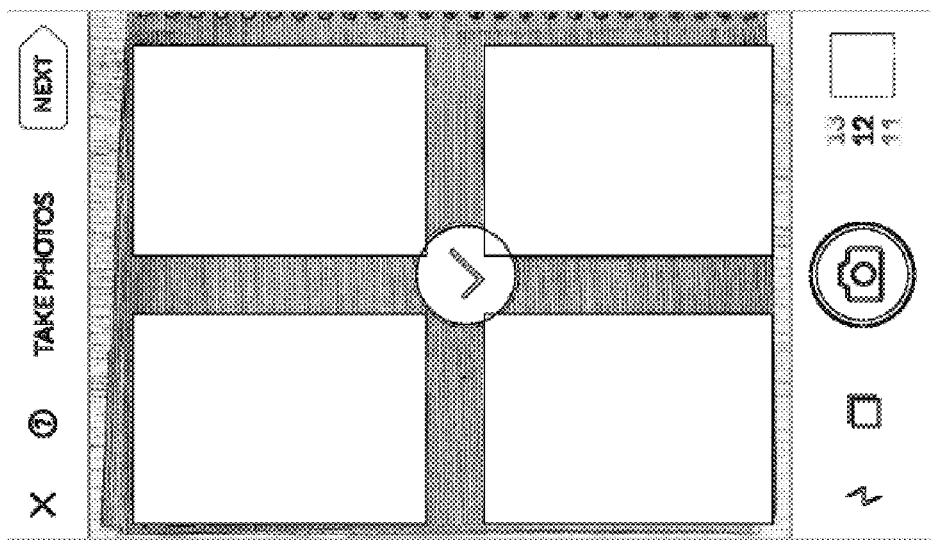
FIGS. 18-18k depict pictorially a user interface screen shot for a user for capturing and detecting photo images in a page image of a photo album.
Figure 18:
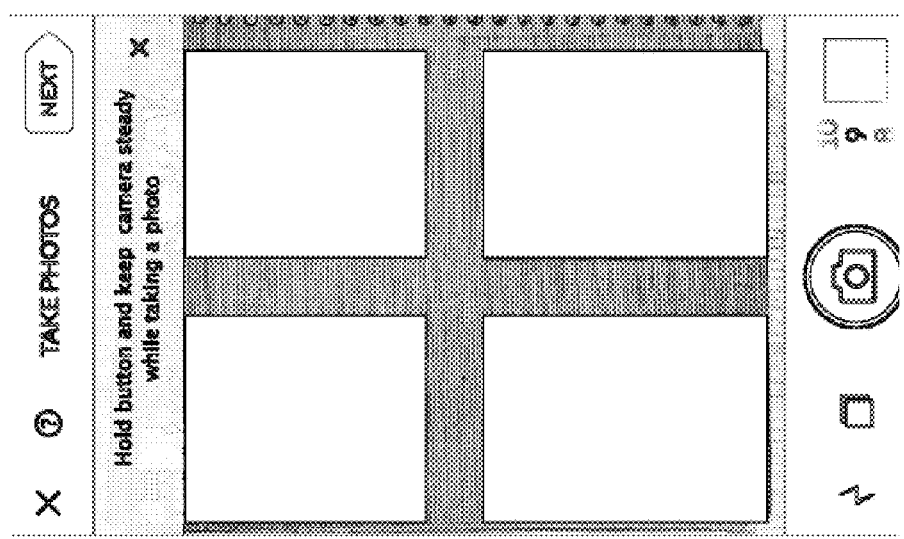
Figure 18C:
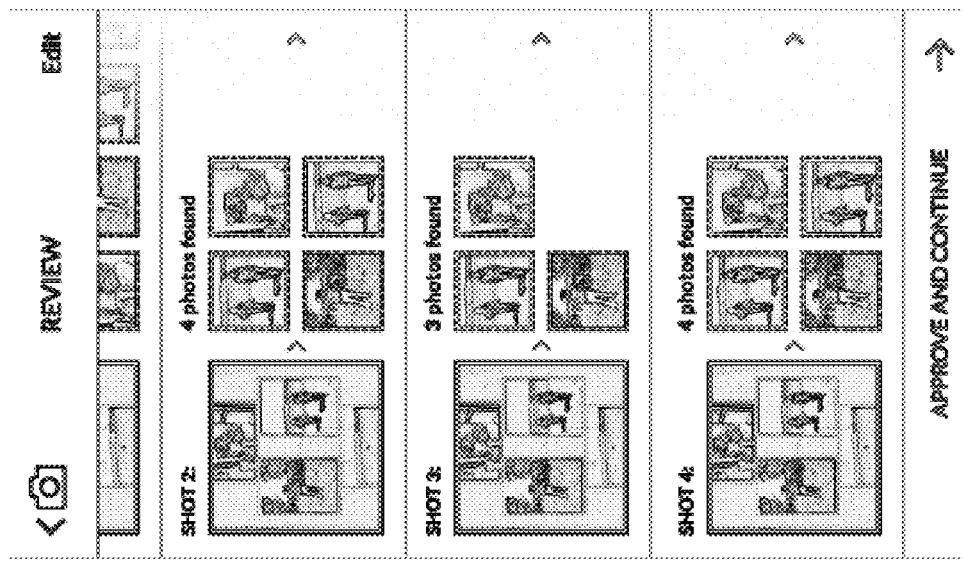
Figure 18B:
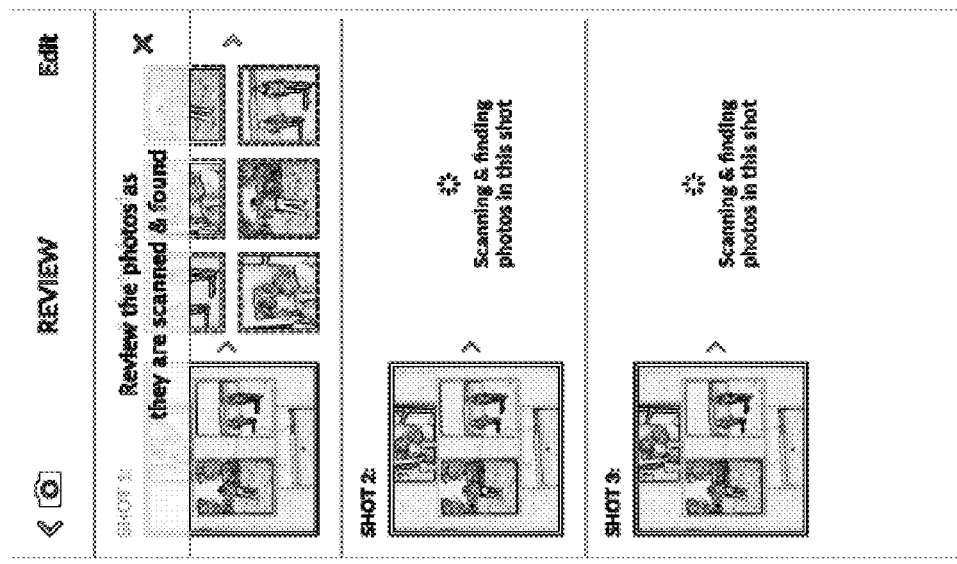
Figures 18D, 18E:
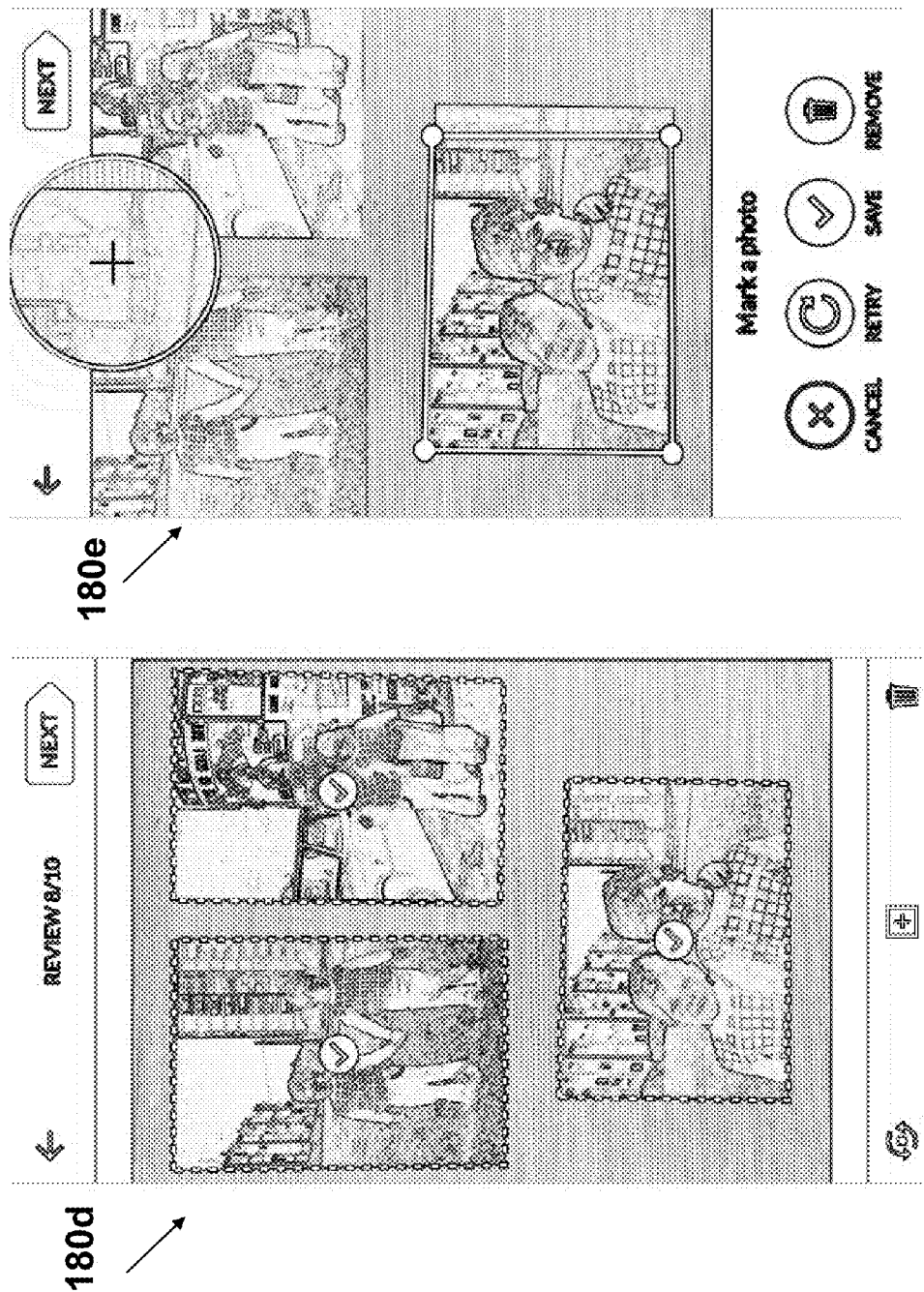
Figure 18G:
Figure 18F:
Figure 18K:
Figure 18J:
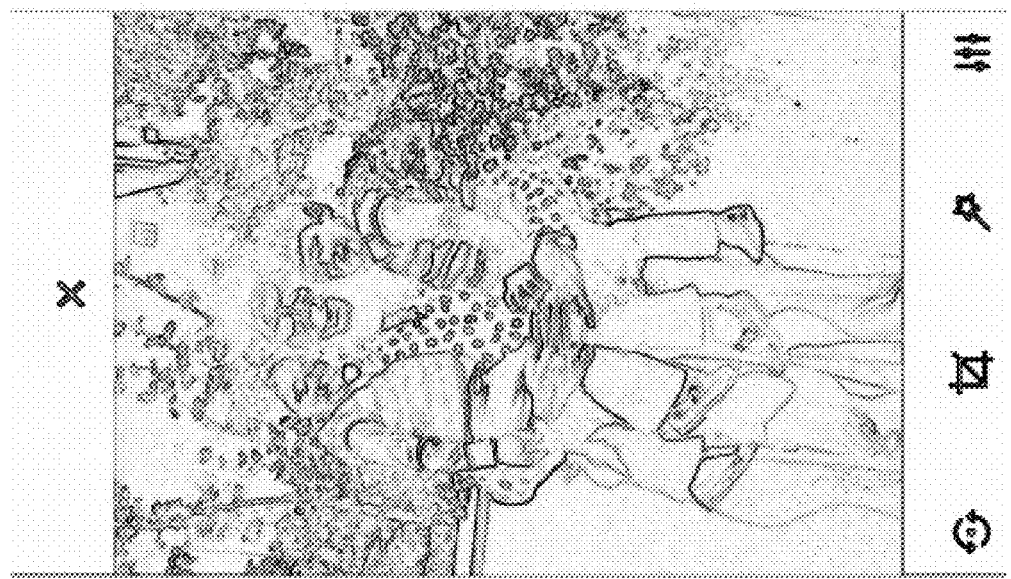

In one example, a human user may use the system and method described herein as described in a flow chart 170 shown in FIG. 17, and exemplified by screen shots in FIGS. 18-18*k*. As part of a "Take Photos" step 171, the user takes photos while looking at a viewfinder or a screen of a smartphone, as shown in a view 180 in FIG. 18, and by activating a 'virtual' or an actual shutter as shown in a view 180*a* in FIG. 18*a*, capturing and creating a digital image of a page in a photo album, corresponding to the "Receive Image" step 61 in the flow-chart 60. After one or more pages are captured, the flow chart 60 is automatically executed in the capturing device (a digital camera or a smartphone), and the cropped images of the photos are displayed for the user to review, as part of a "Review" step 172, as shown in a view 180*b* in FIG. 18*b*, in a view 180*c* in FIG. 18*c*, and in a view 180*d* in FIG. 18*d*. Preferably, the user is given an opportunity to approve the cropping (such as by selecting a checkmark shown in the view 180*d*), or to notify the device regarding wrong region cropping. Upon approval, the cropped images may be individually selected as part of a "Mark Photos" step 173 as shown in a view 180*e* in FIG. 18*e*, and individually manipulated. In one example, tags or other metadata are added to an individual cropped image, or to the all cropped images as part of a digital album, as part of a "Add Details" step 174, as shown in a view 180*f* in FIG. 18*f* and a view 180*g* in FIG. 18*g*. The formed digital album may be further shared, edited, or otherwise manipulated as part of an "Edit Album" step 175, as exemped in a view 180*h* in FIG. 18*h* and a view 180*i* in FIG. 18*i*. Further, the cropped photo images may be individually selected and edited using any image editing tool (such as Adobe PhotoShop), as examples in a view 180*j* in FIG. 18*j* and a view 180*k* in FIG. 18*k*.

Figure 19:
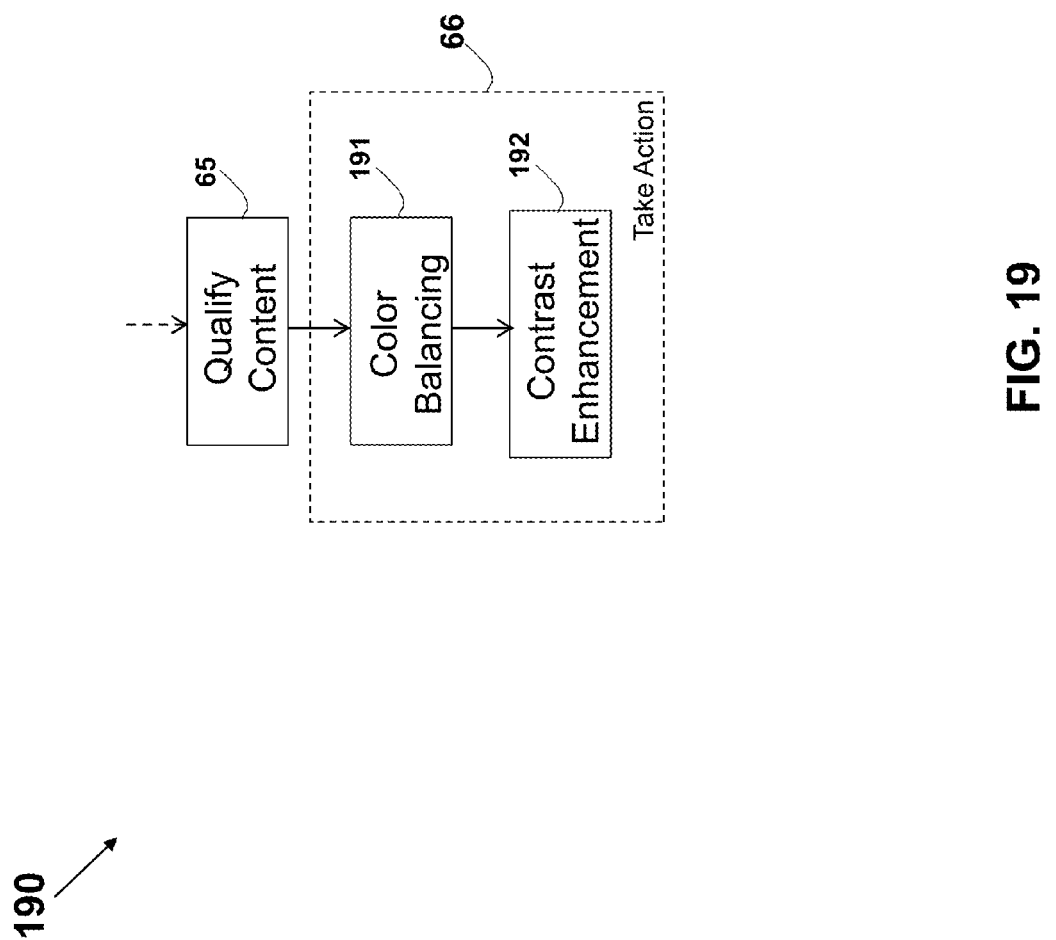
FIG. 19 illustrates schematically a flow diagram of enhancing extracted or cropped images.

After the selected quads have been analyzed for qualified content, the extracted regions may be manipulated or otherwise processed as part of the "Take Action" step 66 in the flow chart 60, for example by using any image enhancement technique. In one example, as shown in a flow chart 190 in FIG. 19, the image enhancement may include a "Color Balancing" step 191 followed by a "Contrast Enhancement"

step 192, to correct the effect due to the photo deterioration, caused by either by the chemical processes relating to the photographic paper or the environmental conditions to which the photos were exposed.

A photo deterioration commonly involves color shifting, affecting the color balance in the photos, shown as part of the images in the extracted or cropped regions. Typically, such shifting is shown as an increase in one or more specific colors, hence 'tilting' (sometimes referred to as 'tinting') and changing the original color balance in the photo when captured. Any color balancing or color balance correction technique may be used as part of the "Color Balancing" step 191. In one example, the color balancing is based on 'shifting' the pixels values to a gray reference color. For example when using RGB color space, a gray reference color may be defined as $(r_{ref}, g_{ref}, b_{ref})$, assumed to represent a 'typical' or 'standard' average value of colors in a 'typical' or 'standard' photo or image. In one example, the values of all the pixels in an extracted or cropped region are averaged, resulting in an 'average' pixel color values $(r_{avg}, g_{avg}, b_{avg})$, where $r_{avg}$ is a simple (or weighted) average of all the 'r' values of the pixels in the region, $g_{avg}$ is a simple (or weighted) average of all the 'g' values of the pixels in the region, and $b_{avg}$ is a simple (or weighted) average of all the 'b' values of the pixels in the region. The color shift may be estimated as the average pixel color value compared to the gray reference pixel color shown as $(r_{sft}, g_{sft}, b_{sft})=(r_{avg}, g_{avg}, b_{avg})-(r_{ref}, g_{ref}, b_{ref})$, so that $r_{sft}=r_{avg}-r_{ref}$, $g_{sft}=g_{avg}-g_{ref}$ and $b_{sft}=b_{avg}-b_{ref}$. A color balance correction may consist of, or may be based on, color shifting of all the piels in the extracted regions by the estimated color shifting $(r_{sft}, g_{sft}, b_{sft})$ so that the resulting average of the balanced color image matches the gray reference color values, using $(r_c, g_c, b_c)=(r, g, b)-(r_{sft}, g_{sft}, b_{sft})$, so that $r_c=r-r_{sft}$, $g_c=g-g_{sft}$, and $b_c=b-b_{sft}$, where $(r_c, g_c, b_c)$ are the pixel values of the color balanced image, and (r, g, b) are the original values of the color shifted image (before correction). For example, assuming a gray reference pixel color $(r_{ref}, g_{ref}, b_{ref})$ of (107, 104, 113), and an image (such as extracted region) having an average $(r_{avg}, g_{avg}, b_{avg})$ of (106, 123, 120), the shifting $(r_{sft}, g_{sft}, b_{sft})$ may be estimated to be (−1, 19, 7). Hence, an exemplary pixel in the image having a color values of (130, 142, 110) will be color balanced and corrected to be (131, 104, 96) [=(131, 123, 103)−(−1, 19, 7)].

The gray reference color values may be empirically estimated by averaging a large number of images, preferably a large number of images in an images database, or by averaging a large number of images captured, used, stored, or otherwise manipulated by a specific user. Alternatively or in addition, constant reference values may be used such as (100, 100, 100) or (105, 105, 105).

Commonly, photos in a photo album were taken around the same time period by using the same camera, were developed using the same photographic paper, and were subject to the same environmental conditions. Thus, it may be estimated that all the photos in a photo album share the same color balancing shift, and require a similar color balance correction. As such, it is preferred that the pixels average $(r_{avg}, g_{avg}, b_{avg})$ be calculated based on all, using all of, or many of, the extracted regions from pages of the same photo album, and used for estimating the color shifting $(r_{sft}, g_{sft}, b_{sft})$ for all of, or part of, the regions extracted from pages that are part of that photo album. Similarly, using the average of multiple photo albums may be used. Alternatively or in addition, the pixels average $(r_{avg}, g_{avg}, b_{avg})$ may be calculated using all the regions extracted from a photo album page, and used for estimating the color shifting $(r_{sft}, g_{sft}, b_{sft})$ used for correcting the one or more of the regions extracted from that page. For example, assuming the regions 75a, 75b, and 75c were properly extracted from the captured page image 75, the pixels of all the three regions may be used for calculating the pixels average $(r_{avg}, g_{avg}, b_{avg})$ for that page 75, and may be used to estimate the color shifting $(r_{sft}, g_{sft}, b_{sft})$ used for correcting one, two, or all of the regions.

As part of the "Contrast Enhancement" step 192, any contrast enhancement technique may be used, such as a linear contrast enhancement, that may be according to, based on, or include Min-Max Linear Contrast Stretch, Percentage Linear Contrast Stretch, or Piecewise Linear Contrast Stretch algorithm. Alternatively or in addition, a nonlinear contrast enhancement may be used, that may be according to, based on, or include Histogram Equalizations, Adaptive Histogram Equalization, Unsharp Mask, or Homomorphic Filter algorithm. Preferably, the contrast enhancement is applied to a color balance corrected image, after being color balanced as part of the "Color Balancing" step 191.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for a software compatibility with variants of Unix and other operating systems, such as POSIX.1-2008 that is simultaneously IEEE STD. 1003.1™-2008 entitled: "*Standard for Information Technology—Portable Operating System Interface (POSIX(R)) Description*", and The Open Group Technical Standard Base Specifications, Issue 7, IEEE STD. 1003.1™, 2013 Edition.

Examples of web browsers include Microsoft Internet Explorer (available from Microsoft Corporation, headquartered in Redmond, Wash., U.S.A.), Google Chrome which is a freeware web browser (developed by Google, headquartered in Googleplex, Mountain View, Calif., U.S.A.), Opera™ (developed by Opera Software ASA, headquartered in Oslo, Norway), and Mozilla Firefox® (developed by Mozilla Corporation headquartered in Mountain View, Calif., U.S.A.). The web-browser may be a mobile browser, such as Safari (developed by Apple Inc. headquartered in Apple Campus, Cupertino, Calif., U.S.A), Opera Mini™ (developed by Opera Software ASA, headquartered in Oslo, Norway), and Android web browser.

Any part of, or whole of, any of the methods described herein may be implemented by a processor such as the processor 12, or by a processor that is part of a device that is integrated with a digital camera such as the processor 33, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

Any device herein may serve as a client device in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Wash., U.S.A.), Linux, and Google Chrome OS available from Google Inc. headquartered in Mountain View, Calif., U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 5-9), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers may equally function as a server in the meaning of client/server architecture. Any one of the servers herein may be a web server using HyperText Transfer Protocol (HTTP) that responds to HTTP requests via the Internet, and any request herein may be an HTTP request.

Examples of web browsers include Microsoft Internet Explorer (available from Microsoft Corporation, headquartered in Redmond, Wash., U.S.A.), Google Chrome which is a freeware web browser (developed by Google, headquartered in Googleplex, Mountain View, Calif., U.S.A.), Opera™ (developed by Opera Software ASA, headquartered in Oslo, Norway), and Mozilla Firefox® (developed by Mozilla Corporation headquartered in Mountain View, Calif., U.S.A.). The web-browser may be a mobile browser, such as Safari (developed by Apple Inc. headquartered in Apple Campus, Cupertino, Calif., U.S.A), Opera Mini™ (developed by Opera Software ASA, headquartered in Oslo, Norway), and Android web browser.

Any device herein, such as the digital camera 70, may be integrated with a part of or in an entire appliance. The primary function of the appliance may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffee-maker, or an iced-tea maker. Alternatively or in addition, the primary function of the appliance may be associated with an environmental control such as temperature control, and the appliance may consist of, or may be part of, an HVAC system, an air conditioner or a heater. Alternatively or in addition, the primary function of the appliance may be associated with a cleaning action, such as a washing machine, a clothes dryer for cleaning clothes, or a vacuum cleaner. Alternatively or in addition, the primary function of the appliance may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

The steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein. Any of the disclosed flow charts or methods, or any step thereof, may be implemented in the form of software stored on a memory or a computer-readable non-transitory information storage medium such as an optical or magnetic disk, a non-volatile memory (e.g., Flash or ROM), RAM, and other forms of volatile memory. The information storage medium may be an internal part of the computer, a removable external element coupled to the computer, or unit that is remotely accessible via a wired or wireless network.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refer to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing for the transfer of power, signal, or data, as well as connections formed through intervening devices or elements.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled by the same software or hardware. The term "integration" herein is used herein to include as applicable, but not limited to, software integration, hardware integration, or any combination thereof.

Any networking protocol may be utilized for exchanging information between the network elements (e.g., clients, and servers) within the network (such as the Internet 22). For example, it is contemplated that communications can be performed using TCP/IP. Generally, HTTP and HTTPS are utilized on top of TCP/IP as the message transport envelope. These two protocols can deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described herein is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

The term "port" refers to a place of an access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

The term "computer" or "device" is used generically herein to describe any number of computers, including, but not limited to personal computers, embedded processing elements and systems, control logic, ASICs, chips, workstations, mainframes, etc. Any computer herein may consist of, or be part of, a handheld computer, including any portable computer that is small enough to be held and operated while holding in one hand or fit into a pocket. Such a device, also referred to as a mobile device, typically has a display screen with touch input and/or a miniature keyboard. Non-limiting examples of such devices include Digital Still Camera (DSC), Digital video Camera (DVC or digital camcorder), Personal Digital Assistant (PDA), and mobile phones and Smartphones. The mobile devices may combine video, audio and advanced communications capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network that includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

The term 'host' or 'network host' is used herein to include, but not limited to, a computer or other device connected to a computer network, such as the Internet. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address autoconfiguration methods. Network hosts that participate in applications that use the client-server model of computing are classified as server or client systems. Network hosts may also function as nodes in peer-to-peer applications, in which all nodes share and consume resources in an equipotent manner.

Some embodiments may be used in conjunction with various devices, network elements, and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

As used herein, the terms "program", "programmable", and "computer program" are meant to include any sequence or human or machine cognizable steps, which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Program modules may include routines, programs, objects, components, data structures, and the like, that perform particular tasks or implement particular abstract data types. The term "application program" (also referred to as 'application', 'software application', or 'application software') is used herein to include, but not limited to, a computer program designed to perform a specific function directly for a user, or for another application program. Application software is typically a set of one or more programs designed to carry out operations for a specific application. Commonly, an application software is dependent on system software that manages and integrates computer capabilities but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary software, or as an open-source software. Most applications are designed to help people perform an activity.

The terms "task" and "process" are used generically herein to describe any type of running programs, including, but not limited to a computer process, task, thread, executing application, operating system, user process, device driver, native code, machine or other language, etc., and may be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments are not limited to any particular order of carrying out such steps. In particular, the labels are used merely for convenient identification of steps and are not intended to imply, specify or require a particular order of carrying out such steps. Furthermore, other embodiments may use more or fewer steps than those discussed herein. They may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed, upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for detecting one or more rectangular-shaped object regions from a background in a captured image, the method comprising:
    obtaining the captured image by a digital camera;
    analyzing the captured image using a deep convolutional neural network for detecting the object regions;
    enhancing the image in each of the detected regions; and
    cropping or extracting from the captured image each of the enhanced detected regions into a respective file,
    wherein the objects are rectangular-based photographs, receipts, business cards, sticky notes, printed newspapers, or stamps, and
    wherein the neural network is further trained to recognize or classify the rectangular-based object regions in the captured image.

2. The method according to claim 1, wherein further comprising training the neural network to detect the rectangular-based object regions in the captured image.

3. The method according to claim 1, wherein the neural network is further trained to recognize or classify the objects in the captured image and having multiple stages or layers, and wherein the analyzing of the content of each of the regions uses an output of an intermediate stage or layer in the neural network.

4. The method according to claim 3, wherein the neural network is ImageNet having 26 stages or layers, the intermediate stage or layer is an eighth stage or layer, the output includes 256 saliency maps, and wherein the analyzing of the content comprises generating an output map calculated by a weighted average of the 256 saliency maps.

5. A non-transitory tangible computer readable storage media comprising code to perform the steps of the method of claim 1.

6. A device housed in a single enclosure and comprising in the single enclosure the digital camera, a memory for storing computer executable instructions, and a processor for executing the instructions, the processor configured by the memory to perform acts comprising the method of claim 1.

7. The device according to claim 6, wherein the single enclosure is a portable or a hand-held enclosure and the device is battery-operated and consists of, comprises, or is part of, a notebook, a laptop computer, a media player, a cellular phone, a tablet, a Personal Digital Assistant (PDA), or an image-processing device.

8. The method according to claim 1, wherein the background comprises a pattern and the captured image comprises an entire or part of a page of a photo album.

9. The method according to claim 1, wherein the obtaining of the captured image comprises capturing the captured image by the digital camera, and wherein the digital camera is part of, or comprises, a single enclosure that is a portable or a hand-held enclosure that includes a battery for powering the digital camera, and the single enclosure further comprises a notebook, a laptop computer, a media player, a cellular phone, a tablet, a Personal Digital Assistant (PDA), or an image-processing device.

10. The method according to claim 1, wherein the obtaining of the captured image comprises fetching the captured image from a volatile memory or a non-volatile memory that consists of, or comprises, a Hard Disk Drive (HDD), a Solid State Drive (SSD), RAM, SRAM, DRAM, TTRAM, Z-RAM, ROM, PROM, EPROM, EEROM, Flash-based memory, CD-RW, DVD-RW, DVD+RW, DVD-RAM BD-RE, CD-ROM, BD-ROM, and DVD-ROM.

11. The method according to claim 1, wherein the captured image is a single image file that is in a compressed format that is according to, based on, or consists of, Portable Network Graphics (PNG), Graphics Interchange Format (GIF), Joint Photographic Experts Group (JPEG), Exchangeable image file format (Exif), Tagged Image File Format (TIFF).

12. The method according to claim 1, wherein the captured image is using a color image that is using a color model that is according to, or based on, the RGB color space.

13. The method according to claim 1, further comprising capturing a first image by the digital camera, and forming the captured image by converting the first image from the color model to a grayscale format, wherein the converting of the captured image to a grayscale format is according to, based on, or using, linearly encoding grayscale intensity from linear RGB.

14. The method according to claim 1, further comprising capturing a first image by the digital camera, and downscaling the first image to form the captured image by downscaling the first image using a downscaling algorithm, wherein the captured image is having less than 10%, 7%, 5%, 3%, or 1% pixels of the first image or wherein the captured image is having less than 10,000, 5,000, 2,000, or 1,000 pixels.

15. The method according to claim 14, wherein the downscaling algorithm is according to, is based on, or uses, an adaptive or non-adaptive image interpolation algorithm.

16. The method according to claim 15, wherein the non-adaptive image interpolation algorithm consists of, comprises, or is part of, nearest-neighbor replacement, bilinear interpolation, bi-cubic interpolation, Spline interpolation, Lanczos interpolation, or a digital filtering technique.

17. The method according to claim 1, wherein the enhancing the region image comprises generating a color balanced image by correcting the color balance of the image.

18. The method according to claim 17, wherein the region image color space is using RGB whereby each pixel is defined by (r, g, b), and the correcting of the color balance comprises:
    obtaining a gray reference pixel values (rref, gref, bref);
    calculating average pixel values of the region image (ravg, gavg, bavg);
    calculating a color shift (rsft, gsft, bsft) of the region image according to, or based on, (rsft, gsft, bsft)=(ravg, gavg, bavg)−(rref, gref, bref); and
    calculating the color balanced image having pixels values (rc, gc, bc), where each pixel value is calculated (rc, gc, bc)=(r, g, b)−(rsft, gsft, bsft).

19. The method according to claim 18, wherein the obtaining of a gray reference pixel values is based on, or equal to, an average of pixel values in multiple images.

20. The method according to claim 19, wherein the obtaining of the gray reference pixel values is based on, or equal to, an average of pixel values in all of the extracted or cropped regions.

21. The method according to claim 17, wherein the enhancing of the image comprises generating a color-balanced image by correcting the color balance of the region image followed by enhancing the contrast in the color-balanced image.

22. The method according to claim 21, wherein the enhancing of the contrast, comprises, uses, or is based on, a linear contrast enhancement that is Min-Max Linear Contrast Stretch, Percentage Linear Contrast Stretch, or Piecewise Linear Contrast Stretch.

23. The method according to claim 21, wherein the enhancing of the contrast, comprises, uses, or is based on, a non-linear contrast enhancement that is Histogram Equalizations, Adaptive Histogram Equalization, Unsharp Mask, or Homomorphic Filter.

24. The method according to claim 1, wherein the analyzing of the captured image further comprises producing a list of quads in the captured image.

25. The method according to claim 24, for use with plurality of detected corners in the captured image, wherein each of the quads is a quadrilateral having two or more vertices that are selected from the detected corners.

26. The method according to claim 25, further comprising detecting the corners in the captured image, wherein each corner is defined by a point location and two directions from the point.

27. The method according to claim 26, wherein the detecting of the corners is according to, is based on, or consists of, a corner detection algorithm.

28. The method according to claim 27, wherein the detecting of the corners comprises detecting straight-line segments in the captured image according to, or based on, a pattern recognition algorithm.

29. The method according to claim 24, further comprising:
- estimating for each pair of quads selected from the list a correlation value corresponding to underlying similarities of the quads pair;
- selecting quads from the list based on the estimated correlation values;
- analyzing content of each of the regions defined by the selected quads; and
- determining that the regions defined by the selected quads correspond to the objects regions.

30. The method according to claim 1, wherein the analyzing of the captured image comprises generating a saliency map identifying salient pixels or saliency region in the captured image.

* * * * *